March 13, 1962 H. L. FOOTE 3,024,991
COST CALCULATOR (TOLL TICKETING)
Filed Sept. 4, 1956 15 Sheets-Sheet 1
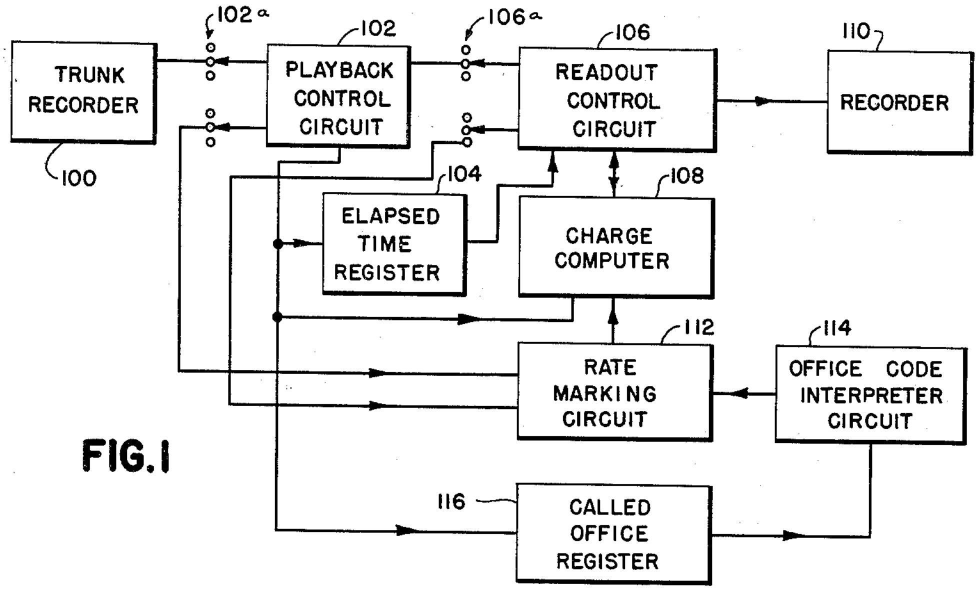
FIG. 1
FIG. 16
| RATE RELAY | BASE TIME PERIOD | INITIAL CHARGE | OVERTIME UNIT | OVERTIME RATE |
|---|---|---|---|---|
| 1410 | 4 MIN | $0.10 | 2 MIN. | $0.05 |
| 1420 | 4 MIN | 0.15 | 2 MIN. | 0.05 |
| 1430 | 4 MIN. | 0.20 | 1 MIN. | 0.05 |
| 1440 | 4 MIN. | 0.25 | 1 MIN. | 0.05 |
| 1450 | 3 MIN. | 0.30 | 1 MIN | 0.10 |
| 1460 | 4 MIN. | 0.35 | 1 MIN. | 0.10 |
| 1470 | 3 MIN. | 0.40 | 1 MIN. | 0.10 |
| 1480 | 3 MIN. | 0.45 | 1 MIN. | 0.15 |
| 1490 | 3 MIN. | 0.50 | 1 MIN. | 0.15 |
| 1500 | 3 MIN. | 0.20 | 1 MIN. | 0.05 |
| 1510 | 3 MIN. | 0.25 | 1 MIN. | 0.05 |
| 1520 | 3 MIN. | 0.15 | 1 MIN. | 0.05 |
| 1530 | 5 MIN. | 0.10 | 3 MIN. | 0.05 |
| 1540 | 4 MIN. | 0.30 | 1 MIN. | 0.05 |
| 1550 | 3 MIN. | 0.15 | 2 MIN. | 0.05 |
| 1560 | 3 MIN. | 0.55 | 1 MIN. | 0.15 |
| 1570 | 3 MIN. | 0.60 | 1 MIN. | 0.20 |
| 1580 | 3 MIN. | 0.75 | 1 MIN. | 0.25 |
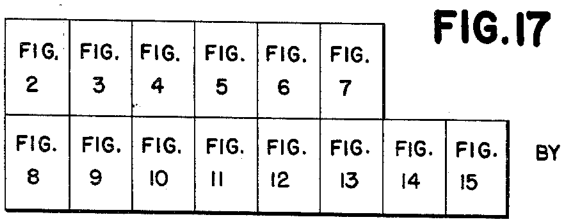
FIG. 17
INVENTOR
HOWARD L. FOOTE
BY Francis E. Blake
ATTORNEYS March 13, 1962 H. L. FOOTE 3,024,991

COST CALCULATOR (TOLL TICKETING)

Filed Sept. 4, 1956 15 Sheets-Sheet 2

March 13, 1962 H. L. FOOTE 3,024,991

COST CALCULATOR (TOLL TICKETING)

Filed Sept. 4, 1956 15 Sheets-Sheet 3

March 13, 1962 H. L. FOOTE 3,024,991

COST CALCULATOR (TOLL TICKETING)

Filed Sept. 4, 1956 15 Sheets-Sheet 4

March 13, 1962 H. L. FOOTE 3,024,991

COST CALCULATOR (TOLL TICKETING)

Filed Sept. 4, 1956 15 Sheets-Sheet 5

March 13, 1962 H. L. FOOTE 3,024,991

COST CALCULATOR (TOLL TICKETING)

Filed Sept. 4, 1956 15 Sheets-Sheet 6

March 13, 1962 H. L. FOOTE 3,024,991

COST CALCULATOR (TOLL TICKETING)

Filed Sept. 4, 1956 15 Sheets-Sheet 8

March 13, 1962 H. L. FOOTE 3,024,991

COST CALCULATOR (TOLL TICKETING)

Filed Sept. 4, 1956

15 Sheets-Sheet 10

March 13, 1962 H. L. FOOTE 3,024,991

COST CALCULATOR (TOLL TICKETING)

Filed Sept. 4, 1956 15 Sheets-Sheet 12

March 13, 1962 H. L. FOOTE 3,024,991

COST CALCULATOR (TOLL TICKETING)

Filed Sept. 4, 1956 15 Sheets-Sheet 14

RATE CIRCUIT-1400

March 13, 1962 H. L. FOOTE 3,024,991
COST CALCULATOR (TOLL TICKETING)
Filed Sept. 4, 1956 15 Sheets-Sheet 15

United States Patent Office 3,024,991
Patented Mar. 13, 1962

3,024,991

COST CALCULATOR (TOLL TICKETING)

Howard L. Foote, Fairport, N.Y., assignor to General Dynamics Corporation, Rochester, N.Y., a corporation of Delaware Filed Sept. 4, 1956, Ser. No. 607,697
31 Claims. (Cl. 235—156)

Figure 2:
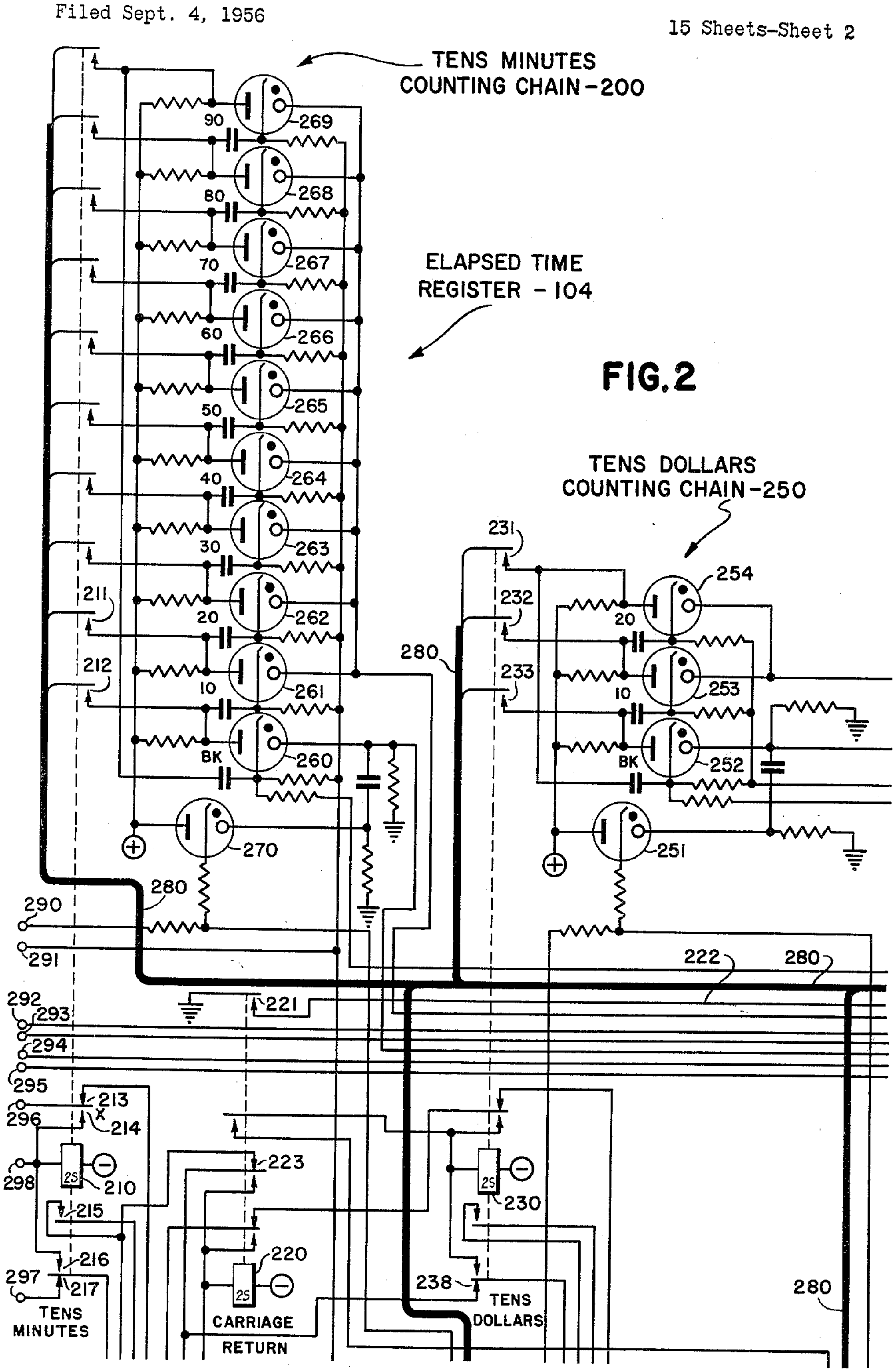

This invention relates to a calculating device, and, more particularly, to new and improved means for calculating charges to be assessed for telephone calls.

The telephone industry, as a means for reducing the cost of handling and processing toll calls, has developed and placed into extensive use a variety of different types of automatic toll ticketing systems. In general, these systems automatically collect and store items of information pertaining to a toll call, such as the designation of the called subscriber, the designation of the calling subscriber, the duration or length of the call, and the date and time at which the call was placed. These items are stored in resettable register devices such as relays and tubes, or on record media such as perforated cards or tape and magnetic tape. These stored items are supplied to a recorder, either associated with the telephone equipment or separate therefrom, to provide a permanent record of the stored and other items. These other items generally include a toll charge which is to be assessed to the calling or called subscriber and which is based on the duration of the call and a rate factor primarily derived from the calling and called offices involved in the connection.

The toll charge for each call is established in accordance with duration and rate data by a calculating or computing device which forms a part of the automatic toll ticketing system and which either is associated with the telephone switching equipment to calculate charges on a per call basis incident to placing the call or is a part of data processing equipment separate from the telephone switching equipment to compute charges for a group of calls based on rate and duration data derived from a record medium. In general, these existing calculating devices are essentially electro-mechanical in nature and use rotary switches or relay switching components to select charge representing conductors in accordance with the duration and rate factors involved in the calculation. These switch-type computers require a considerable amount of mounting space, are relatively slow in operation, and inherently are not as flexible in adaptation to new rate structures as would be desirable. In addition to these switching type calculators, the copending applications of F. A. Morris et al., Serial No. 348,202, filed April 13, 1953, now Patent No. 2,886,642, and M. A. Clement et al., Serial No. 536,579, filed September 26, 1955, both of which applications are assigned to the same assignee as the present application, disclose calculating devices for toll ticketing systems which are essentially electronic. However, these latter calculators are not as readily adapted to varying applications in different types of toll ticketing systems as would be desirable.

Accordingly, an object of the present invention is to provide new and improved calculating means.

Another object is to provide a new and improved calculating device utilizing rate and duration data to establish charges for telephone calls.

Another object is to provide a duration storing means for automatically registering the difference between call duration data and varying base time intervals.

A still further object is to provide new and improved high speed calculating means utilizing largely electronic components for establishing toll charges in an automatic toll ticketing system.

Another object is to provide cost calculating means controlled by a duration factor register and a rate factor register.

Another object of the present invention is the provision of a cost calculator including new and improved means for storing and utilizing a rate factor.

A further object is to provide a charge computer including counting means for controlling the entrance of duration data and for storing rate data.

Many other objects and advantages of the present invention will become apparent from a consideration of the specification in conjunction with the following drawings wherein:

FIG. 1 is a schematic block diagram illustrating an elapsed time register and charge computer embodying the present invention shown in conjunction with an automatic toll ticketing system of which the computer and register may form a part;

FIGS. 2 to 15, inclusive, are circuit drawings, illustrating the details of an embodiment of the elapsed time register and charge computer schematically shown in FIG. 1;

FIG. 16 is a table illustrating a group of the rate structures which are utilized by the cost computer of the present invention in establishing charges for toll calls; and FIG. 17 is a block diagram illustrating the manner in which FIGS. 2 to 15, inclusive, are disposed adjacent each other to form a complete circuit diagram of an elapsed time register and charge computer embodying the present invention.

Although the computer of the present invention embodies means and techniques of general utility in the computing and calculating field, this computer is shown in a form particularly modified for use in establishing charges to be assessed for telephone calls under the control of a duration factor, which pertains to the length of a telephone call, and a rate factor, which is generally dependent upon the two offices between which a particular telephone call is extended. The charge computer is adapted to be supplied with information from a record medium, such as a perforated tape, or similarly could be provided with data pertaining to the factors entering into the calculation to be performed under the control of a key set mechanism. However, to illustrate the applicability of the charge computer in establishing charges to be assessed for toll calls, the computer of the present invention has been illustrated in the drawings in conjunction with portions of an automatic toll ticketing system, such as that described in the above identified copending application of M. A. Clement et al.

Referring now to FIG. 1 of the drawings, therein is shown, in block diagram form, a portion of an automatic toll ticketing system such as that described in detail in the above identified copending Clement et al. application. As described in detail therein, items of information pertaining to a plurality of toll calls are stored in each of a plurality of trunk recorders, similar to a trunk recorder 100, each of which is individually associated with a portion of a line extending means such as a trunk circuit. The trunk recorder 100 comprises an endless length of magnetic tape effectively divided into two separate and parallel channels on one of which are recorded mark or information pulses and on the other of which are recorded space or control pulses. Included in the information stored in the trunk recorder 100 is a plurality of groups of mark pulses equal in number to the number of minutes that each of a plurality of toll calls was maintained. This information provides the duration factor utilized by the charge computer in establishing a charge to be assessed for a call. Similarly, the trunk recorder 100 includes a plurality of groups of mark pulses separated by intervening space pulses representing the values of the called office code digits of the called subscriber involved in each connection. This information is utilized to partially control the establishment of a rate factor to be utilized by the charge computer. The items of information pertaining to each call including the duration and called office information together with other items such as the designations of the calling and called subscribers and the date and time on which the call was placed are sequentially recorded on the magnetic tape with interposed end-of-call codes following the items pertaining to each call and are adapted to be scanned by transducing means which provide series of mark and space pulses in accordance with the information recorded on the magnetic tape.

During a readout or printing operation, the items of information stored in each of the trunk recorders, such as the trunk recorder 100, are transmitted by selective tape movement to a plurality of register circuits forming a portion of a common recording or printing equipment, and the information is simultaneously erased from the magnetic tape to permit the trunk recorder to be reused in storing items of information pertaining to subsequently placed calls. Following the transmission of all of the items of information pertaining to a single call, movement of the magnetic tape in the seized trunk recorder is terminated and the registers are rendered effective to control the operation of a recording instrumentality, such as the readout perforator or printer. More specifically, when a readout operation is to be initiated, a start ground is applied to a readout control circuit 106 so that a switching means 106*a* associated therewith searches for and seizes an idle playback control circuit 102 which is located in either a local or a remote area. Following seizure, the playback control circuit 102 places a switching means 102*a* individual thereto in operation to search for and seize in sequence the idle trunk recorders to which it has access, including the trunk recorder 100. Assuming that the trunk recorder 100 is idle, it is seized by the playback control circuit 102 and is conditioned to transmit the items of information stored thereon pertaining to the first call. Incident to placing the playback control circuit 102 and the readout control circuit 106 in operation, all of the register circuits and data translating means forming a part of the common recording equipment are reset to a normal condition in which they are capable of receiving the items of information pertaining to the first toll call.

Following the completion of the resetting and clearing operations, the readout control circuit 106 extends a control signal through the playback control circuit 102 to the trunk recorder 100 and its associated control circuits so that movement of the magnetic tape is initiated. Movement of the magnetic tape relative to the transducing means provides a plurality of groups of mark pulses separated by space pulses which are transmitted through suitable amplifying means in the playback control circuit 102 and in the readout control circuit 106 to the registers, which preferably are of the counting chain type utilizing cold cathode gaseous discharge devices. The items of information relating to the designation of the called office are stored in a called office register 116, and, following the completion of the storage of these items, an office code interpreter circuit 114 is placed in operation to translate the stored numerical digits representing the called office into a combination of two alphabetical characters and a single numerical character. In addition to performing this translation operation, the office code interpreter circuit 114 provides an item of information representing the called office to a rate marking circuit 112 to provide a portion of the information utilized in establishing the rate factor to be utilized in establishing the toll charge to be assessed for the first call.

The rate marking circuit 112 is also provided by either the playback control circuit 102 or the readout control circuit 106 with an item of information relating to the office in which the calling substation is located, this information readily being provided by the selective position of one of the stepping switches 102*a* or 106*a* inasmuch as a given playback control circuit 102 or a given trunk recorder 100 is utilized in conjunction with calls extending from only a single office. The provision of this item of information to the rate marking circuit 112 provides all of the information necessary for establishing the rate factor which is to be utilized by the charge computer. Following the establishment of this information in the rate marking circuit 112, a signal is transmitted to the charge computer 108 representing the rate structure so that this data is stored in the computer 108. The rate structure consists of items of information representing a base time period for which an initial charge is to be assessed, the amount of the initial charge, the length of the overtime unit for which an additional charge is to be assessed, and the amount of the charge to be added to the initial charge for each overtime unit.

Following the storing of the called office information in the called office register 116 and following the storage of additional items of information, such as the designations of the calling and called substations, the seized trunk recorder 100 supplies information representing the duration of the call. As set forth above, this information is in the form of a single group of mark pulses each representing an interval of one minute. This information is simultaneously applied to an elapsed time register 104 and to the charge computer 108. The mark pulses supplied to the elapsed time register 104 operates a cold cathode counting ring and a cold cathode counting chain therein to a manifestation representing the total elapsed time of the call. This information is simultaneously applied to the charge computer 108, thereby to establish the duration factor therein. Following the storage of the duration information in both the elapsed time register 104 and the charge computer 108, the readout control circuit 106 places the charge computer 108 in operation to determine the charge which is to be assessed for the toll call and which is based on the rate and duration factors stored in the computer 108.

Basically, the charge computer 108 includes a reversible binary overtime interval counting chain for determining and storing a duration multiplier factor, a variable length multiplicand counting ring which effectively stores a portion of the rate structure, and a charge or product accumulator comprising a series of serially connected counting rings and chains. The operation of the rate circuit in the charge computer 108 under the control of the rate marking circuit 112 stores the base time period in the duration counting chain by adjusting this chain to a setting such that the application of drive pulses to the chain representing the base time interval restores the chain to a predetermined normal or zero condition. The initial charge to be assessed for this base time period is primed into the product or charge accumulator by selectively rendering certain ones of the discharge devices in the counting chains and rings conductive, thereby to provide a manifestation representing the initial charge. The overtime rate factor, i.e. the charge to be added to the initial charge for each unit of overtime stored in the overtime interval counting chain and which may comprise one or more minutes, is effectively stored in the multiplicand counting ring by connecting a selected number of five cent manifesting counting stages or electronic devices in a closed ring. For instance, if a fifteen cent charge is to be made for each overtime unit, whether of one or more minutes, three five cent counting stages are connected in a ring so that a complete cycle of operation represents a cost increment of fifteen cents to be added to the charge accumulator.

To store the duration factor in the charge computer 108, the duration impulses are applied to the input of the overtime intreval counting chain so that, when a number of pulses representing the base time stored in the counting chain have been applied thereto, the counting chain is restored to its normal condition. With the overtime chain in this condition, the cost computer 108 is advised that the receipt of additional duration pulses indicates the need for a calculating operation to add increments of cost to the initial cost stored in the product or charge accumulator. The computer is advised of this condition by preparing a source of clock pulses or signals for operation incident to the receipt of further information from the readout control circuit 106 that a calculating operation is to be initiated. The continuing application of duration mark pulses to the overtime counting chain advances this chain to a setting representing not the total of duration pulses received but rather the result of the base time period subtracted from the total duration of the toll call so that, when the duration impulses are no longer received by the charge computer 108, the duration counting chain or register stands in a condition representing the number of overtime units for which a charge is to be assessed. In some rate structures in which the overtime period includes more than one minute, the rate multiplicand counting chain or register is uilized to meter input pulses to the duration factor register.

In operation, when the readout control circuit 106 supplies a computer start signal to the charge computer 108, if the source of clock pulses has previously been conditioned for operation by the overtime interval counting ring going beyond its normal condition, pulses are simultaneously applied to the input of the lowest order counting chain in the charge accumulator and to the input of the rate factor multiplicand counting ring to sequentially operate the gaseous discharge devices therein. The clock pulses are also supplied to the input of the duration factor counting chain which has been conditioned to operate in a reverse direction. However, these pulses are not effective to advance the duration factor counting chain. At the end of a complete cycle of operation of the multiplicand factor counting ring thus representing that the charge of five, ten, or any other integral multiple of five cents has been stored in the product accumulator in accordance with the overtime rate factor, an enabling bias is provided to the input of the overtime interval counting chain so that the duration factor standing in this register is reduced by an increment of one. In this manner, the rate multiplicand counting ring operates through a number of cycles of operation determined by the number of overtime units stored in the overtime interval counting chain. When the overtime interval counting chain or register is restored to its normal condition by the subtraction of units of overtime under the control of the rate factor counting ring, thus indicating that the product of the rate factor and the number of overtime units has been added to the initial charge in the charge or product accumulator, the overtime interval or duration factor counting chain renders the clock pulse source ineffective and thereby terminates operation of the charge computer 108. Following the completion of the computing operation, the readout control circuit 106 initiates a cycle of operation in which the information stored in the plurality of registers including the elapsed time register 104 and the computer 108 is supplied to a recorder 110 to provide a permanent record thereof.

Following the completion of the playback and recording of all of the items of information stored in a single trunk recorder 100, the playback control circuit 102 successively seizes and plays back the other trunk recorders to which it has access. Following the completion of its playback operation, the circuit 102 is released by the readout control circuit 106 and other similar circuits are seized to cause the playback of additional trunk recorders 100 incident to which the items of information pertaining to duration and factor are supplied to the charge computer 108, thereby to operate the computer 108 to supply the charge to be assessed for each of these toll calls. Following the completion of the playback of all of the trunk recorders 100 to which the readout control circuit 106 has access, the recording facilities are restored to a normal condition.

ELAPSED TIME REGISTER 104

Figure 8:
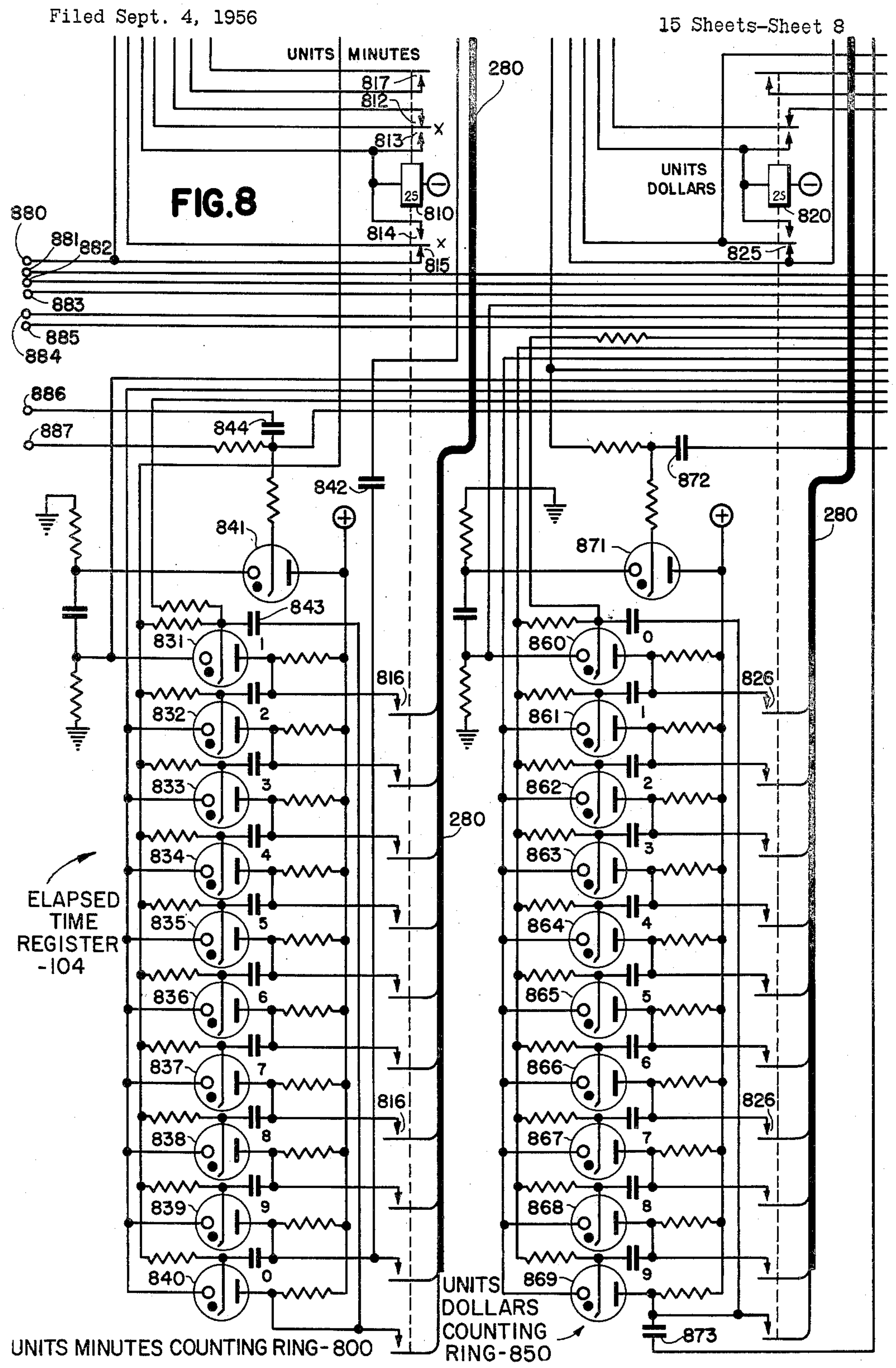
Figure 9:
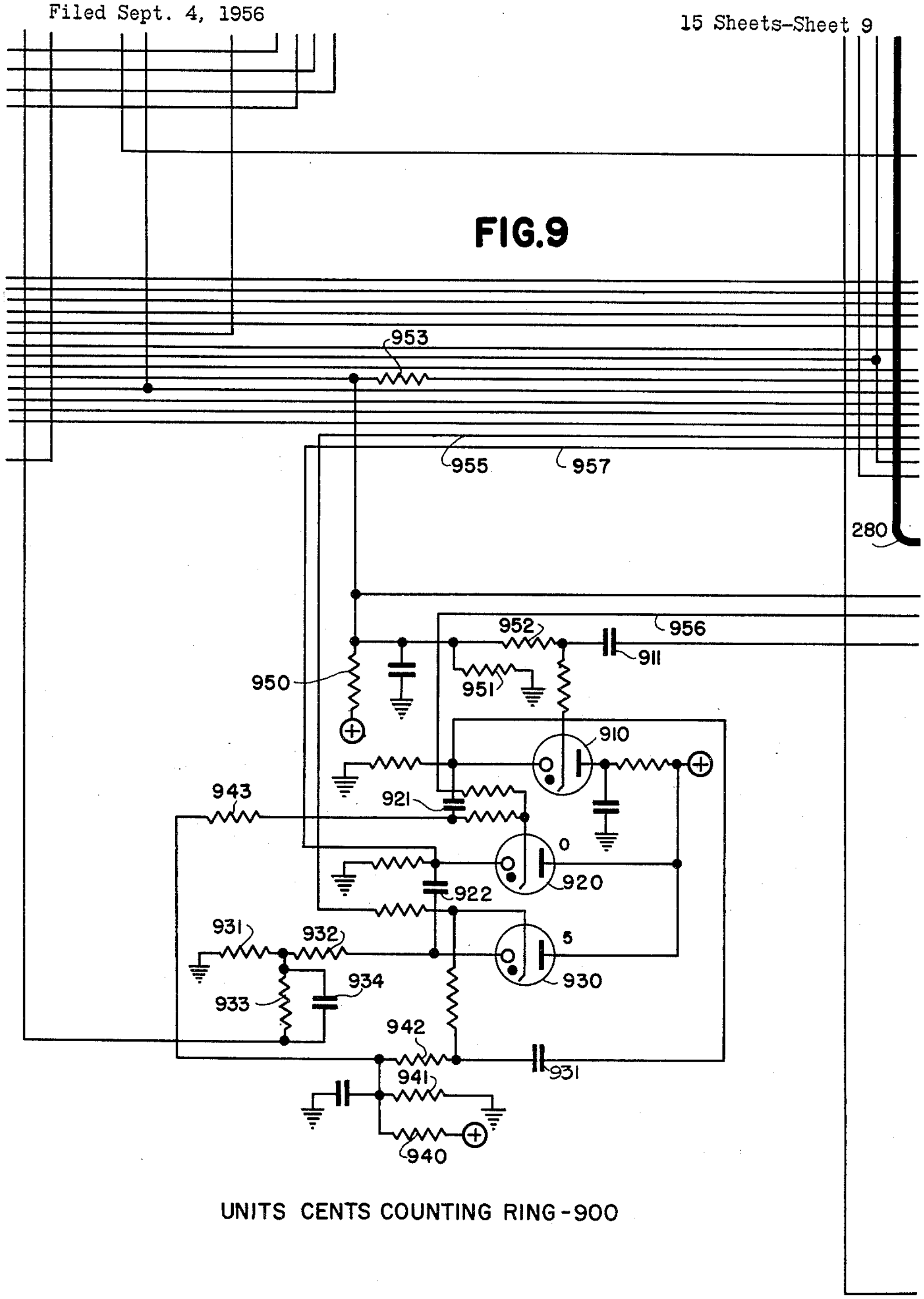
Figure 10:
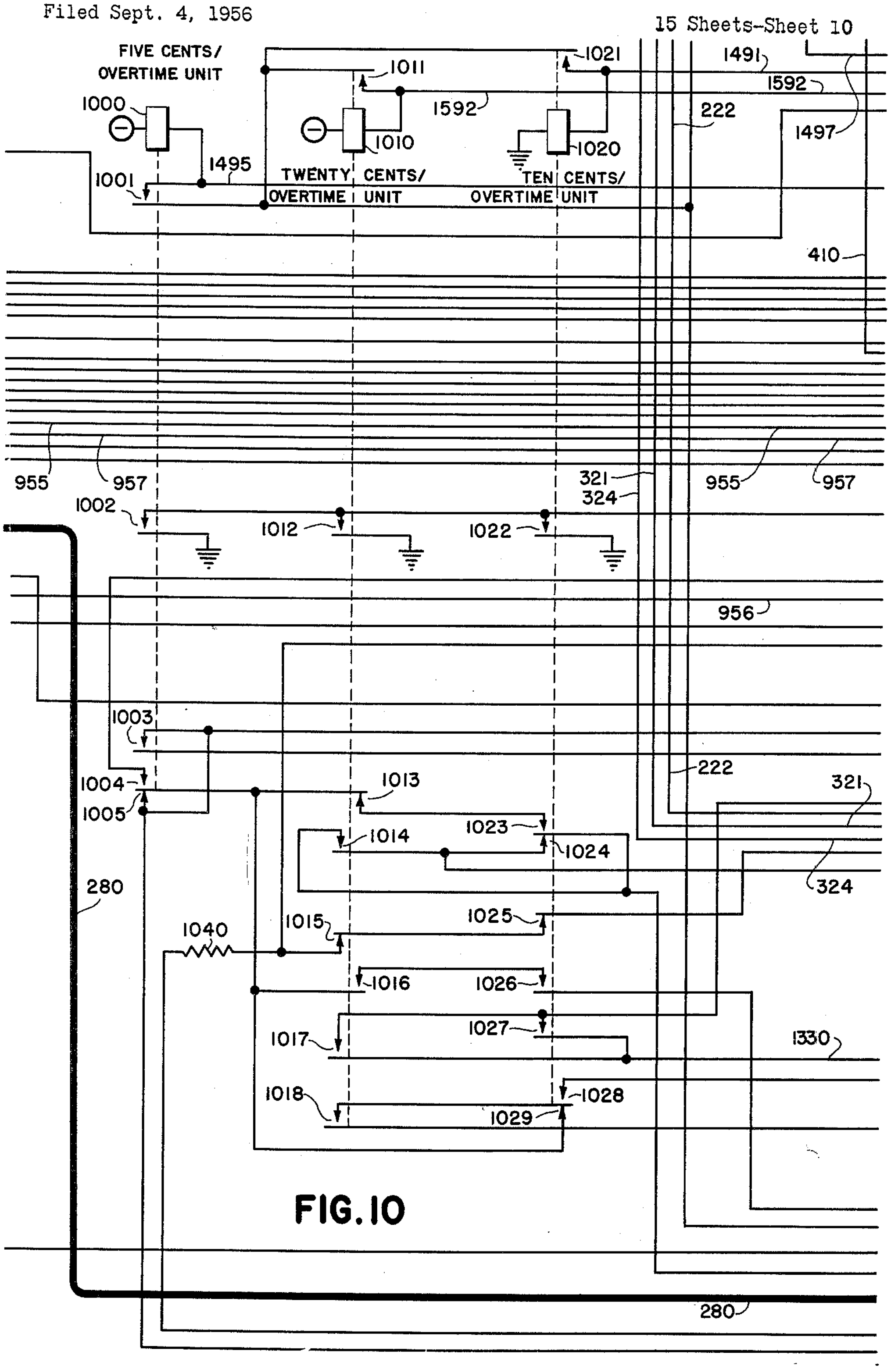
Figure 11:
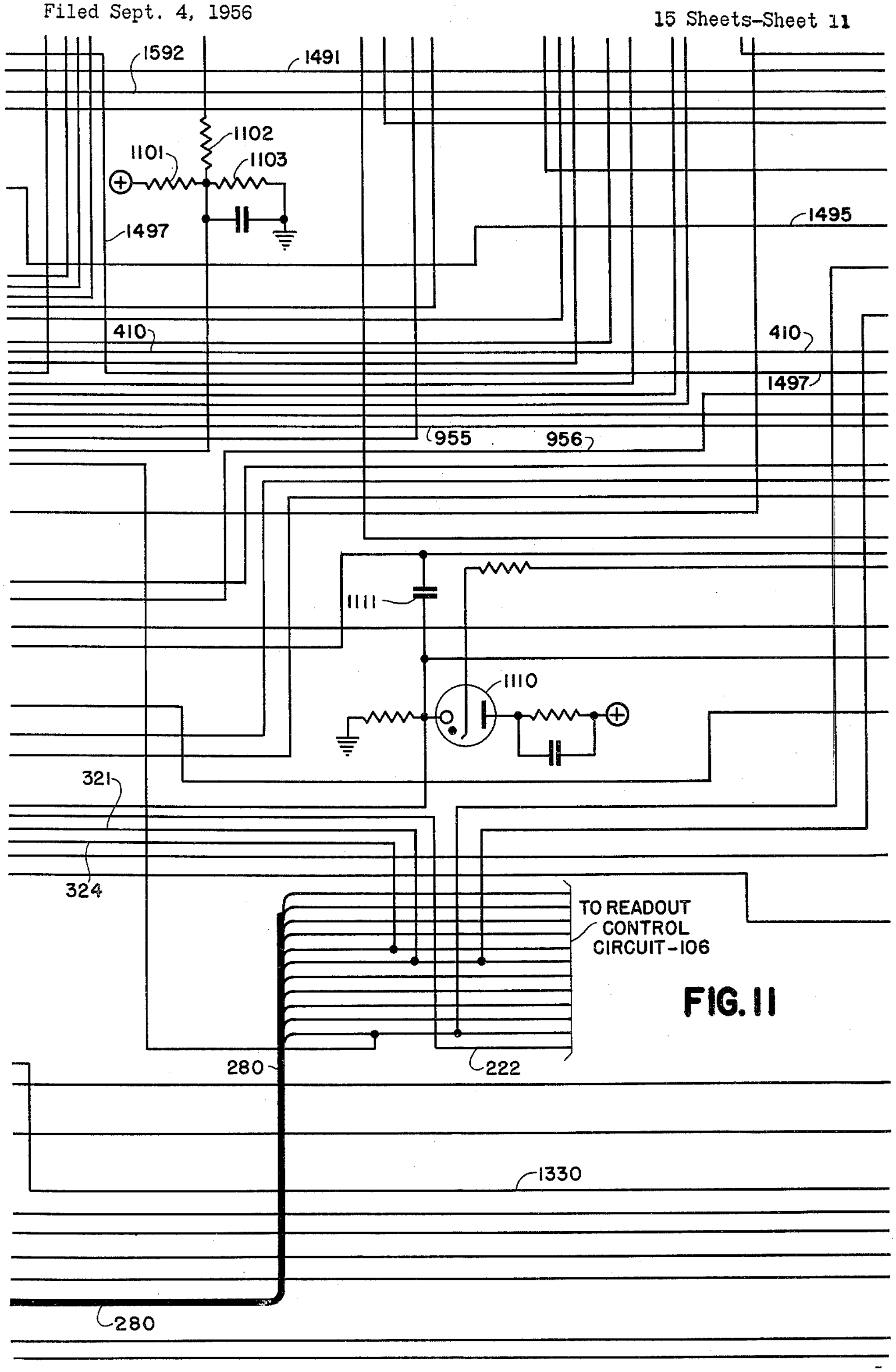
Figure 12:
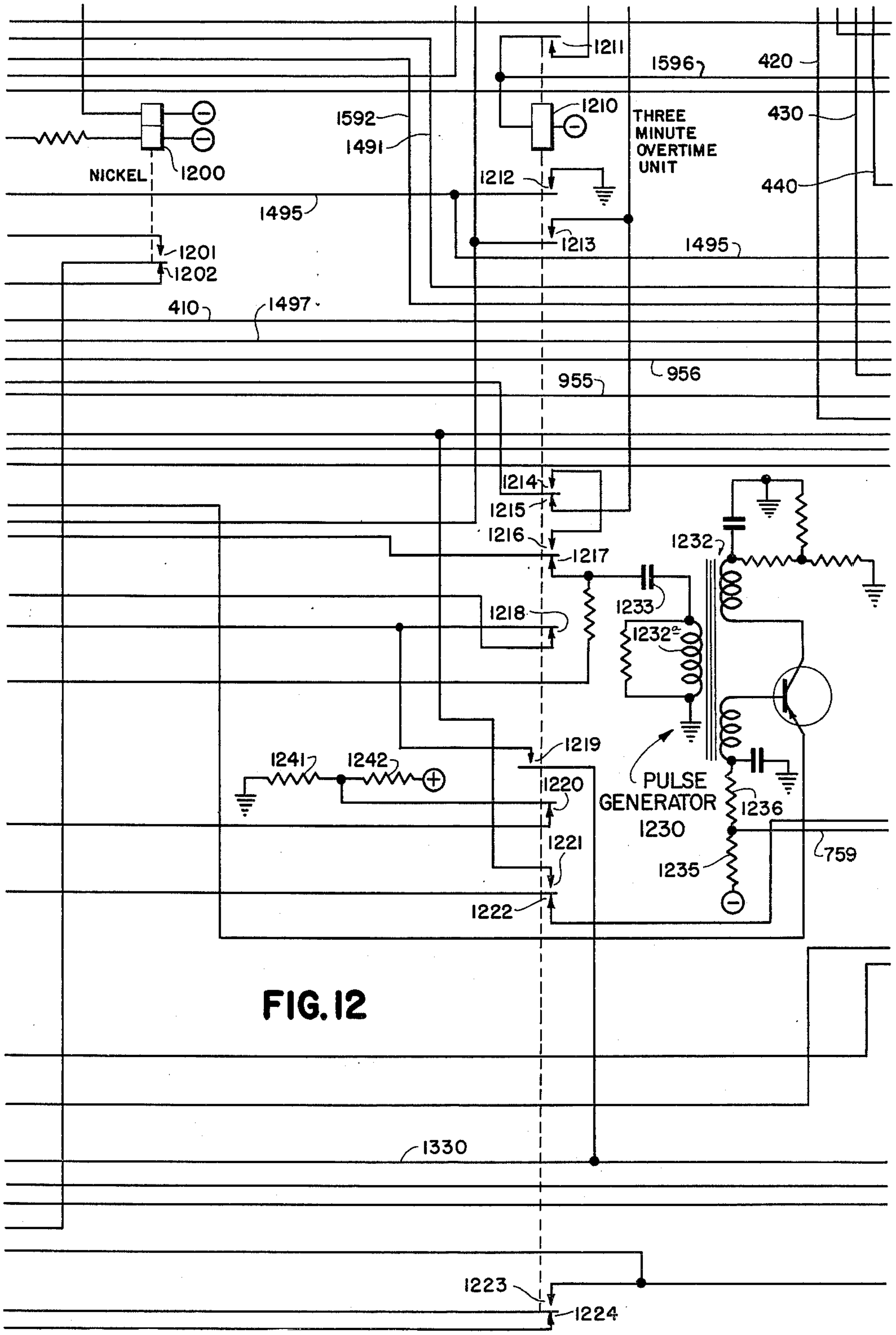

The elapsed time register 104 is operated by the group of mark pulses representing the duration of the telephone call to provide a manifestation of the length thereof and, to this end, includes a units minutes counting ring 800 and a tens minutes counting chain 200 (FIGS. 2 and 8). Although the counting ring 800 and the counting chain 200 can be of any of the types of counting circuits well known in the art, these circuits are shown in the drawings as comprising decade counters utilizing cold cathode tubes which are of the type described in detail in conjunction with FIGURE 3 of the article entitled, "Cold Cathode Counting Circuits" by H. L. Foote appearing in Communications and Electronics, May, 1955. Counting circuits of this type afford a manifestation of an entered value by selectively rendering a single tube conductive in accordance with the number of signals or pulses applied to the input thereof.

Referring now more specifically to the units minutes counting ring 800, this ring includes a drive tube 841 and a plurality of counting tubes 831 to 840, inclusive, representing the digits "1" to "9," inclusive, and "0," respectively, the anode of the tube 840 being coupled to the control electrode of the "1" manifesting tube 831 through a condenser 843. The control electrodes of the tubes 831 to 840, inclusive, are supplied with a normal operating bias at a terminal 291 by the readout control circuit 106, and the control electrode of the "1" manifesting tube 831 is momentarily connected to B+ potential during a reset operation so that this tube is normally conductive.

To provide a means for operating the drive tube 841, the control electrode of this tube is connected through a coupling condenser 844 to a terminal 886. The terminal 886 is connected to suitable amplifying means in either the playback control circuit 102 or the readout control circuit 106 so that, when the magnetic tape is a seized trunk recorder, such as the recorder 100, is moved incident to a readout operation, the pulses supplied by the transducing head adjacent the magnetic tape are amplified and supplied in common to all of the plurality of registers in the readout facilities including the drive tube 841 of the units minutes counting ring 800. In order to selectively render only the units minutes counting ring 800 effective to receive the group of mark pulses representing the duration of the toll call, a steering circuit (not shown), such as that disclosed in the above identified copending Clement et al. application, applies a positive enabling potential to a terminal 887 which is connected to the control electrode of the drive tube 841.

In operation, each pulse supplied to the coupling condenser 844, following the application of the enabling bias to the terminal 887, renders the drive tube 841 momentarily conductive to supply a positive pulse to the common cathodes of the tubes 831 to 840, inclusive, through a pair of normally closed contacts **531*a* on a reset relay 530. This pulse extinguishes the normally conductive "1" manifesting tube 831. Extinguishing the tube 831 provides a positive pulse at its anode which is coupled to the control electrode of the digit "2" manifesting tube 832 to fire this tube. It will be noted that the first pulse applied to the units minutes counting ring 800 extinguishes the "1" manifesting tube and fires the "2" manifesting tube, thereby to provide a manifestation or a pattern of conductive and nonconductive conditions in the counting ring 800 representing an elapsed time of two minutes. The value of the duration or elapsed time stored in the register 104** is thus one minute greater than that represented by the supplied mark pulse. It is desirable to thus arbitrarily increase the value of the stored time by this one minute increment inasmuch as the one minute pulses are stored in the trunk recorders, such as the recorder 100, following the expiration of each minute rather than at the beginning of each minute. Since the first pulse is recorded following the expiration of the first one minute interval, it necessarily implies that the second one minute interval has begun, and, in conventional telephone practice, a charge is made for partially used time increments. Accordingly, the elapsed time register 104 is primed with an additional one minute increment so that the value standing in the register 104 exceeds by one minute the number of mark pulses supplied thereto from the trunk recorder.

The continuing application of mark pulses to the drive tube 841 sequentially advances the electronic pattern provided by the tubes in the units minutes counting ring 800 in accordance with the number of pulses supplied to the condenser 844. When the "0" manifesting tube 840 is extinguished, a positive pulse is coupled to the control electrode of the tube 831 through the coupling condenser 843 to initiate an additional cycle of operation. At the time when the last of the mark pulses representing elapsed time has been applied to the units minutes counting ring 800, the single one of the tubes 831 to 840, inclusive, which is conductive manifests the value of the units minutes digit of the elapsed time.

Referring now to the tens minutes counting chain 200, this chain is virtually identical to the units minutes counting ring 800 in including a drive tube 270, a normally conductive blank tube 260, and a plurality of digit manifesting tubes 261, 262, 263, 264, 265, 266, 267, 268, and 269 representing the tens digits "1" to "9," inclusive, respectively. The control electrodes of the tubes 260 to 269, inclusive, are supplied with a normal operating bias at the terminal 291 by the readout control circuit 106, and a terminal 290 is also supplied with a normal operating potential by the readout control circuit 106 to render the control electrode of the drive tube 270 responsive to pulse applied thereto. To provide a means for operating the tens minutes counting chain 200, the control electrode of the drive tube 270 is connected to the anode of the "9" manifesting tube 839 in the units minutes counting ring 800 through a coupling condenser 842. Accordingly, in response to the application of nine pulses to the ring 800 in its first cycle of operation and every tenth pulse in subsequent cycles of operation, the "9" manifesting tube 839 is extinguished to provide a positive pulse for firing the tube 840 and momentarily rendering the tube 270 conductive. Rendering the drive tube 270 momentarily conductive supplies a positive pulse through a pair of normally closed contacts 535 on the reset relay 530 to extinguish the normally conductive blank or "0" manifesting tube 260. Extinguishing the tube 260 provides a positive pulse at its anode which fires the "1" manifesting tube 261. Subsequent operations of the drive tube 270 in response to each cycle of operation of the units minutes counting ring 800 advances the tens minutes counting chain 200 to a setting in which, when the transmission of the elapsed time information has been completed, a single one of the tubes 260 to 269, inclusive, is conducting in accordance with the value of the tens minutes digit of elapsed time.

Following the completion of the entrance of the elapsed time data into the counting chain 200 and the counting ring 800 and as described above, the readout control circuit 106 initiates a readout operation in which the recorder 110 is controlled in accordance with the values registered in the chain 200 and the ring 800 as well as in the other registers forming a part of the recording or printing facility. Incident to these operations, the potential at the terminal 291 is reduced by the circuit 106 to prevent inadvertent firing of the digit manifesting tubes in the chain 200 and the ring 800 during the recording operations. The circuit 106 also operates a prepare-to-read relay 310 to close a plurality of contacts 311 and 313, among others. The closure of the contacts 311 applies ground to the cathodes of the tubes in the counting chain 200, and the closure of the contacts 313 applies ground to the common connected cathodes of the tubes in the counting ring 800, thereby to increase the current carrying capacity of the tubes selectively rendered conductive therein by providing a shunt around the common cathode resistors.

The readout control 106 then initiates operation of a printing control or readout relay counting chain including a plurality of two-step relays as described in detail in the above identified copending Clement et al. application. Incident to these operations, a tens minutes relay 210 is operated to close a plurality of contacts similar to a plurality of contacts 211 and 212 together with other contacts so that the anodes of the tubes in the counting chain 200 are connected with printer controlling relays in the readout control circuit 106 through a common readout cable 280. These printer relays actuate the recorder 110 to print or perforate the value of the tens minutes digit. In a similar manner and following the release of the relay 210, a units minutes readout relay 810 is operated to close a plurality of contacts 816 among others, thereby to interconnect the anodes of the tubes forming the units minutes counting ring 800 with the relays in the readout control circuit 106 so that the recorder is actuated to provide a record of the value of the minutes digit of elapsed time.

Following the completion of the readout operation, the elapsed time register 104 is reset to a normal condition by releasing the prepare-to-read relay 310 to remove the direct ground paths for the digit manifesting tubes in the chain 200 and ring 800 and by operating the reset relay 530 to open the contacts 531*a* and 535 and to close a plurality of contacts 533 and 539, among others. The opening of the contacts 535 disconnects all of the digit manifesting tubes in the counting chain 200 with the exception of the tube 260 from ground, thereby rendering these tubes nonconductive. In a similar manner, the opening of the contacts 531*a* disconnects the cathodes of the tubes in the counting ring 800 from ground, with the exception of the tube 831, so as to extinguish the condutive tube therein. The closure of the contacts 539 connects B+ voltage to the control electrode of the "1" manifesting tube 831 in the counting ring 800 to render this tube conductive, the cathode thereof being connected to ground through its cathode resistor. In a similar manner, the closure of the contacts 533 applies B+ potential to the control electrode of the tube 260 in the counting chain 200 so as to render this tube conductive. Thereafter, the readout control circuit 106 releases the reset relay 530 so that the cathodes of the tubes 832 to 840, inclusive, are again connected to the cathode of the tube 831, the cathodes of the tubes 261 to 269, inclusive, are again connected to the cathode of the tube 260, and the priming potentials are removed from the control electrodes of the tubes 831 and 260. Accordingly, in response to a resetting operation, the counting chain 200 and the counting ring 800 are cleared, and the normally conductive "1" manifesting tube 831 in the ring 800 and the blank or "0" manifesting tube 260 in the counting chain 200 are rendered conductive.

CHARGE COMPUTER 108

The charge computer 108 includes a product or charge accumulator comprising a tens dollars counting chain 250, a units dollars counting ring 850, a tens cents counting ring 300, and a units cents counting ring 900 which are supplied with an initial charge under the control of a rate circuit 1400 and which receive additional signals representing cost increments to be added to the initial charge under the control of an overtime interval or duration factor register 700 and an overtime rate or rate factor counting ring 1300. The overtime interval register 700 comprises a reversible binary counting chain which is normally primed by the rate circuit 1400 with the base time period for which the initial charge is to be made and is thereafter supplied with mark pulses from the coupling condenser 844 to be advanced to a setting representing the difference between the total elapsed time and the base time period. Incident to moving to the setting or pattern representing the first overtime interval, the overtime register 700 conditions a pulse generator 1230 for subsequent operation to supply pulses to the charge accumulator and the overtime rate counting ring 1300. The overtime rate counting ring 1300 comprises a plurality of separate counting stages which are connected into an effective counting ring under the control of the rate circuit 1400 in accordance with the monetary charge to be assessed for each overtime unit.

In operation, the overtime rate counting ring 1300 is cyclically operated under the control of the pulse generator 1230 in synchronism with the application of pulses to the charge accumulator through a number of cycles of operation determined by the overtime interval register 700 which, incident to a computing operation, is conditioned for operation in a reverse direction so that, at any given instant, the value standing in the overtime interval register 700 provides a manifestation or indication of the number of additional times that the multiplicand or rate represented by the overtime rate counting ring 1300 is to be entered into the product accumulator. When the overtime interval register 700 is restored to its normal condition, the pulse generator 1230 is rendered ineffective to operate the charge accumulator, the overtime interval register 700, and the overtime rate counting ring 1300. Following the completion of the calculating operation, the readout control circuit 106 operates the recorder 110 in accordance with the charge standing in the accumulator to provide a permanent record thereof, and the cost computer 108 is restored to its normal condition.

*Tens Dollars Counting Chain 250*

Figure 3:
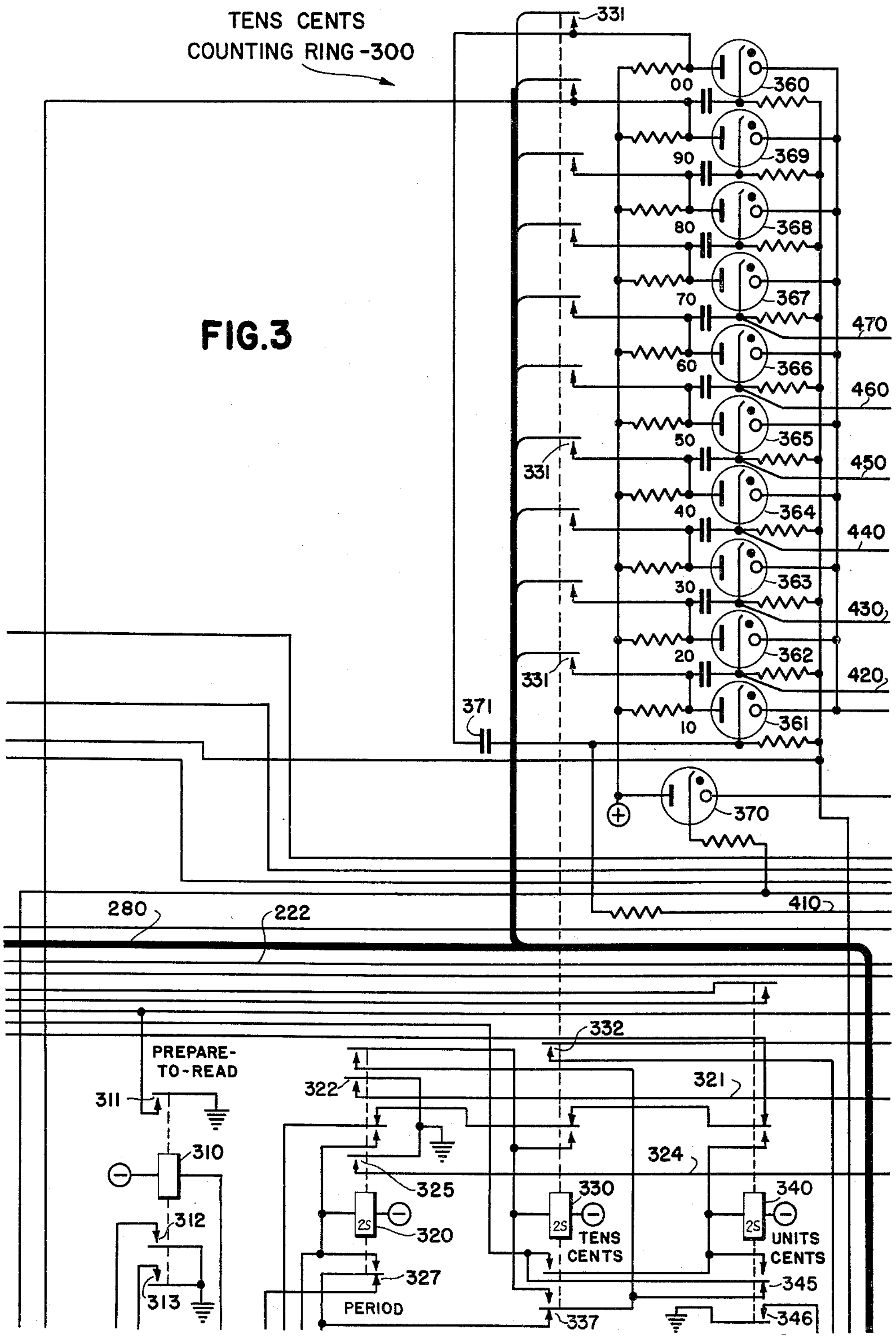
Figure 4:
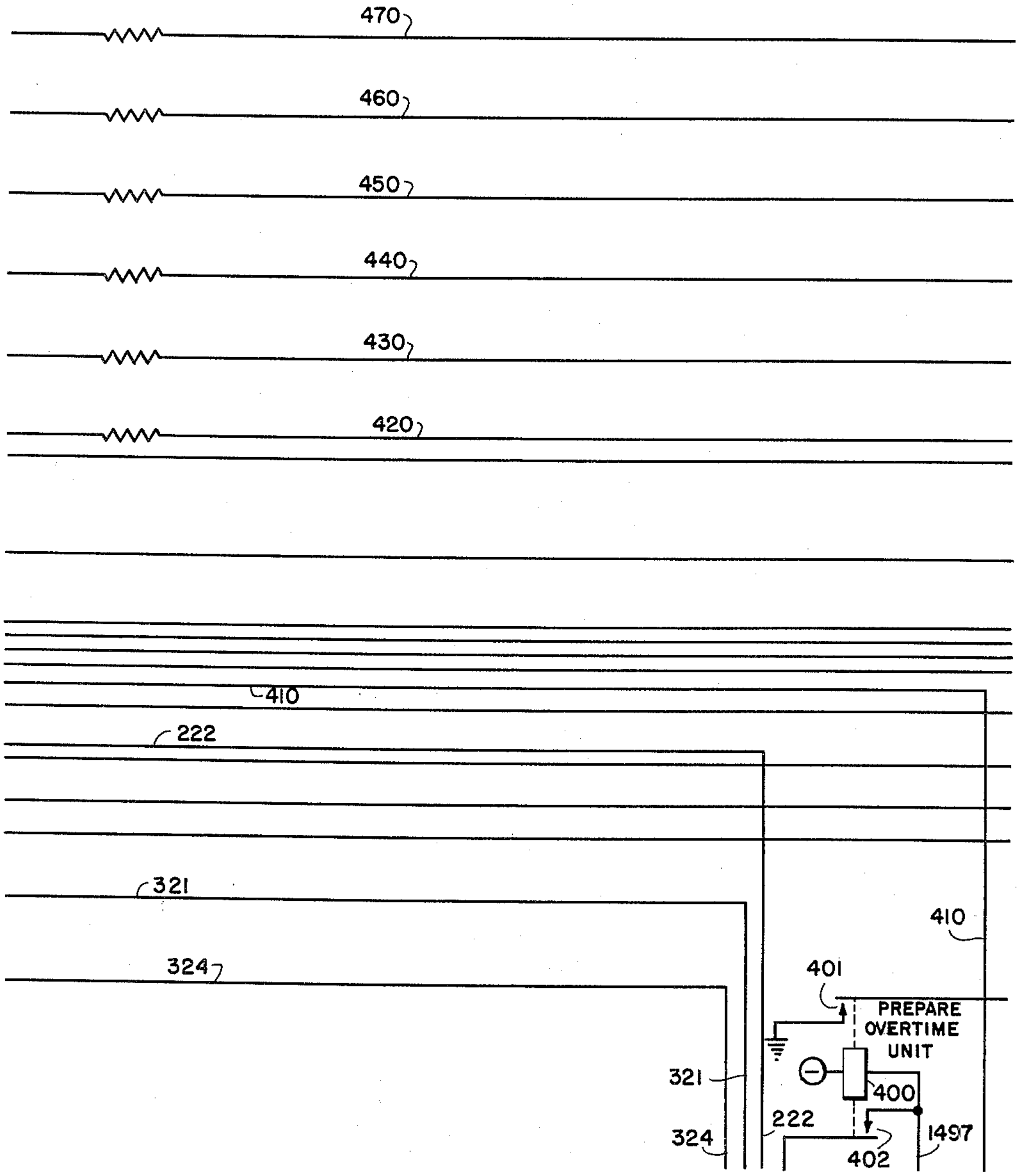

The tens dollars counting chain 250 (FIG. 2) forms a portion of the charge accumulator and consists of a cold cathode counting chain of the type shown in FIGURE 3 of the above identified Foote article in including a drive tube 251, a normally conductive blank or "0" manifesting tube 252, and a pair of digit manifesting tubes 253 and 254 representing the tens dollars digits "1" and "2." However, it should be understood that the length of the tens dollars counting chain 250 can be extended to provide for the storage of larger tens dollars values in the event that it is desirable. The control electrodes of the tubes 252, 253, and 254 are provided with a normal operating bias from a voltage divider including a pair of resistors 1101 and 1102 (FIG. 11) connected between B+ and ground. The control electrode of the drive tube 251 is normally supplied with an operating bias from a voltage divider including a pair of resistors 950 and 951, and this control electrode is further coupled to the output of the units dollars counting ring 850 through a coupling condenser 873 so that the tens dollars counting chain 250 is advanced a single step in response to each cycle of operation of the units dollars counting ring 850.

When the established charge is to be recorded, a computer stop relay 500 is operated to close a plurality of contacts 502 and 504 among others, and a second prepare-to-read relay 520 is operated to close a pair of contacts 526 among others. The closure of the contacts 502 connects a low value resistance 953 in shunt with the resistance element 951 to reduce the bias applied to the control electrodes of the drive tube 251. The closure of the contacts 504 connects a low value resistor 1102 in parallel with the resistance element 1103 to reduce the bias applied to the control electrodes of the digit manifesting tubes 252, 253, and 254. These bias reductions prevent improper operation of the chain 250 due to spurious signals which may be provided during the switching operations involved in the recording operation. The closure of the contacts 526 connects the cathodes of the tubes 522, 523, and 524 to ground to condition the conductive one of these tubes to carry an increased current for operating the recorder control relays. To provide a means for reading out the value standing in the tens dollars counting chain 250, a tens dollars relay 230 similar to the relays 210 and 810 described above is provided. Upon operation, this relay closes a plurality of contacts 231, 232, and 233, among others, to interconnect the anodes of the tubes 252, 253, and 254 with the readout cable 280 extending to the recorder control relays in the readout control circuit 106.

Following the readout operation, the tens dollars counting chain 250 is reset to its normal condition by operation of the reset relay 530 which, in operating following the release of the second prepare-to-read relay 520 and the computer start relay 500, opens a pair of contacts 534 and closes a pair of contacts 532, among others. The opening of the contacts 534 disconnects the cathodes of the tubes 253 and 254 from ground, thereby to extinguish a conductive one of these tubes, and the concurrent closure of the contacts 532 applies B+ potential to the control electrode of the normally conductive blank tube 252 to prime this tube to a conductive condition. Following the completion of the reset operation, the relay 530 is released to again connect the cathodes of the tubes 253 and 254 to the cathode of the tube 252.

*Units Dollars Counting Ring 850*

The units dollars counting ring 850 (FIG. 8) forms a part of the charge accumulator and comprises a cold cathode counting circuit of the type shown in FIGURE 3 of the above identified Foote article. The ring 850 is operated once in response to each cycle of operation of the tens cents counting ring 300 and, at the end of each cycle of operation, supplies a pulse through the coupling condenser 873 to operate the tens dollars counting chain 250. The ring 850 includes a drive tube 871, a normally conductive "0" manifesting tube 860, and a plurality of tubes 861 to 869, inclusive, representing the digits "1" to "9," inclusive. The control electrode of the drive tube 871 is normally supplied with an operating potential from the voltage divider including the resistors 950 and 951, and the control electrodes of the other tubes are supplied with an operating bias from the divider including the resistances 1101 and 1103. To drive the ring 850, the control electrode of the drive tube 751 is connected by a coupling condenser 872 to the output of the tens cents counting ring 300 so that, in response to each cycle of operation of the tens cents counting ring 300, the units dollars counting ring 850 is advanced a single step. The counting circuit is connected as a ring by a condenser 874 which couples the anode of the "9" manifesting tube 869 to the control electrode of the "0" manifesting tube 860.

When the value standing in the units dollars counting ring 850 is to be readout, the second prepare-to-read relay 520 and the computer start relay 500 are operated as described above to reduce the operating biases and to close a pair of contacts 525, among others. The contacts 525 connect the commonly connected cathodes of the tubes in the ring 850 to ground to increase the current carrying capacity thereof so as to facilitate the operation of the control relays in the readout control circuit 106. Next, a two-step units dollars relay 820 is operated to close a plurality of contacts 826, among others. The closure of these contacts interconnects the anodes of the tubes in the ring 850 with the readout cable 280 extending to the readout control circuit 160 so that the recorder 110 records the units dollars digit. Following the completion of the readout operation, the second prepare-to-read relay 520 and the computer start relay 500 are released, and the reset relay 530 is operated to open a pair of contacts 537 and to close a pair of contacts 538, among others. The opening of the contacts 537 extinguishes the conductive tube in the ring 850 by disconnecting the common connected cathodes from ground, and the closure of the contacts 538 applies B+ potential to the control electrode of the "0" manifesting tube 860 to prime this tube to its normally conductive condition. Following the completion of the resetting operation, the relay 530 is released to condition the units dollars counting ring 850 for an additional cycle of operation.

*Tens Cents Counting Ring 300*

The tens cents counting ring 300 (FIG. 3) also forms a portion of the charge accumulator and comprises a cold cathode counting circuit of the type disclosed in FIGURE 3 of the above identified Foote article. The ring 300 includes a drive tube 370 and a plurality of digit manifesting tubes 361 to 369, inclusive, and "0" respectively. The control electrodes of the remaining tubes are supplied with an operating bias by the divider including the resistances 1101 and 1103. The control electrode of the drive tube 370 is selectively provided with an operating bias through a resistor 933 connected to the output of the units cents ring 900 and with operating pulses through a condenser 934 also connected to the output of the units cents counting ring 900 so that the tens cents counting ring 300 is advanced a single step in response to each cycle of operation of the ring 900. The bias provided through the resistor 933, however, is not effective until a ground shunt for the control electrode of the drive tube 370 is removed by opening a pair of contacts 612 controlled by a prepare-to-compute relay 610. To provide means for operating the units dollars counting ring 850 in response to each complete cycle of operation, the "9" manifesting tube 369 in the ring 300 is connected to the control electrode of the drive tube 871 through the condenser 872. The anode of the "0" manifesting tube 360 is connected to the control electrode of the "1" manifesting tube 361 through a coupling condenser 371.

In addition to being cyclically operated under the control of the units cents counting ring 900, the tens cents counting ring 300 is also directly provided, by the rate circuit 1400, with digital information representing the tens cents portion of the initial charge to be assessed for a call having a duration corresponding to the base time period. More specifically, the control electrodes of the tubes 361 to 367, inclusive, are connected to a plurality of priming conductors 410, 420, 430, 440, 450, 460, and 470 which extend to the rate circuit 1400. A selected one of these priming conductors is connected to a source of B+ potential by the rate circuit 1400 in accordance with the value of the tens cents digit of the initial charge to be assessed for a call having a selected base time period. For instance, assuming that the initial charge to be made for a call is twenty cents, B+ potential is supplied by the rate circuit 1400 to the conductor 420 so that the tube 362 manifesting the tens cents digit "2" is rendered conductive. In this manner, the rate circuit 1400 selectively controls the tens cents counting ring 300 to prime a particular tube therein into a conductive condition in accordance with the value of the tens cents digit of the initial charge. In a similar manner, if the initial charge to be assessed for a call of a given base time interval is, for instance, sixty or sixty-five cents, the rate circuit 1400 applies B+ potential to the conductor 460.

The portion of the initial charge which is primed into the tens cents counting ring 300 remains unchanged if the duration of the toll call is shorter than the determined base time interval for which the initial charge is assessed. Alternatively, if the duration of the call exceeds the base time interval, the manifestation provided by firing the tube 363 or 366, as described above, is varied under the operation. At the end of the calculating operation and in the proper printing sequence, as determined by the readout control circuit 106, the tens cents counting ring 300 is conditioned to control the recorder 110 to provide a permanent record of the tens cents value standing in the ring 300.

More specifically, incident to the completion of the operation of the calculator to establish the toll charge to be assessed, the computer stop relay 500 operates to close the contacts 504 and to open a pair of contacts 501, among others. The closure of the contacts 504 reduces the biasing potential applied to the control electrodes of the counting tubes in the tens cents counting ring 300 to reduce the possibility that one of these tubes will be improperly rendered conductive. The opening of the contacts 501 disconnects the cathode of the drive tube 370 from its cathode resistor 550 to further prevent improper operation of the ring 300. To increase the current carrying capacity of the fired tube in the tens cents counting ring 300, the second prepare-to-read relay 520 is operated to close a pair of contacts 524, among others. The ground provided at the closed contacts 524 is extended to the connected cathodes of the counting tubes in the ring 300 to provide a direct ground shunt around a cathode resistor 551. In order to connect the tens cents counting ring 300 with the recorder 110, the tens cents relay 330, which is similar to the other readout relays 210, 810, 230, and 820, is operated to close a plurality of contacts 331 to connect the anodes of the tubes in the ring 300 with the readout cable 280 so that the recorder 110 is actuated to record the value of the tens cents digit standing in the tens cents register or counting ring 300.

Following the printing operation, the tens cents counting ring 300 is restored to a normal condition. More specifically and as described above, the second prepare-to-read relay 520 is released to open the contacts 524, among others, thus removing the direct ground shunt from the cathode resistor 551. Incident to the release of the second prepare-to-read relay 520, the computer stop relay 500 also releases to close the contacts 501, among others. Closing the contacts 501 connects the cathode resistor 550 to the cathode of the drive tube 370. Further, incident to the resetting operation, the reset relay 530 is operated to open a pair of contacts 531 among others. Opening the contacts 531 disconnects the cathodes of the counting tubes in the ring 300 from ground so that the fired tube therein is extinguished to restore the counting ring 300 to its normal condition.

*Units Cents Counting Ring 900*

The units cents counting ring 900 (FIG. 9) forms the lowest ordered register in the charge accumulator, is driven by pulses supplied from a pulse generator 1230, and, in turn, operates the tens cents counting ring 300 in response to the completion of each cycle of operation. Generally, the units cents counting ring 900 comprises only a single binary pair of counting tubes 920 and 930 representing "0" and "5," respectively, driven by a drive tube 910. The circuitry of tubes 920 and 930 is described in the above identified Foote article in conjunction with the binary counter shown in FIGURE 5 of this article.

More specifically, the tubes 920 and 930 include anodes commonly connected to a source of B+ potential and cathodes connected by an extinguishing condenser 922 so that, when either one of the tubes 920 or 930 is fired, a positive potential is developed across the condenser 922 which is sufficient to extinguish the then conducting tube by raising the cathode potential of the conductive tube to a point such that the potential between the cathode and anode of this tube is not sufficient to support conduction. The control electrodes of the tubes 920 and 930 are supplied with an operating potential by a voltage divider including a pair of resistors 940 and 941 connected between B+ and ground, the common point of these two resistors being connected to the control electrodes of the tubes 920 and 930 through a pair of resistors 943 and 942. In thus being provided with a suitable control electrode voltage, the tubes 920 and 930 are continuously conditioned for operation. To provide a means for pulsing or driving the binary pair comprising the tubes 920 and 930, the control electrode of each of these tubes is connected to the cathode of the drive tube 910 through a pair of coupling condensers 921 and 931.

To provide a means for driving the binary pair comprising the tubes 920 and 930, the drive tube 910 is provided. The control electrode of the drive tube 910 is normally provided with an operating bias through a resistor 952 from the voltage divider including the resistors 950 and 951. The control electrode of the drive tube 910 is also supplied with driving pulses of a predetermined frequency from a drive tube 1110 forming a part of a pulse generator 1230 so that the tube 910, in response to each applied pulse, is momentarily rendered conductive and then extinguished by relaxation. Firing the tube 910 provides a positive pulse at its cathode which is coupled through the condensers 921 and 931 to the tubes 920 and 930. This positive pulse fires the nonconductive one of these two tubes, and this tube, in being rendered conductive, provides a positive potential across the condenser 921 which extinguishes the then conductive tube so that, at any given instant, only a single one of the tubes 920 and 930 representing "0" and "5," respectively, is conducting.

To provide a means for pulsing the tens cents counting ring 300 following the receipt of two pulses representing ten cents by the units cents counting ring 900, the "5" manifesting tube 930 is provided with a pair of cathode resistors 931 and 932. When the tube 930 is first rendered conductive, the current flow through the resistors 931 and 932 provides a positive potential at the common point thereof which is extended through the resistor 933 to the control electrode of the drive tube 370. This potential, however, is not effective to bias the drive tube 370 for operation unless a prepare-to-compute relay 610 has been operated to open the contacts 612. When the drive tube 910 in the units cents counting ring 900 next operates with the "5" manifesting tube 930 in a conductive condition, the tube 920 is fired to provide a positive voltage across the condenser 922 which extinguishes the tube 930. However, in elevating the cathode potential of the tube 930, thereby to cause its extinguishment, the potential at the common point of the resistors 931 and 932 is further elevated so that a positive pulse is coupled through the condenser 934 to the control electrode of the drive tube 370 to fire this tube. Since the two pulses applied to the units cents counting ring 900 represent a cost increment of ten cents, the ten cents counting ring 300 is advanced a single step representing an accumulated charge of ten cents. The extinguishment of the "5" manifesting tube 930 also removes the enabling potential provided through the resistor 933 and thus renders the tens cents counting ring 300 nonresponsive to the next pulse supplied to the units cents counting ring 900.

To provide a means for priming the units cents counting ring 900 with information relating to the initial cost to be accessed for a toll call having a duration equal to or less than a predetermined base time interval, a pair of priming conductors 955 and 956 are provided which extend to the rate circuit 1400. If the units cents portion of the initial charge which is to be primed into the charge accumulator is five cents, the rate circuit 1400 applies B+ potential to the priming conductor 955 to fire the "5" manifesting tube 930. Rendering this tube conductive produces a potential drop across the cathode resistor 931 which is extended through the resistor 933 to condition the drive tube 370 for operation in response to the first pulse supplied to the units cents counting ring 900 from the pulse generator 1230. Further, firing the tube 930 increases the potential provided across the condenser 922 so that the "0" manifesting tube 920 is extinguished. Thus the application of B+ potential to the priming conductor 955 renders the "5" manifesting tube 930 conductive, extinguishes the "0" manifesting tube 922, and provides enabling potential across the cathode resistor 931 of the "5" manifesting tube 930 for conditioning the drive tube 370 in the tens cents counting ring 300 for operation in response to the first pulse supplied to the drive tube 910 of the units cents counting ring 900. Similarly, when the units cents portion of the initial charge to be primed into the charge accumulator is "0," the rate circuit 1400 applies B+ potential to the priming conductor 956 which fires the "0" manifesting tube 920. Firing the tube 920 increases the positive potential provided across the condenser 922 so as to extinguish the "5" manifesting tube 930. As described above, extinguishing the "5" manifesting tube 930 provides a positive pulse which is coupled through the condenser 934 to the control electrode of the drive tube 370 in the tens cents counting ring 300. However, this pulse is not effective to advance the setting of the tens cents register inasmuch as the control electrode of the drive tube 370 is connected to ground through the closed contacts 612 during operation of the rate circuit 1400.

When, at the end of the calculating operation, the value standing in the units cents counting ring 900 is to be read out, the computer stop relay 500 is operated, as described above, to close the contacts 502 so that the resistance 953 is shunted around the resistor 951 to reduce the potential applied through the resistor 952 to the control electrode of the drive tube 910. This renders the drive tube 910 not responsive to spurious pulses which may be applied to the coupling condenser 911 and thus avoids changing the setting of or the value manifested by the units cents counting ring 900 during the readout operation.

Further, as set forth above, following the operation of the computer stop relay 500, the second prepare-to-read relay 520 is operated and closes a pair of contacts 523 among others. The closure of the contacts 523 interconnects the lower operating winding of a nickel relay 1200 with the cathode of the "0" manifesting tube 920 through a conductor 957. The tube 920 and the relay 1200 provide a means for detecting whether the units cents digit to be recorded is "0" or "5." If the "0" manifesting tube 920 is conducting at this time, thus representing that the value of the units cents digit to be printed is "0," the closure of the contacts 523 completes an operating circuit for the lower operating winding of the nickel relay 1200 so that this relay operates to close a pair of contacts 1201 and to open a pair of contacts 1202. The closure of the contacts 1201 prepares a path extending to a "0" representing conductor in the readout cable 280. Alternatively, if, when the contacts 523 are closed, the "0" manifesting tube 920 is extinguished, which condition will occur when the "5" manifesting tube 930 is conductive representing that the units cents digit "5" is to be recorded, the nickel relay 1200 remains released so that the closed contacts 1202 prepare a path extending to the "5" representing conductor in the readout cable 280.

Following the prepare-to-read operations in the charge computer 108 and at the proper point in the readout program, a units cents relay 340, which is in the readout relay counting chain, is operated to close a pair of contacts 346, among others. The closure of the contacts 346 extends ground through the closed one of the pairs of contacts 1201 or 1202 to extend marking ground to the "0" representing conductor in the cable 280, if the nickel relay 1200 has been operated under the control of the "0" manifesting tube 920, or to the "5" manifesting conductor in the cable 280, if the nickel relay 1200 has not been operated due to the nonconductive condition of the "0" manifesting tube 920. The selective application of marking ground to one of these two conductors in the cable 280 operates the recorder 110 to print a "0" or a "5" as the value of the units cents digit of the calculated charge. The units cents relay 340 is released to open the contacts 346 and thus removes ground from the one of the conductors selected by the nickel relay 1200 following the completion of the printing of the units cents digit.

Following the readout operation, the computer stop relay 500 is released to open the contacts 502 to remove the shunt provided by the low value resistor 953 so as to restore an operating potential for the control electrode of the drive tube 910. The second prepare-to-read relay 530 is also released incident to the resetting operation to open the contacts 523 so as to disconnect the cathode of the "0" manifesting tube 920 from the lower operating winding of the nickel relay 1200. The release of these two relays restores the units cents counting ring 900 to its normal condition. In this connection, it should be noted that the condition to which the counting ring 900 is returned is dependent upon the condition in which the ring is left at the termination of the calculating operation. Since the ring 900 comprises only a single binary stage including the tubes 920 and 930, a selected one of these tubes is primed into a conductive condition under the control of the rate circuit 1400 incident to preparing the accumulator for computing a charge relating to the next toll call, and, accordingly, there is no need to reset the ring to any predetermined condition incident to the resetting operation.

*Overtime Interval Register 700*

Figure 5:
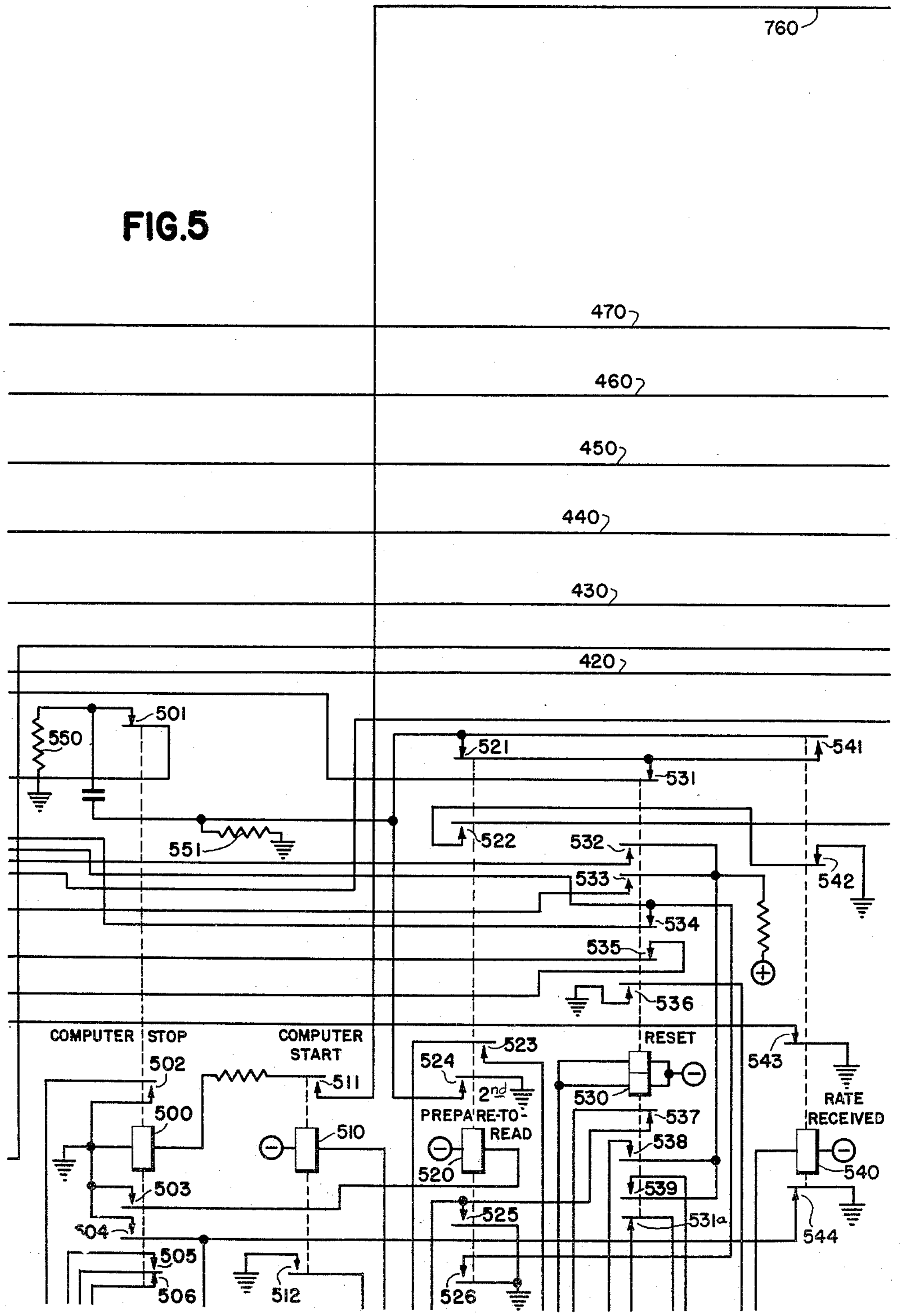
Figure 6:
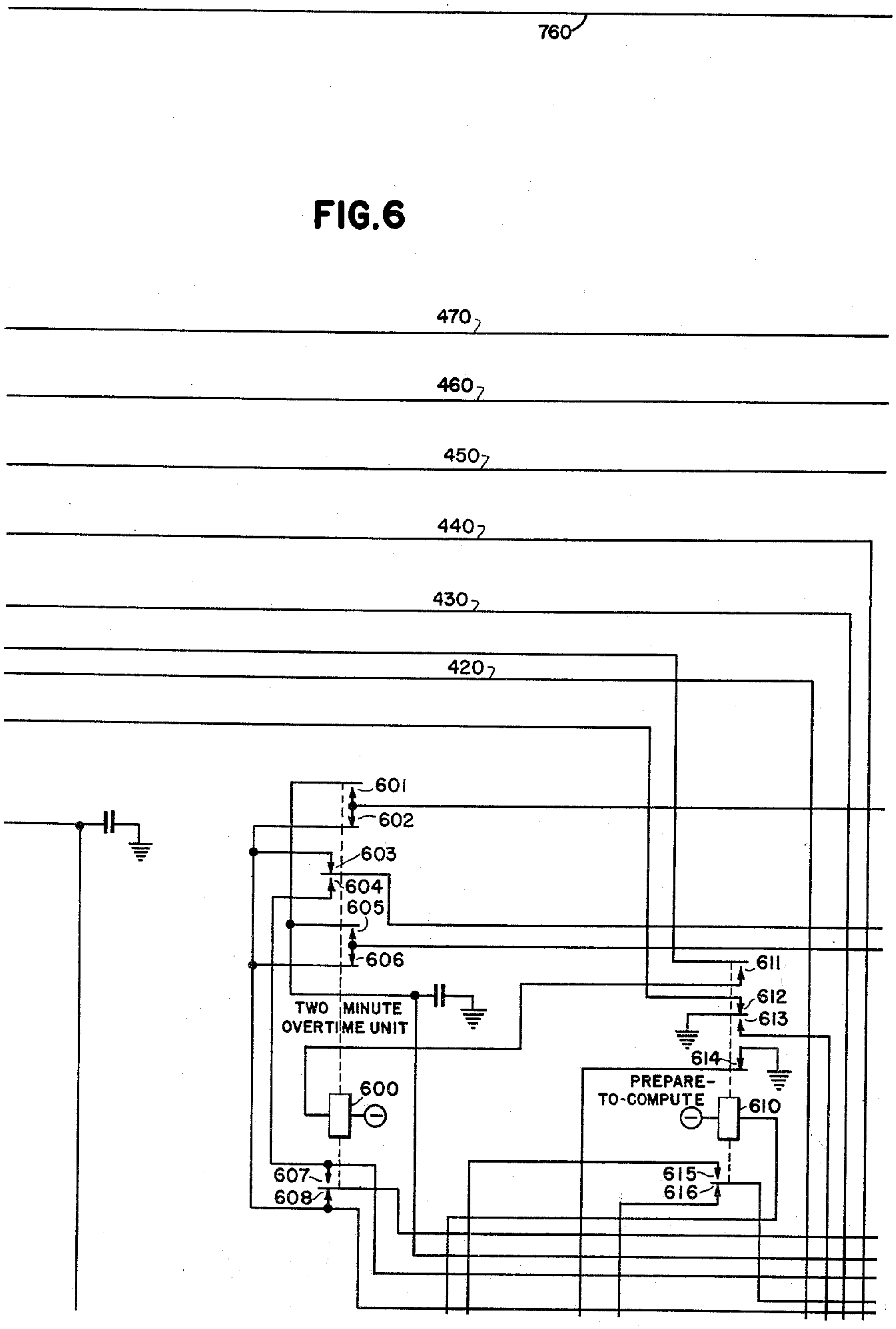
Figure 7:
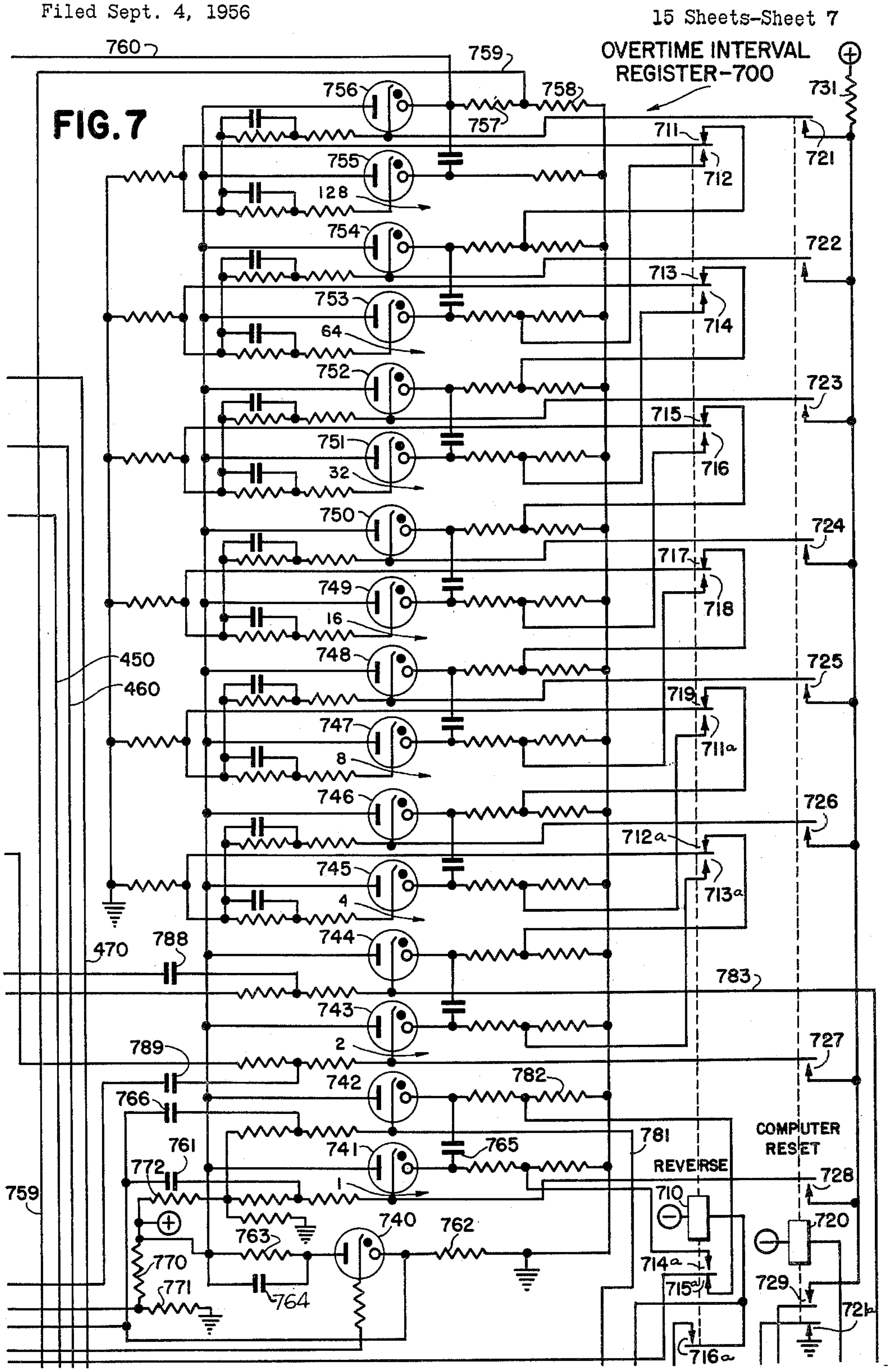

The overtime interval register 700 (FIG. 7) comprises a binary counting chain of the general type described in the above identified Foote article in conjunction with FIGURE 5 of the drawings therein, and, more specifically, comprises a reversible binary counting chain of the type described and shown in detail in the copending application of Howard L. Foote and Frank L. Morris, Serial No. 526,236, filed August 3, 1955, which application is assigned to the same assignee as the present application. The binary type overtime interval register 700 is initially provided with information representing a base time interval under the control of the rate circuit 1400 and thereafter is supplied with one minute representing pulses from a trunk recorder, such as the trunk recorder 100, concurrently with the operation of the elapsed time register 104. Accordingly, at the termination of the transmission of the duration or elapsed time pulses, the overtime interval register 700 is standing in a condition providing a manifestation representing the difference between the base time interval and the duration factor.

Following the completion of the storage of the duration information in the register 700, a calculating operation is initiated in which the overtime rate counting ring 1300, which represents a rate factor entered under the control of the rate circuit 1400, is cyclically operated in synchronism with operation of the charge accumulator through a number of cycles of operation determined by the multiplier or overtime interval factor standing in the register 700. During the duration storing operation, when the overtime unit for which an increment of charge is to be added to the initial charge primed into the charge accumulator is for other than one minute and, more specifically, for overtime intervals including an odd number of minutes, the overtime rate counting ring 1300 is utilized to enter data representing the overtime interval into the register 700 under the control of the elapsed time pulses transmitted from the seized trunk recorder. When the overtime interval register 700 has been returned to a normal condition representing zero elapsed time units, the overtime interval register 700 renders the charge computer 108 inoperative and advises the readout control circuit 106 that a printing or recording cycle of operation can be initiated.

An additional function performed by the overtime interval register 700 is that of conditioning the charge computer 108 for a cycle of calculating operation in accordance with whether the entered duration factor is less than or greater than the base time interval. More specifically, when the entered duration factor is greater than the base time interval, the overime register 700 is advanced beyond a selected normal condition incident to the entry of the elapsed time pulses and thus conditions the pulse generator 1230 for operation following the completion of the storage of the duration information in the register 700. This normal condition is also utilized to terminate operation of the calculator as described above.

The overtime interval register 700 includes a drive tube 740 and a plurality of series connected binary pairs including a plurality of tubes 741 to 756, inclusive. The tubes 741 to 756, inclusive, are connected into binary pairs as described in detail in the above identified Foote article and Foote and Morris application so that the overtime interval register 700 is capable of storing two hundred and fifty-five overtime intervals which may be of one or more minutes each. An operating potential for the control electrodes of the tubes 741 and 742 comprising the first binary pair is provided by a resistor 772 which connects these control electrodes to a source of B+ potential. The remaining binary pairs in the overtime interval register 700 are selectively provided with an operating potential from the adjacent binary pair in the manner in which the resistor 933 provides an operating potential for the control electrode of the drive tube 370 in the tens cents counting ring 300.

To provide a means for advancing the overtime interval register 700 in response to applied signals or pulses, the drive tube 740 is supplied. The anode of the drive tube 740 is connected to B+ potential through a parallel combination of a resistance 763 and a condenser 764, and the cathode of the drive tube 740 is connected to ground through a large value resistor 762. Accordingly, when a positive pulse of sufficient amplitude to ionize the drive tube 740 is applied to the control electrode thereof, a relatively large positive potential appears at the cathode of the tube 740 which is coupled to the control electrodes of the tubes 741 and 742 in the first binary stage through a pair of condensers 761 and 766. This positive pulse fires whichever of these two tubes is in a nonconductive state, and the firing of this tube provides a positive potential across a condenser 765 coupling the cathodes of the tubes 741 and 742 so that the previously conducting one of these tubes is extinquished as described above in conjunction with the description of the operation of the tubes 920 and 930 forming the units cents counting ring 900. The positive potential provided across the cathode resistor 762 of the drive tube 740 is of such a magnitude that the potential across the tube 740 will no longer maintain conduction, and, accordingly, the drive tube 760 is extinguished by relaxation.

To provide an operating bias for the control electrode of the drive tube 740 when duration data is being supplied to the overtime interval register 700, this control electrode is connected to the terminal 887 through a pair of normally closed contacts 616. Accordingly, when enabling potential is supplied to the terminal 887, as described above, to condition the elapsed time register 104 for receiving elapsed time impulses, the same enabling bias is also supplied to the drive tube 740 in the overtime interval register 700. Further, the elapsed time pulses supplied by the coupling condenser 844, in addition to being supplied to the control electrode of the drive tube 841, are also supplied through the closed contacts 616 to the control electrode of the drive tube 740 so that the overtime interval register 700 is advanced step-by-step in response to the elapsed time impulses supplied from the seized trunk recorder. Therefore, when the drive tube 740 of the overtime interval register 700 is directly supplied with mark pulses representing elapsed time, the register 700 is advanced a single step for each minute of elapsed time.

In certain applications and rate structures, it is desirable to advance the overtime interval register 700 a single step following the transmission of more than one elapsed time pulse from the seized trunk recorder so that the manifestation provided in the overtime interval register 700 represents a number of overtime units each consisting of two or more minutes. For instance, it may be desirable in some applications and rate structures to have the overtime interval register 700 provide a manifestation of the number of three minutes overtime units. To accomplish this, the drive tube 740 of the overtime interval register 700 is driven under the control of the overtime rate counting ring 1300 which in turn is directly supplied with the elapsed time impulses.

More specifically, assuming that the register 700 is to be advanced at the end of each three elapsed time pulses received from a seized trunk recorder so that the value standing in the overtime interval register 700 represents the number of three minute overtime units, a three minute overtime unit relay 1210 is operated to close a plurality of contacts 1213 and 1223 among others. The closure of the contacts 1213 interconnects the control electrode of the drive tube 740 in the register 700 with a coupling condenser 1111 connected to the cathode of the drive tube 1110. When the relay 1210 is operated, the control electrode of the drive tube 1110 is directly supplied with elapsed time pulses, and this tube serves to operate the overtime rate counting ring 1300 step-by-step so that, following the receipt of two pulses in the first cycle of operation of the ring 1300 and subsequently after the receipt of three additional elapsed time pulses, the ring 1300 supplies a positive potential to the closed contacts 1223. This potential is forwarded through a resistor 1040 to be applied to the control electrode of the drive tube 740 in the overtime interval register 700. Therefore, although a positive pulse is applied to the coupling condenser 1111 and, accordingly, to the control electrode of the drive tube 740 in response to each elapsed time pulse transmitted from the seized trunk recorder, an operating bias is supplied by the overtime rate counting ring 1300 to the control electrode of the drive tube 740 to enable this tube to respond to the pulses only following the application of first two and then three overtime impulses to the drive tube 1110. Therefore, the register 700 is advanced a single step in response to each three one minute pulses transmitted from a seized trunk recorder to the charge computer 108.

To provide a means for resetting the overtime interval register 700 following a cycle of operation and for simultaneously supplying the register 700 with data relating to one of a plurality of base time intervals which can be primed into the register 700, a computer reset relay 720 is provided. This relay is operated incident to the resetting operation of the charge computer 108 following the completion of a recording or printing cycle of operation. In operating, the computer reset relay closes a plurality of contacts 721, 722, 723, 724, 725, 726, 727, and 728 among others. The closure of the contacts 721 to 726, inclusive, connects B+ through a series resistor 731 to the control electrodes of the tubes 756, 754, 752, 750, 748, and 746 to prime these tubes to a conductive condition. In the normal or zero condition of the overtime interval register 700, the conductive pattern provided by the tubes therein is such that the tubes 742, 744, and the above identified tubes which are primed into a conductive condition by the operation of the relay 720 would be in a normal condition. However, the operation of the computer reset relay 720 does not prime the tubes 744 and 742 into a conductive condition to provide this zero or normal manifestation inasmuch as the operation of this relay is utilized to prime a base time interval of four minutes into the overtime interval register 700.

More specifically, the closure of the contacts 727 and 728 connects B+ potential to the control electrodes of the tubes 741 and 743 so that, in response to operation of the computer reset relay 720, a conductive pattern of on and off conditions is provided in the overtime interval register 700 representing the binary twos complement of a four minute base time period. With this conductive pattern primed into the register 700, it will readily be seen that, following the application of three elapsed time impulses to the control electrode of the drive tube 740, all of the even designated tubes 742, 744, 746, 748, 750, 752, 754, and 756 will be fired to provide the zero or normal manifestation of the overtime interval register 700. Although, as set for the above, the pattern primed into the register 700 by the operation of the relay 720 represents a base time interval of four minutes, the register is restored to its zero or normal condition by the application of three elapsed time impulses representing that the toll call has been maintained for a full three minutes and has entered into a fourth minute. In accordance with conventional telephone system practice, a full fourth minute increment is considered to have been utilized if the call is maintained for any length of time beyond three minutes, and, accordingly, even though the overtime interval register 700 is primed to a condition representing a four minute base time interval, the application of three elapsed time pulses to the drive tube 740 is sufficient to return the overtime interval register 700 to its normal condition.

The overtime interval register 700 further includes means for conditioning the pulse generator 1230 for operation in the event that the duration information stored in the register 700 exceeds that of the base time interval. More specifically, assuming that the base time interval is four minutes as described above and that three impulses have been supplied to the drive tube 740 representing the expiration of the third minute of the call and the beginning of the fourth minute of the call, the application of the fourth elapsed time pulse to the drive tube 740, representing the expiration of the fourth minute and the initiation of the fifth minute of time or the first minute of overtime, conditions the charge computer 108 for a multiplying operation in which the charge for the overtime interval of the call is determined and added to the initial charge for the base time period which has been primed into the charge accumulator. More specifically, this fourth pulse when applied to the drive tube 740 fires this tube to provide a positive pulse which is coupled through the condensers 761 and 766 to the tubes 741 and 742 forming the first binary pair in the register 700. This pulse places the tube 741 in a conductive condition and extinguishes the tube 742. Extinguishing the tube 742 provides a pulse which is transmitted through a pair of normally closed contacts 715*a* to render the tube 743 in the second binary stage conductive and to extinguish the then conductive tube 744. In a similar manner, all of the tubes 755, 753, 751, 749, 747, and 745 are rendered conductive to provide a manifestation that the call whose charge is to be computed has at least one unit of overtime for which an increment of charge must be added to the initial charge. This information is supplied to the charge computer 108 by conditioning for operation the pulse generator 1230 which supplies the source of clock pulses for operating the computer during a multiplying operation.

More specifically, the base electrode of a power transistor 1231 connected as an oscillator to provide pulses to an output transformer 1232 is connected to a negative potential through a pair of series connected resistors 1235 and 1236. The common point of these two resistors is connected to the common point of a pair of resistors 757 and 758 in the cathode circuit of the tube 756 in the last binary stage of the overtime interval register 700. As described above, the closure of the contacts 721 incident to a resetting operation renders the tube 756 conductive so that the current flow through the resistors 757 and 758 provides a positive potential at their common point which is applied over a conductor 759 to the common point of the resistors 1235 and 1236. This positive potential effectively disables the power transistor 1231 and, accordingly, prevents operation of the pulse generator 1230 to supply pulses for operating the charge accumulator, the overtime rate counting ring 1300, and the overtime interval register 700 during a multiplying operation. However, when as described above the first unit of overtime is registered in the overtime interval register 730, the tube 756 is extinguished and the tube 755 is fired. Extinguishing the tube 756 removes the positive potential from the conductor 759 so that a negative potential is supplied to the base electrode of the transistor 1231 to condition the pulse generator 1230 for operation.

In addition to the computer reset relay 720 which primes information pertaining to a four minute base time interval into the overtime register 700, other means are provided controlled by the rate circuit 1400 for supplying the register 700 with information pertaining to other base time intervals. More specifically, the operation of the computer reset relay 720 incident to resetting the charge computer 108 following each calculation automatically primes a four minute base interval into the register 700 as described above. However, if the base time interval is to be three minutes, B+ potential is connected to a conductor 781 by the rate circuit 1400 so that the tube 742 in the first binary pair is fired. Firing the tube 742 produces a positive potential across the cathode coupling condenser 765 to extinguish the tube 741. Rendering the tube 742 conductive also produces a positive potential drop across a cathode resistor 782 which is transmitted through the contacts 715*a* and each of a plurality of closed contacts 602 and 606 to the control electrodes of the tubes 743 and 744 forming the second binary stage. Since the tube 743 is now in a conductive condition due to the prior closure of the contacts 727, the provision of the enabling potential to the control electrodes of the tubes 743 and 744 conditions the tube 744 for being fired in response to the first pulse coupled to the drive tube 740. Accordingly, when a three minute base time interval is primed into the register 700, the tubes 742, 743, 746, 748, 750, 752, 754, and 756 are in a conductive condition. The application of two elapsed time pulses to the drive tube 720 representing the expiration of two minutes and the beginning of the third minute of the call advances the overtime interval register 700 to its normal condition in which all of the even designated counting tubes are in a conductive condition. The application of a third pulse to the drive tube 740 representing a single unit of overtime places all of the odd designated tubes in a conductive condition to prepare the pulse generator 1230 for operation.

The above described operations supplying base time intervals to the overtime interval register 700 are based on the assumption that the overtime interval register 700 is advanced in response to the application of one minute elapsed time pulses from the trunk recorder 100 directly to the drive tube 740 of the register 700 so that, upon application of pulses representing elapsed time to the overtime interval reigster 700 equaling the value of the base time interval, the register 700 is advanced to a normal condition representing "0." However, as described above, it is possible to drive the overtime interval register 700 during a duration factor entering operation under the control of the overtime rate counting ring 1300 in which the register 700 is advanced a single step following an elapsed time of more than one minute. Assuming that the base time interval to be primed into the register 700 is five minutes when each individual overtime unit is three minutes, the register 700 should be advanced to a zero condition at the expiration of the first two minute interval indicating the beginning of the third minute of the elapsed time and thereafter advanced after the expiration of each three minute interval, i.e. at the end of the fifth end eighth and the beginning of the sixth and ninth minutes of the call duration.

To provide the overtime interval register 700 with information relating to a five minute base time period when the register 700 is to store three minute overtime units, the computer reset relay 720 is operated as described above to prime a four minute base time interval into the register 700. Thereafter, the rate circuit 1400 applies B+ potential to a conductor 782 which extends to the control electrode of the tube 744, thereby to render this tube conductive and to extinguish the tube 743 which was previously fired by the closure of the contacts 727. In this condition, the application of a single pulse to the drive tube 740 of the register 700 following the receipt of the first two elapsed time pulses from the seized trunk recorder advances the register 700 to its normal condition. The receipt of a second pulse by the drive tube 740 under the control of the overtime rate counting ring 1300 advances the register 700 to a setting in which all of the odd designated tubes therein are in a conductive condition and, accordingly, removes the positive potential from the base electrode of the power transistor 1231 to indicate that a computing cycle is to be performed since an overtime unit is stored in the register 700.

During a recording operation, the direction of operation of the register 700 is reversed so that the value standing in this register representing the number of overtime units comprising the overtime interval is usually reduced by one in response to each cycle of operation of the overtime rate counting ring 1300. In this manner, the register 700 effectively operates as a multiplier register for determining the number of times that the multipicand represented by the rate factor stored in the counting ring 1300 is added to the initial charge in the charge accumulator. Accordingly, in preparing the charge computer 108 for operation, a reverse relay 710 is operated to close a plurality of contacts 712, 714, 716, 718, 711*a*, 713*a*, and 714*a* and to open a plurality of contacts 711, 713, 715, 717, 719, 712*a*, and 715*a*. The opening of the above identified contacts disconnects the control electroeds of the binary pairs from the cathode circuits of the even designated tubes in the adjacent binary stage and connects these control electrodes to the cathode circuits of the odd designated tubes in this adjacent stage so that, in response to the application of pulses to the drive tube 740, the on and off pattern of the tubes in the register 700 is advanced in a reverse direction toward the normal zero condition.

To provide means for supplying pulses to the drive tube 740 for controlling operation of the register 700 in its reverse direction, the operation of the prepare-to-compute relay 610 incident to conditioning the charge computer 108 for a multiplying cycle of operation closes a pair of contacts 615 among others so that the control electrode of the tube 740 is connected to the coupling condenser 1111 in the cathode circuit of the drive tube 1110, which tube is operated by the pulse generator 1230. To provide an enabling bias for permitting selected ones of the positive pulses provided at the cathode of the drive tube 1110 to render the drive tube 740 in the register 700 momentarily conductive when the cost per overtime unit is more than five cents, a positive potential is supplied through a resistor 1040 from the ring 1300 under the control of one or more of a group of relays 1000, 1010, and 1020 representing five cents per overtime unit, twenty cents per overtime unit, and ten cents per overtime unit, respectively. When the overtime cost increment is five cents, a voltage divider including a pair of resistors 1241 and 1242 connected between B+ potential and ground is connected to the control electrode of the drive tube 740 through a plurality of closed contacts 1220, 1025, and 1015.

The overtime interval register 700 provides means for terminating operation of the charge computer 108 when the increment of cost for each of the overtime units has been added to the initial charge in the charge accumulator. More specifically, the application of pulses to the drive tube 740 under the control of the overtime rate counting ring 1300 and the drive tube 1110 steps the register 700 in a reverse direction until such time as it is restored to its predetermined normal condition in which all of the even designated tubes are rendered conductive. The firing of the tube 756 at this time completes an operating circuit for the computer stop relay which extends through a pair of contacts 511 closed by the prior operation of a computer start relay 510. The operation of the computer stop relay 500 terminates operation of the register 700, the charge accumulator, and the overtime rate counting ring 1300. Further, in rendering the tube 756 conductive, a positive potential is again applied to the conductor 759 which extends to the base electrode circuit of the power transistor 1231, thereby to render the pulse generator 1230 ineffective to supply additional operating pulses. Accordingly, the reversible binary counting chain forming the overtime interval register 700 not only provides a means for selectively subtracting one of a number of base time intervals from an entered duration factor and means for conditioning the charge computer 108 for operation when the duration factor exceeds the base time interval but also provides means for terminating operation of the charge computer 108 when the establishment of the total charge to be assessed has been completed.

The overtime interval register 700 further provides means for controlling operation of the charge computer 108 during a multiplying cycle of operation when the lowest increment of cost which can be added to the charge accumulator, i.e. five cents, is to be added for an overtime interval representing more than one minute. As described above, when cost increments are to be supplied to the charge accumulator to be added to the initial charge therein for three minute overtime units, the overtime rate counting ring 1300 advances the register 700 after the receipt of three elapsed time pulses during a duration storage operation. However, during a calculating or multiplying operation, the overtime interval register 700 can be modified to subtract two overtime increments from the register 700 in response to the application of each five cent cost increment to the charge accumulator. More specifically, this is easily accomplished in the register 700 by the provision of a two minute overtime unit relay 600 which, when operated, effectively removes the first binary stage comprising the tubes 741 and 742 from the register 700 so that the drive tube 740 drives the second binary stage including the tubes 743 and 744. By thus removing the lowest order binary stage from the register 700, the application of each pulse to the drive tube 741 advances the register 700 in a reverse direction so as to remove two overtime units therefrom.

In operating, the cumulative overtime relay 600 opens a plurality of contacts 602, 603, 606, and 608 and closes a plurality of contacts 601, 604, 605, and 607. The opening of the contacts 608 disconnects the condenser 789 connected to the control electrodes of the tube 743 in the second binary pair from the cathode circuit of the tubes 741 and 742 in the first binary stage, and the concurrent closure of the contacts 607 connects the condenser 789 to the cathode of the drive tube 740. The opening of the contacts 603 disconnects a condenser 788 connected to the control electrode of the tube 744 from the cathode circuit of the tubes 741 and 742 in the first binary stage, and the closure of the contacts 604 connects the cathode of the drive tube 740 to this condenser. The closure of the contacts 605 and 601 connects a voltage divider including a pair of resistors 770 and 771 connected between B+ potential and ground to the control electrodes of the tubes 743 and 744 so that they are provided with an enabling bias for permitting these tubes to respond to the pules appearing at the cathode of the drive tube 740. The opening of the contacts 602 and 606 disconnects the control electrodes of the tubes 743 and 744 from the biasing paths extending to the cathode circuit of the first binary pair including the tubes 741 and 742. The drive tube 740 is provided with an enabling potential and a source of drive pulses in the same manner as described above in conjunction with the description of the operation of the register 700 during a calculating operation in which the entire chain is advanced by the drive tube 740. Accordingly, by thus removing the first binary stage from the overtime interval register 700, a single increment of cost can be added to the charge accumulator representing an overtime unit comprising more than one minute, although, due to the binary nature of the register 700, the overtime unit must include a number of minutes corresponding to one of the powers of two, e.g. 2, 4, 8, etc., in order to utilize the above described operational technique.

*Overtime Rate Counting Ring 1300*

The primary function of the overtime rate counting ring 1300 (FIG. 13) in the charge computer 108 is to provide a means for storing the cost increment which is to be added to the initial charge primed into the charge accumulator for each of the overtime units provided in the overtime interval register 700. However, in certain applications, the overtime rate counting ring 1300 is also utilized to enter certain overtime units, such as a three minute overtime unit, into the overtime interval register 700. Basically, the overtime rate counting ring 1300 comprises seven separate counting stages which are selectively connected together to form a counting ring of variable length in accordance with the rate structure or the number of minutes in an overtime unit. During a normal calculating operation, the overtime rate counting ring 1300 is operated by the pulse generator 1230 concurrently with the pulsing of the units cents counting ring 900 so that a single one of the counting stages in the overtime counting ring 1300, each of which represent a five cent increment, is operated in response to the application of each pulse to the input of the charge accumulator. The general nature of the individual counting stages and the counting ring providing the overtime rate counting ring 1300 is shown and described in detail in conjunction with the FIGURES 2 and 6 of the drawings in the above identified Foote article, and, accordingly, only a brief description of this circuitry is set forth herein.

Figure 13:
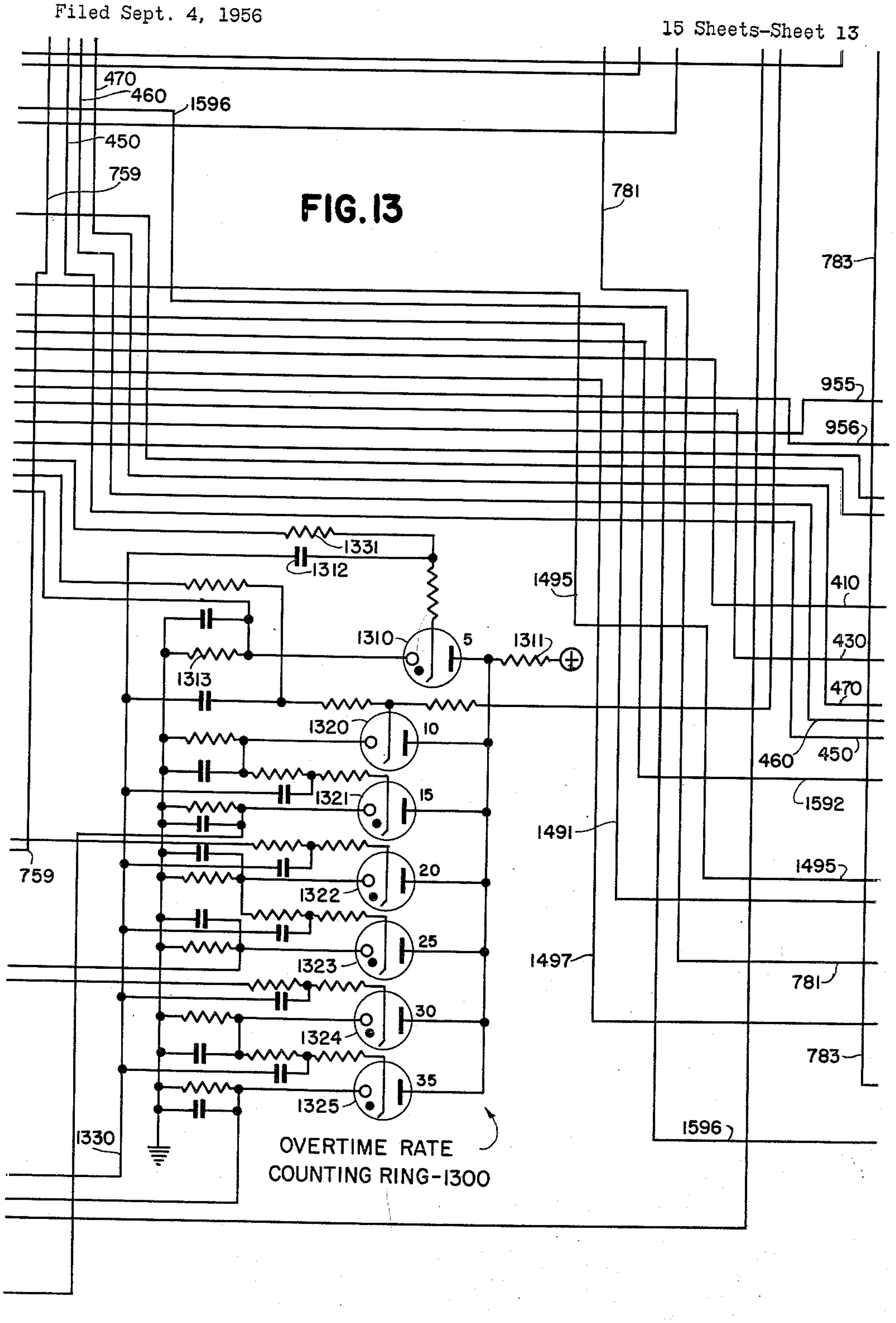
Figure 14:
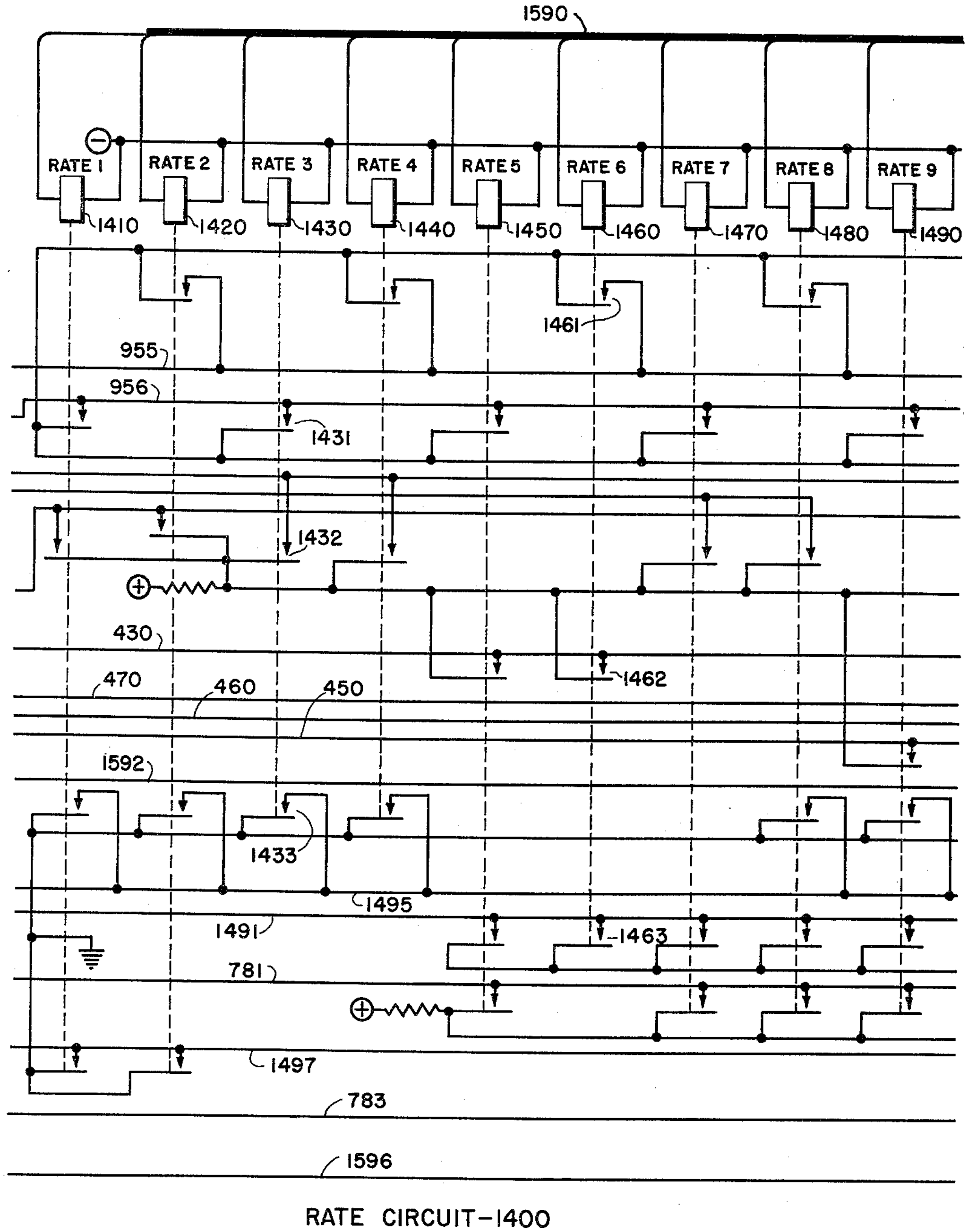
Figure 15:
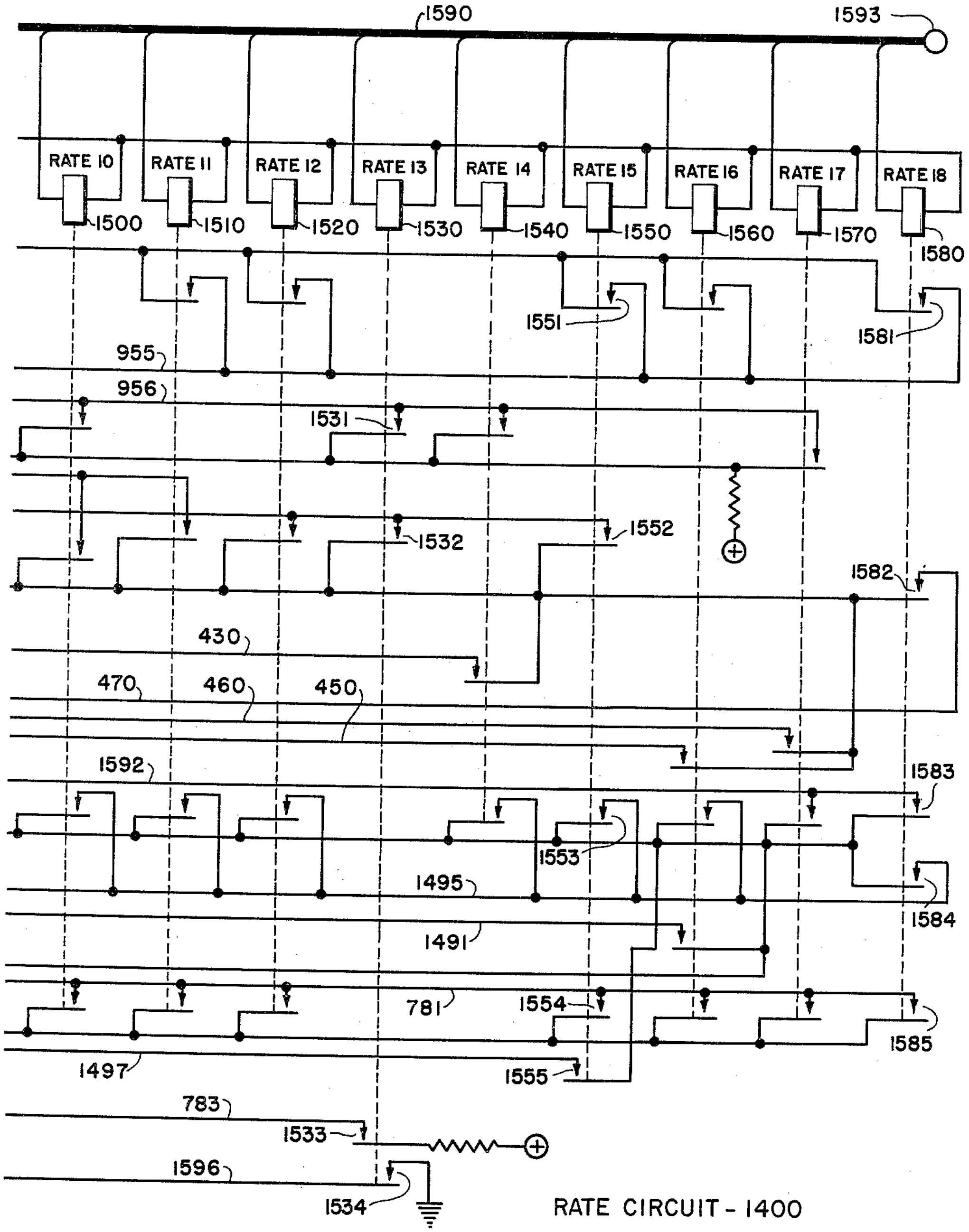

The overtime rate counting ring 1300 includes a plurality of digit manifesting tubes 1310, 1320, 1321, 1322, 1323, 1324, and 1325 representing the cents per overtime unit values of "5," "10," "15," "20," "25," "30," and "35" respectively. These tubes are provided with a common anode resistor 1311, and the control electrodes of these tubes are connected to a common pulsing conductor 1330 through a plurality of coupling condensers similar to a condenser 1312 connected to the control electrode of the five cent manifesting tube 1310. Each of the tubes in the counting ring 1300 is provided with a cathode resistor, similar to a cathode resistor 1313, for developing a positive voltage which is utilized to provide an enabling bias for another one of the tubes in the ring 1300 when the discharge device to which the cathode resistor is connected is rendered conductive. As shown in FIG. 13 of the drawings, the ten and fifteen cent manifesting tubes 1320 and 1321, the twenty and twenty-five cent manifesting tubes 1322 and 1323, and the thirty and thirty-five cent manifesting tubes 1324 and 1325 are connected together in pairs so that, for instance, the cathode resistor of the tube 1320 is connected to the control electrode of the fifteen cent manifesting tube 1321. The five cent manifesting tube 1310 is not paired with any of the other tubes in the counting ring 1300. Accordingly, by suitable switching, it is possible to connect all or any group of the tubes in the counting chain 1300 into an operative counting ring of variable length representing a cost increment of between five and thirty-five cents in accordance with the rate structure to be utilized in calculating the charge for any particular toll call.

In the normal condition of the overtime rate counting ring 1300, the ten cents manifesting tube 1320 is primed into conductive condition under the control of the computer reset relay 720, which, as described above, is operated incident to resetting the charge computer 108 to its normal condition. When this relay operates, a pair of contacts 729 are closed to connect B+ potential to the control electrode of the tube 1320, thereby rendering this tube normally conductive. Rendering the tube 1320 conductive provides a positive potential which is applied to the control electrode of the fifteen cent manifesting tube 1321, thereby to prepare this tube for being rendered conductive. When a pulse is applied to the conductor 1330 and coupled to the grid of the tube 1321, this tube becomes conductive due to the enabling bias provided by the cathode resistor of the tube 1320 and produces an increased current drain through the common anode resistor 1331 so that the anode potential supplied to all of the tubes in the counting ring 1300 is reduced below that necessary to maintain conduction through the then conducting tube. Accordingly, the tube 1320 is extinguished at this time so that only a single one of the tubes remains conducting at any given instant.

Assuming that the cost increment to be added to the charge accumulator for each overtime unit stored in the overtime interval register 700 is five cents, the rate circuit 1400 operates a five cents per overtime unit relay 1000 to actuate a plurality of contacts controlled thereby. However, the operation of the five cents per overtime unit relay 1000 alone performs no useful function with respect to the counting ring 1300 inasmuch as, as described above, each pulse supplied to the input of the units cents counting ring 900 represents a cost increment of five cents, and, accordingly, the overtime rate counting ring 1300 provides no useful function in controlling the application of pulses to the overtime interval register 700. Accordingly, when only the five cents per overtime unit relay 1000 is operated, pulses supplied by the pulse generator 1230 are simultaneously applied to the drive tube 910 of the counting ring 900 and the drive tube 740 of the overtime interval register 700 to advance these two registers a single step in response to each generated pulse inasmuch as each overtime unit represented by the pulse applied to the overtime interval register 700 represents a cost increment of five cents which is also directly represented by the pulse applied to the drive tube 910 of the units cents counting ring 900. In this connection, it will be recalled that the control electrode of the drive tube 740 in the overtime interval register 700 is provided with an operating potential by the voltage divider including the resistors 1241 and 1242.

However, assuming that a charge increment of ten cents per overtime unit is to be assessed, the rate circuit 1400 operates a ten cents per overtime unit relay 1020 to close a plurality of contacts 1027 and 1023 and to open the pair of contacts 1025. The closure of the contacts 1027 interconnects the cathode of the drive tube 1110 with the common pulsing conductor 1330, thereby to prepare a path for pulsing the tubes in the overtime rate counting ring 1300. The opening of the contacts 1025 interrupts the above described path for applying an enabling potential to the control electrode of the drive tube 740 in the overtime interval register 700. The closure of the contacts 1023 connects the control electrode of the ten cents manifesting tube 1320 with the cathode of the fifteen cents manifesting tube 1321, thereby to connect the tubes 1320 and 1321 in a closed ring. The closure of the contacts 1023 also connects the control electrode of the drive tube 740 in the overtime interval register 700 with the cathode of the fifteen cents manifesting tube 1321 so that, when this tube is rendered conductive, both the ten cents manifesting tube 1320 and the drive tube 740 are conditioned for operation in response to the next pulse supplied by the drive tube 1110.

When the computer 108 is placed in operation to render the pulse generator 1230 effective, pulses are supplied to the control electrode of the drive tube 1110, which is rendered conductive and is then extinguished by relaxation to provide a positive pulse which is transmitted over the path prepared by the closure of the contacts 1027 to the common pulsing conduction 1330. As described above, the tube 1320 is normally primed into the conductive condition incident to a reset operation so that an enabling potential is provided for the control electrode of the tube 1321. This first pulse supplied to the electrode of the tube 1321 fires this tube, extinguishes the tube 1320, and provides an enabling potential for the control electrodes of the tubes 740 and 1320. When the second pulse is supplied to the drive tube 1110, a pulse is coupled over the above identified circuit including the conductor 1330 to render the tube 1320 conductive and to extinguish the tube 1321. Further, a pulse is transmitted through the coupling condenser 1111 to the control electrode of the drive tube 740 so that this tube is fired. Since the register 700 has been conditioned for operation in the reverse direction by operation of the relay 710, the register 700 is advanced a single step in a reverse direction to effectively subtract one overtime unit from the value standing in the register 700. Accordingly, when the ten cents per unit overtime unit relay 1020 is operated, two tubes 1320 and 1321 in the counting ring 1300 are connected in a closed ring which provides an enabling potential to the drive tube 740 in the register 700 once in response to each cycle of operation.

In a similar manner, assuming that a fifteen cent cost increment is to be added to the charge in the accumulator for each overtime unit stored in the register 700, the rate circuit 1400 simultaneously operates the ten cents per overtime unit relay 1020 and the five cents per overtime relay 1000. In operating, the relay 1000 closes a pair of contacts 103 to interconnect the control electrode of the ten cents manifesting tube 132 with the cathode of the five cents manifesting tube 1310. The closure of the contacts 1004 in response to operation of the five cents per overtime unit relay 1000 connects the control electrode of the five cents manifesting tube 1310 with the cathode of the fifteen cents manifesting tube 1321, thereby to connect the tubes 1310, 1320, and 1321 in a closed ring representing a cost increment of fifteen cents. However, the opening of the contacts 1005 interrupts the above described path for providing an enabling bias for the control electrode of the drive tube 740 extending to the cathode of the fifteen cents manifesting tube 1321, but an enabling potential is provided therefor through the closed contacts 1003 from the cathode of the five cents manifesting tube 1310. Since the cycle of operation of the three tubes 1310, 1320, and 1321 connected in the closed ring comprising the effective counting ring 1300 begins from the ten cents manifesting tube 1320, an enabling potential is provided at the control electrode of the drive tube 740 following the application of the first two pulses to the overtime rate counting ring 1300. The transmission of the third pulse to the drive tube 1140 by the pulse generator 1230 fires the ten cents manifesting tube 1320, extinguishes the five cents manifesting tube 1310, and fires the drive tube 740 to subtract a single overtime unit from the overtime interval stored in the register 700. In this manner, connecting three tubes in the overtime rate counting ring 1300 into a closed ring causes three pulses representing five cent increments to be applied to the charge accumulator representing the fifteen cent charge for the single overtime unit subtracted from the value stored in the register 700.

In a similar manner, when the charge increment to be assessed for each overtime unit stored in the register 700 is twenty cents, the rate circuit 1400 operates a twenty cents per overtime unit relay 1010 so that the tubes 1320, 1321, 1322, and 1323 are connected in a closed ring and so that the control electrode of the drive tube 740 in the overtime interval register 700 is supplied with an enabling potential from the cathode of the twenty-five cents manifesting tube 1323. Thus, in response to the application of four pulses, each representing a five cent cost increment, to the charge accumulator, the four selected tubes in the overtime rate counting ring 1300 are advanced through a cycle of operation beginning at the normally conductive ten cents manifesting tube 1320, and the overtime interval register 700 is advanced a single step in a reverse direction to effectively subtract one overtime unit therefrom. Similarly, when the cost increment to be added to the charge accumulator for each overtime unit stored in the register 700 is twenty-five cents, the rate circuit 1400 operates the five cents per overtime unit relay 1000 and the twenty cents per overtime unit relay 1010 so that the tubes 1310, 1320, 1321, 1322, and 1323 are connected in a closed ring for cyclic operation and the control electrode of the drive tube 740 in the register 700 is connected to the cathode resistor 1313 of the five cents manifesting tube 1310. Accordingly, in response to each five pulses applied by the pulse generator 1210 to the drive tube 1110, the selected tubes in the overtime rate counting ring 1300 are advanced through a cycle of operation, five pulses are supplied to the charge accumulator to add a twenty-five cent cost increment htereto, and the overtime interval register 700 is advanced a single step in a reverse direction to remove one overtime unit therefrom. In a similar fashion, when the charge to be assessed for an overtime unit is thirty cents, the rate circuit 1400 operates the relays 1010 and 1020 so that the tubes 1320, 1321, 1322, 1323, 1324, and 1325 are connected in a closed ring, and the control electrode of the drive tube 740 is connected to the cathode resistor of the tube 1325. Then, with this condition established in the charge computer 108, the application of six pulses to the drive tube 1110 adds a thirty cent cost increment to the charge accumulator, advances the counting ring 1300 through a complete cycle of operation of the selected tubes therein, and advances the overtime interval register 700 a single step to subtract a single overtime unit. When the cost increment for an overtime unit to be charged is thirty-five cents, the rate circuit 1400 operates all of the relays 1000, 1010, and 1020 so that all of the tubes 1310, 1320, 1321, 1322, 1323, 1324, and 1325 are connected in a closed ring, and the control electrode of the drive tube 740 in the register 700 is connected to the cathode of the drive tube 310. In this operative condition of the charge computer 108, the application of seven pulses from the pulse generator 1230 to the drive tube 1110 adds a thirty-five cent cost increment to the charge accumulator, advances all of the tubes in the counting ring 1300 through a complete cycle of operation, and subtracts the single overtime unit from the overtime interval register 700.

As set forth above, in applications where the overtime unit for which a cost increment is to be added to the accumulated charge comprises a plurality of minutes, the overtime rate counting ring 1300 is adjusted to provide a closed counting ring including a number of counting stages corresponding to the number of minutes in the overtime unit, and the elapsed time impulses provided by the seized trunk recorder are coupled to the drive tube 1110 so that, under the control of the overtime rate counting ring 1300, a single pulse is supplied to the overtime interval register 700 during a duration factor storing operation only at the end of an elapsed time period corresponding to the multiple minute overtime unit. Assuming that the overtime unit for which an increment of cost is to be charged is three minutes, the rate circuit 1400 operates a three minute overtime unit relay 1210 and the five cents per overtime unit relay 1000. The operation of these relays connects the cathode of the fifteen cents manifesting tube 1321 with the control electrode of the five cents manifesting tube and also connects the cathode of the tube 1321 with the control electrode of the drive tube 740 in the overtime interval register 700. The operation of these relays further disconnects the enabling potential provided at the terminal 887 and the source of elapsed time pulses supplied at the coupling condenser 844 from the control electrode of the drive tube 740 and connects them to the control electrode of the drive tube 1110 so that the elapsed time pulses are supplied to this drive tube. In addition, the operation of these relays prepares another pulsing path including the condenser 1111 for supplying pulses to the drive electrode of the tube 740.

Accordingly, when elapsed time pulses are supplied to the elapsed time register 104 and the charge computer 108, the drive tube 1110 is intermittently fired to supply pulses both to the common pulsing conductor 1330 extending to the overtime rate counting ring 1300 and through the condenser 1111 to the control electrode of the drive tube 740. The first elapsed time impulse applied to the drive tube 1110 fires the tube 1321 and extinguishes the normally conductive tube 1320. Firing the tube 1321 provides an enabling bias for both the tube 1310 in the counting ring 1300 and the drive tube 740 in the overtime interval register 700. When the second elapsed time pulse is applied to the drive tube 1110, the tube 1321 is extinguished, the tube 1310 is fired, and the drive tube 740 in the register 700 is fired to advance the overtime interval register 700 a single step in a forward direction. Thereafter, the application of each group of three elapsed time pulses to the drive tube 1110 advances the overtime rate counting ring 1300 through a cycle of operation of the selected tubes 1310, 1320, and 1321 therein and advances the overtime interval register 700 a single step.

It should be noted that the register 700 is advanced its first step in response to the receipt of two elapsed time pulses representing the expiration of the first two minute interval and the beginning of the timing of the third minute interval and is thereafter advanced in response to the receipt of three elapsed time pulses representing an elapsed time of three minutes. This operation of the overtime interval register 700 is consistent with conventional telephone practice inasmuch as the expiration of two minutes of a three minute overtime unit requires the establishment of a charge for a full overtime unit. The overtime rate counting ring 1300, by advancing the register 700 a single step following the expiration of the first two minute interval and thereafter at the expiration of full three minute overtime units, thus provides a correct manifestation in the overtime interval register 700 of the number of overtime units for which charges are to be assessed without requiring the provision of additional readout means for the overtime rate counting ring 1300 for checking this ring at the completion of an elapsed time pulsing operation to determine whether two or more minutes in the next overtime unit have been stored so as to cause the addition of another overtime unit to the overtime interval register 700. Accordingly, therefore, the overtime rate counting ring 1300, when connected to control the entrance of multiple minute overtime units into the overtime interval register 700, advances the register 700 when the first partial chargeable portion of an overtime unit has been supplied and thereafter operates the register 700 only at the end of full overtime units to effectively determine whether the last overtime unit in the duration factor is of sufficient length to be chargeable without requiring the provision of readout equipment for determining the stored partial portion of the overtime unit following a data storing operation.

*Rate Circuit 1400*

The rate circuit 1400 (FIGS. 14 and 15) is selectively operated under the control of the rate marking circuit 112 to provide the charge computer 108 with information relating to the rate structure which is to be utilized in establishing each toll charge, the rate structure being utilized in conjunction with the duration factor supplied by the elapsed time pulses transmitted from the seized trunk recorder. The rate circuit 1400 is momentarily operated under the control of the rate marking circuit 112 preceding the transmission of the duration information to the charge computer 108 and is thereafter released and again called into operation following the completion of the calculating operation to establish the rate factor which is to be utilized in establishing charges for the next succeeding toll call.

More specifically, the rate circuit 1400 essentially consists of a plurality of rate relays 1410, 1420, 1430, 1440, 1450, 1460, 1470, 1480, 1490, 1500, 1510, 1520, 1530, 1540, 1550, 1560, 1570, and 1580 connected to the rate marking circuit 112, which is of the type shown in the above identified copending Clement et al. application by a cable 1590 connected to a terminal 1593. These relays represent the eighteen rate structures shown in the table in FIG. 16, and, although only eighteen separate rate structures are shown therein, it should be understood that numerous other rate structures can be provided in accordance with operating company requirements.

The rate structure provided by the circuit 1400 includes an initial charge to be assessed for a call having a duration equal to or less than a base time interval which is directly primed into the charge accumulator; the base timt interval which is primed into the register 700; the length of the overtime unit for which a cost increment is to be added to the initial charge; and the cost increment to be charged for each overtime unit which is stored by connecting a selected number of the counting stages in the ring 1300 into a closed ring.

More specifically, assuming that rate structure three is to be utilized by the charge computer 108 in establishing a charge, the rate marking circuit 112 connects ground to the conductor in the cable 1590 which is connected to the operating winding of the rate three relay 1430, thereby operating this relay to close a plurality of contacts 1431, 1432, and 1433. The third rate structure, as shown in the table in FIG. 16 of the drawings, comprises a four minute base time interval for which a twenty cent charge is to be assessed and an overtime unit of one minute for which a charge of five cents is to be made. The closure of the contacts 1431 connects B+ potential to the conductor 956 which, as described before, extends to the control electrode of the "0" manifesting tube 920 in the units cents counting ring 900, thereby priming this tube into a conductive condition to represent a units cents digit "0." The closure of the contacts 1432 connects B+ potential to the conductor 420 which extends to the control electrode of the "2" manifesting tube 362 in the ten cents counting ring 300 to fire this tube. Conjointly, the fired tubes in the units cents counting ring 900 and the ten cents counting ring 300 manifest an initial charge of twenty cents. The five cent charge per unit of overtime is established in the charge computer 108 by the closure of the contacts 1433 to apply ground to the conductor 1495 which extends to the operating winding of the five cents per overtime unit relay 1000, thereby operating this relay. Since the base time interval for which the initial charge is to be assessed is four minutes, and since, as described above, the operation of the computer reset relay 720 incident to resetting the charge computer 108 to a normal condition automatically primes the four minute base time interval into the overtime interval register 700, the operation of the rate three relay 1430 does not supply additional base time information. Further, the operation of the rate three relay 1430 does not provide specific information relating to the length of the overtime unit inasmuch as the charge computer 108 is normally conditioned for operation with overtime units each comprising one minute. Accordingly, the operation of the rate three relay supplies the charge computer 108 with all of the necessary information relating to base time interval, initial charge, length of the overtime unit, and the rate at which a charge is to be made for each overtime unit.

As a further example, if the rate structure at which a toll charge is to be established is rate eighteen, the rate marking circuit 112 applies ground to a conductor in the cable 1590 extending the operating winding of the rate eighteen relay 1580 so that this relay operates to close a plurality of contacts 1581, 1582, 1583, 1584, and 1585. To prime the initial charge into the charge accumulator in the amount shown in FIG. 16, the closure of the contacts 1581 connects B+ potential to the priming conductor 955 to fire the "5" manifesting tube 930 in the units cents counting ring 900, and the closure of the contacts 1582 connects B+ potential to the priming conductor 470 to fire the "7" manifesting tube 367 in the ten cents counting ring 300, thereby providing a manifestation of an initial charge of seventy-five cents in the charge accumulator. To provide the overtime interval register 700 with information relating to the base time period for which the initial charge is to be made, the closure of the contacts 1585 connects B+ potential to the primining conductor 781, thereby to fire the tube 742 in the register 700 which, as described above, primes a base time interval of three minutes into this register. Since, as shown in FIG. 16 of the drawings, a cost increment of twenty-five cents is to be added to the initial charge for each one minute overtime unit, the closure of the contacts 1584 connects ground to the conductor 1495 to operate the five cents per overtime unit relay 1000. The closure of the contacts 1583 applies ground to a conductor 1592 which extends to the operating winding of the twenty cents per overtime unit relay 1010, thereby to operate this relay. The conjoint operation of the relays 1000 and 1010 connects five counting stages in the overtime rate counting ring 1300 in a closed ring, as described above, so that a twenty-five cent cost increment is added to the initial charge in the charge accumulator for each step of operation of the overtime interval register 700. Since the overtime unit in rate structure eighteen comprises only a single minute, and since the charge computer 108 is normally conditioned for operation in conjunction with one minute overtime units, the operation of the rate eighteen relay 1580 does not supply additional information representing this portion of the rate structure to the charge computer 108.

*Operation of The Charge Computer 108 To Establish a Charge for a Typical Toll Call When The Rate Structure Includes a One Minute Overtime Unit*

Assuming that a toll charge is to be calculated for a telephone call having a duration of eighteen minutes in accordance with rate structure or factor six, as shown in the table in FIG. 16, the sixth rate structure comprises an initial charge of thirty-five cents for a call having a duration equal to or less than a base time interval of four minutes and an additional charge of ten cents for each one minute of the overtime interval. Accordingly, the total charge to be assessed for a call of eighteen minutes duration is the total of thirty-five cents for the base time interval and one dollar and forty cents for the overtime interval, or one dollar and seventy-five cents.

The duration information is stored on the magnetic tape of the trunk recorder, such as the trunk recorder 100, in the form of a group of seventeen mark pulses representing that the toll call extended more than seventeen or eighteen minutes. Further, as described in detail in the above identified copending Clement et al. application, the trunk recorder 100 further has stored therein, in the form of the groups of mark pulses representing the called office code digits, at least a portion of the information necessary to establish or select the sixth rate factor. In response to seizure of the trunk recorder under the control of the playback control circuit 102 and the readout control circuit 106 as described above, movement of the magnetic tape in the trunk recorder 100 is initiated so that the called office code digits are transmitted to the called office register 116 and stored therein. Following the storage of this information, the office code interpreter circuit 114 is placed in operation to establish a portion of the necessary controls for determining the rate factor at which the charge for the call is to be assessed. The playback control circuit 102 or the readout control circuit 106 supply the rate marking circuit 112 with the remaining necessary information for selecting the sixth rate structure. In response to the completion of the determination of this information, ground is applied by the rate marking circuit 112 to the conductor in the cable 1590 which is connected to the operating winding of the rate six relay 1460 so that this relay operates to close a plurality of contacts 1461, 1462, and 1463. The operation of the rate six relay 1460 in the rate circuit 1400 advises the charge computer 108 that the sixth rate structure is to be utilized in establishing the toll charge to be assessed.

More specifically, to provide the initial charge of thirty-five cents which is to be assessed for a call having a base time period of four minutes, the closure of the contacts 1461 connects B+ potential to the conductor 955 which extends to the control electrode of the "5" manifesting tube 930 in the charge accumulator, thereby rendering this tube conductive. In being rendered conductive, a positive potential is developed across the cathode resistor 931 which is applied through the resistor 933 through the control electrode of the drive tube 370 in the tens cents counting ring 300. However, this potential does not enable the counting ring 300 inasmuch as the control electrode of the drive tube 370 is connected to ground at the closed contacts 612 on the prepare-to-compute relay 610. The closure of the contacts 1462 connects B+ potential to the priming conductor 430 which is connected to the control electrode of the "3" manifesting tube 363 in the tens cents counting ring 300. This priming potential renders the tube 363 conductive to manifest the value of the tens cents digit of the initial charge. Accordingly, the closure of the contacts 1461 and 1462 primes the charge accumulator to provide a manifestation of the thirty-five cent initial charge. Since the overtime interval register 700 is normally primed to a condition representing a four minute base time interval, the operation of the rate six relay 1460 does not supply base period or interval information to the register 700. More specifically, the computer reset relay 720 is operated incident to clearing the charge computer 108 and in doing so closes the contacts 721, 722, 723, 724, 725, 726, 727, and 728 so that the tubes 756, 754, 752, 750, 748, 746, 743, and 741 are primed to a conductive condition which, as described in detail above, provides an on-off conduction pattern representing a base time interval of four minutes.

As shown in the table in FIG. 16 of the drawings, the overtime unit consists of a one minute for which a ten cent charge is to be added to the initial charge in the cost accumulator, but, since the charge computer 108 is normally conditioned for operation with one minute overtime units, the operation of the rate six relay 1460 does not provide this information to the charge computer 108. However, the operation of the relay 1460, in closing the contacts 1463, applies ground to a conductor 1491 which extends to the operating winding of the ten cents per overtime unit relay 1020, the operation of which signifies that a charge increment of ten cents is to be added to the initial charge for each overtime unit.

More specifically, in operating, the ten cents per overtime unit relay 1020 closes a plurality of contacts 1021, 1022, 1023, 1026, 1027, and 1028 and opens a plurality of contacts 1024, 1025, and 1029. The closure of the contacts 1021 completes a holding circuit for the relay 1020 extending to ground at a pair of normally closed and grounded contacts 721*a* controlled by the computer reset relay 720. The closure of the contacts 1023 connects the cathode of the fifteen cents manifesting tube 1321 in the overtime rate counting ring 1300 with the control electrode of the ten cents manifesting tube 1320 over a circuit including the closed contacts 1023, 1013, and 1005. The closure of the contacts 1027 interconnects the cathode of the drive tube 1110 with the common pulsing conductor 1330. The opening of the contacts 1025 disconnects the voltage divider, including the resistance 1241 and 1242, from a partially prepared circuit for applying an enabling bias to the control electrode of the drive tube 741, which circuit is also interrupted at a pair of open contacts 615. However, the closure of the contacts 1023 also connects the cathode of the fifteen cents manifesting tube 1321 to the open contacts 615 through a circuit including the closed contacts 1023, 1013, 1005, and 1224 and the series resistor 1040. This circuit is now interrupted at the open contacts 615 but is subsequently completed incident to the initiation of a multiplying operation of the charge computer 108 so as to provide an enabling bias for the drive tube 740 in the overtime interval register 700 to permit this register to be operated in response to each cycle of operation of the selected counting stages in the overtime rate counting ring 1300. The opening of the contacts 1024 and 1029 together with the closure of the contacts 1028 and 1026 perform no useful function at this time.

The closure of the contacts 1022 completes an obvious operating circuit for a rate received relay 540, the operation of which indicates that rate information has been received by the rate circuit 1400. In operating, the rate received relay 540 closes a pair of contacts 541 and opens a plurality of contacts 542, 543, and 544. The opening of the contacts 543 interrupts a partially prepared circuit controlled by the tens cents relay 330 for providing a "0" marking condition representing the value of the tens cents digit during a readout operation if rate information has not been received by the computer 108. The operation of the rate received relay 540 thus indicates that the value of the tens cents digit to be printed during readout is to be determined by the setting of the ring 300. The opening of the contacts 542 interrupts, at an additional point, a circuit interrupted at the open contacts 522 for artificially operating the nickel relay 1200 so that, during a readout operation, an arbitrary "0" condition is not established representing the value of the units cents digit. This again indicates that rate information has been received from the rate circuit 1400 so that the value of the units cents digit to be recorded during a readout operation is to be determined by the value standing in the units cents counting ring 900.

The closure of the contacts 541 provides an alternative circuit shunted around the normally closed contacts 521 for connecting the common cathode resistor 551 to the cathodes of the counting tubes in the ring 300. The opening of the contacts 544 disconnects the shunting resistance element 1102 from ground so that the potential supplied by the divider including the elements 1101 and 1103 to the control electrodes of the counting tubes in the tens dollars counting chain 250, the units dollars counting ring 850, and the tens cents counting ring 300 is increased to condition the charge accumulator for operation. As described above, the units cents counting ring 900 is continually provided with adequate operating potentials for the control electrodes of the tubes 920 and 930 by the voltage divider including the resistances 940 and 941.

Accordingly, in response to operation of the rate six relay 1430, the initial charge of thirty-five cents is primed into the rings 300 and 900 in the charage accumulator; the tens cents per overtime unit relay 1020 is operated to connect the tubes 1320 and 1321 in the overtime rate counting ring 1300 into a closed ring representing the cost increment of ten cents to be assessed for each one minute overtime unit; and the rate received relay 540 is operated to indicate that the rate information has been received by the charge computer. The operation of this latter relay conditions the necessary counting chains in the charge accumulator for operation and interrupts circuits for arbitrarily supplying units and tens cents digits "0" to the readout cable 280 during a readout of the charge computer 108 when rate information is not received. Following the establishment of this information in the charge computer 108, the rate marking circuit 112 removes ground from the operating winding of the rate six relay 1460, thereby releasing this relay to open the contacts 1461, 1462, and 1463. The opening of the contacts 1461 and 1462 removes the priming potentials from the above identified tubes to permit normal operation of the units cents counting ring 900 and the tens cents counting ring 300. The opening of the contacts 1463 removes ground from the conductor 1491, but the tens cents per overtime unit relay 1020 remains operated over the above described holding circuit and, in remaining operated, holds the rate received relay 540 operated.

During the translation of the called office code digits in the interpreter circuit 114 and the operation of the rate marking circuit 112 and the rate circuit 1400 to supply rate factor information to the charge computer 108, the additional items of information stored in the trunk recorder 100 are transmitted to the register circuits (not shown) associated with the readout control circuit 106 and the recorder 110 so that these items are stored to permit their subsequent recording by the recorder 110. Incident to the seizure of the trunk recorder 100 and the playback control circuit 102, the readout control circuit 106 supplies a suitable operating potential to the terminal 291 which is connected to the control electrodes of the tubes in the tens minutes counting chain 200 and the units minutes counting ring 800 to condition these counting chains for operation in accordance with the elapsed time pulses stored in the seized trunk recorder 100. Further, the readout control signal 106 provides a suitable potential at a terminal 290 for enabling operation of the drive tube 270 in the tens minutes counting chain 200, as described above. When the space or control pulse immediately preceding the group of seventeen mark pulses representing the duration factor of eighteen minutes is transmitted, a steering circuit (not shown) supplies an enabling potential to the terminal 887 which is connected to the control electrode of both the drive tube 841 in the units minutes counting ring 800 and the drive tube 740 in the overtime interval register 700. Accordingly, the group of seventeen pulses is applied to these drive tubes through the coupling condenser 844 and, in the case of the drive tube 740, through the normally closed contacts 1215 and 616.

To provide a manifestation of the duration of the toll call, the first pulse supplied to the control electrode of the drive tube 841 momentarily fires this tube to extinguish the normally conductive "1" manifesting tube 831 and to fire the "2" manifesting tube 832, as described above, so as to provide a manifestation of a call duration of two minutes. In a similar manner, the remaining elapsed time pulses are applied to the drive tube 841 to sequentially advance the units minutes counting ring 800 so that, in response to the receipt of the ninth mark pulse, the "9" manifesting tube 839 is extinguished and the "0" manifesting tube 840 is fired. Extinguishing the "9" manifesting tube 839 provides a positive pulse which is coupled through the condenser 842 to momentarily fire the drive tube 270 in the tens minutes counting chain 200. Firing the tube 270 extinguishes the normally conductive blank tube 260 and fires the "1" manifesting tube 261 in the tens minutes counting chain 200. The tenth pulse supplied to the drive tube 841 extinguishes the "0" manifesting tube 840 and fires the "1" manifesting tube 831 by means of the pulse coupled through the condenser 843. The remaining seven pulses are supplied to the drive tube 841 to advance the units minutes counting ring 800 to a position in which the "8" manifesting tube 838 is conducting representing a units minutes digit "8." When considered in conjunction with the fired "1" manifesting tube 261 in the tens minutes counting chain 200, the elapsed time register 104 provides a manifestation of an elapsed time of eighteen minutes under the control of the group of seventeen mark pulses applied to the coupling condenser 844 from the seized trunk recorder 100.

In addition to operating the elapsed time register 104, the group of seventeen mark pulses are applied, as described above, to the drive tube 740 of the overtime interval register 700 to advance this register in a forward direction to a setting corresponding to the difference between the four minute base time period primed into the register 700, as described above, and the duration factor. Since the duration of the call is eighteen minutes and the base time period is four minutes, the overtime interval register 700 is advanced to a manifestation representing fourteen minutes which, since the overtime unit utilized in the sixth rate structure is one minute, represents fourteen overtime units for which charge increments must be added to the initial charge primed into the charge accumulator by the rate circuit 1400. At this time and as described above, the tubes 741, 743, 746, 748, 750, 752, 754, and 756 are in a conductive condition.

Accordingly, when the first one of the seventeen mark pulses representing the duration factor is applied to the control electrode of the drive tube 740, this tube is momentarily rendered conductive to supply a positive pulse from the cathode resistor 762 through the coupling condensers 761 and 766 to the control electrodes of the tubes 741 and 742 forming the first binary stage in the overtime interval register 700, these control electrodes being normally provided with an operating potential from the resistance element 772. The tube 741 is in a conductive condition so that the application of the positive pulse to the control electrode of this tube produces no useful function. However, the positive pulse supplied through the condenser 766 fires the tube 742 so that a positive potential is developed across the cathode coupling condenser 765 to extinguish the conductive tube 741. Rendering the tube 742 conductive provides a positive voltage drop across the cathode resistor 782 which is supplied through the normally closed contacts 606 and 602 to the control electrodes of the tubes 743 and 744 forming the second binary stage in the overtime interval register 700, thereby to prepare this binary stage for operation in response to the next pulse applied to the drive tube 740.

The second pulse applied to the drive tube 740 provides a positive pulse which is coupled through the condensers 761 and 766 to fire the tube 741 and to extinguish the tube 742 due to the positive potential provided on the cathode thereof by the coupling condenser 765. This positive potential also provides a positive going pulse which is transmitted through the closed contacts 715*a* and each of the closed contacts 603 and 608 to be applied by the coupling condensers 788 and 789 to the control electrodes of the tubes 743 and 744. As described above, these two tubes have previously been provided with an enabling potential from the cathode resistor 782 so that this positive pulse fires the tube 744 which in turn extinguishes the tube 743 and provides a positive enabling potential which is coupled through the normally closed contacts 712*a* to the control electrodes of the tubes 745 and 746 forming the third binary pair in the overitme interval register 700.

The third pulse supplied to the drive tube 741 fires the tube 742 and extinguishes the tube 741 so that once again an enabling potential for the tubes 743 and 744 is provided by the cathode resistor 782. Firing the tube 742 places all of the even designated tubes in the overtime interval register 700 in a conductive condition, in which condition the manifestation provided by the overtime interval register 700 is "0." It will be noted that in this condition in which each of the even designated tubes in the binary pairs is conductive, an enabling potential is coupled through the plurality of contacts 711, 713, 715, 717, 719, 712*a*, and 714*a* to the next adjacent binary pair so that, in response to the next pulse supplied to the drive tube 740, all of the even designated tubes in the register 700 will be extinguished and all of the odd designated tubes will be rendered conductive. Further, it will be noted that the application of three elapsed time pulses representing the expiration of three minutes and the initiation of the fourth minute of the call completes the removal of the four minute base time interval so that the next pulse applied from the seized trunk recorder to the drive tube 740 representing the first minute of the overtime interval will advance the overtime interval register 700 into a setting corresponding to a single overtime unit. Accordingly, when the next mark pulse is supplied to the control electrode of the tube 740, all of the even designated tubes, such as the tube 741, are rendered conductive, and all of the even designated tubes, such as the tube 742, are extinguished so as to provide a manifestation representing a single overtime unit.

This resetting of the overtime interval register 700 is utilized to condition the pulse generator 1230 for operation and thus indicates to the charge computer 108 that, following the completion of the storage of the duration factor in the overtime interval register 700, a multiplying cycle of operation is to be initiated to add cost increments to the initial charge primed into the charge accumulator in accordance with the number of overtime units forming the overtime interval. More specifically, in extinguishing the tube 756, the positive potential provided across the cathode resistor 758 is removed from the conductor 759 so that the base element of the power transistor 1231 is returned to the negative potential supplied by the series connected resistors 1235 and 1236. However, the oscillator of which the power transistor 1231 forms a part is not placed in operation at this time but merely is conditioned for operation.

Since the fourth pulse in the group of seventeen mark pulses representing the call duration factor of eighteen minutes advances the register 700 to a condition in which all of the odd designated tubes are conductive, thus manifesting a single overtime unit, the application of the remaining thirteen pulses of this group advance the register 700 to a condition in which the tubes 742, 743, 746, 748, 749, 751, 753, and 755 are conducting. This pattern of on and off conditions in the overtime interval register 700 represents fourteen separate overtime units of one minute which corresponds to the difference between the base time period of four minutes and the duration factor of eighteen minutes which has been entered in accordance with the group of seventeen mark pulses stored on the magnetic tape in the seized trunk recorder 100. The completion of the storage of the duration factor in the overtime interval register 700 terminates the provision of all of the necessary factors for determining the toll charge.

The charge computer 108 stands in the above described condition until such time as all of the items of information pertaining to the toll call whose charge is to be established by the charge computer 108 have been transmitted from the trunk recorder 100 and stored in the necessary register. Upon the completion of these functions and as described in detail in the above indentified copending Clement et al. application, the readout control circuit 106 supplies ground to a prepare-to-read conductor which is connected to a terminal 885 (FIG. 8). The application of ground to this terminal completes an obvious operating circuit for the prepare-to-read relay 310 so that this relay operates to close the contacts 311, 312, and 313. The closure of the contacts 311 applies ground to the common cathodes of the tubes in the tens minutes counting chain 200 in the elapsed time register 104 to condition the now conductive "10" manifesting tube 261 therein for carrying a heavy enough current to operate the associated recorder control relay in the readout control circuit 106. Similarly, the closure of the contacts 313 applies ground to the common cathode connection for counting tubes in the units minutes counting ring 800 so that the now conducting "8" manifesting tube 838 is conditioned to carry a sufficient current for operating the associated recorder control relay in the readout control circuit 106 during a printing or recording operation. The closure of the contacts 312 applies ground to the operating winding of a prepare-to-compute relay 610, the operation of which conditions the charge computer 108 for a calculating cycle of operation.

In operating, the prepare-to-compute relay 610 closes the contacts 611, 613, 614, and 615 and opens the contacts 612 and 616. The opening of the contacts 612 removes the ground applied to the control electrode of the drive tube 310 in the tens cents counting ring 300 so that this counting ring can be operated under the control of pulses supplied by the units cents counting ring 900. The closure of the contacts 611 prepares an operating circuit for a two minute overtime unit relay 600, which circuit is interrupted at the open contacts 401. The opening of the contacts 614 interrupts, at an additional point, a holding circuit for the three minute overtime unit relay 1210, and the opening of the contacts 616 interrupts the above described path for applying elapsed time mark pulses to the control electrode of the drive tube 740 in the overtime interval register 700. The closure of the contacts 615 interconnects the control electrode of the drive tube 740 with the cathode of the drive tube 1110 through the coupling condenser 1111 and also completes the above described circuit extending to the cathode of the fifteen cents manifesting tube 1321 for providing an enabling potential for this drive tube in response to each cycle of operation of the selected counting stages in the overtime rate counting ring 1300. This conditions the overtime interval register 700 for sequential operation under the control of the drive tube 1110 and the pulse generator 1230. The closure of the contacts 613 completes an obvious operating circuit for the reverse relay 710.

The operation of the reverse relay 710, which conditions the overtime interval register 700 for operation in a reverse direction under the control of the drive tube 1110, opens the contacts 711, 713, 715, 717, 719, **712*a*, and 715*a* and closes the contacts 712, 714, 716, 718, 711*a*, 713*a*, 714*a*, and 716*a*. The opening of the contacts 711, 713, 715, 716, 717, 719, 712*a*, and 715*a* interrupts the circuits described above whereby the even designated tubes, such as the tube 742, in the first binary stage in the register 700 controls the sequential operation of the second binary stage including the tubes 743 and 744, and the closure of the contacts 712, 714, 716, 718, 711*a*, 713*a*, and 714*a* conditions the odd designated tubes, such as the tube 741, in the first binary stage for controlling successive operation of the adjacent binary stage such as the stage including the tubes 743 and 744. By thus reversing the pulsing and biasing connections of the adjacent binary stages in the register 700, this register is conditioned for operation in a reverse direction in response to intermittent operation of the drive tube 740**.

The closure of the contacts **716*a* completes an obvious operating circuit for a computer start relay 510 extending through the closed contacts 716*a* to the closed and grounded contacts 613. The operation of the computer start relay closes a plurality of contacts 511 and 512. The closure of the contacts 511 interconnects the operating winding of a computer stop relay 500 with the cathode of the tube 756 in the last binary stage in the overtime interval register 700 over a conductor 760. As described above, the tube 756 is now extinguished so that the closure of the contacts 511 does not operate the computer stop relay 500 at this time but rather prepares a subsequent operating circuit for this relay which is effective to terminate the cycle of multiplying operation of the charge computer 108. However, if the duration factor to be entered in the typical call described above was equal to or less than four minutes, the tube 756 would be in a conductive condition at this time, and the closure of the contacts 511 would complete an operating circuit for the computer stop relay, the operation of which would terminate further operation of the charge computer. Since the operation of the computer 108 would be terminated at this time, the charge standing in the charge accumulator would comprise the initial charge of thirty-five cents primed therein by the rate circuit 1400, and, accordingly, thirty-five cents would be printed as the charge to be assessed for the toll call. However, as described above, the tube 756 is extinguished at this time, and the operating circuit for the computer stop relay 500** is not completed.

The closure of the contacts 512 in response to the operation of the computer start relay 510 applies ground to the emitter electrode of the power transistor 1231, thereby placing the oscillator of which the power transistor 1231 forms a part in operation to deliver pulses to a secondary winding 1232*a* of the coupling transformer 1233. Although positive going pulses of any suitable periodicity or frequency can be supplied, the pulse generator 1230 preferably is adjusted to provide output signals at a frequency of approximately eighty-five pulses per second. It should be noted that applying ground to the emitter electrode of the power transistor 1231 in response to the operation of the computer start relay 510 would not render the pulse generator 1230 operative to supply output pulses of the desired frequency to the secondary winding 1232*a* of the output transformer 1232 unless the tube 756 had previously been extinguished to remove the positive potential supplied to the base electrode thereof over the conductor 759, as described above.

The initiation of the operation of the pulse generator 1230 initiates a calculating operation which comprises the multiplication of the entered duration factor stored in the overtime interval register 700 by the rate factor stored in the overtime rate counting ring 1300, the product of which is added to the initial charge primed into the charge accumulator by the rate circuit 1400, as described above. In essence, the technique utitlized in this multiplying operation is to enter the rate factor stored in the overtime rate counting ring 1300 into the charge accumulator a number of times determined by the value standing in the overtime interval register 700. Accordingly, the first pulse supplied by the pulse generator 1230 is coupled through a condenser 1233 and a pair of normally closed contacts 1217 to the control electrode of the drive tube 1110. This control electrode is normally supplied with an operating potential through a series resistor 1234 which is connected to the voltage divider including the resistances 750 and 751. Accordingly, the first pulse supplied to the drive tube 1110 renders this tube momentarily conductive to provide a positive pulse which is simultaneously coupled through a pair of normally closed contacts 1218 and the condenser 911 to the control electrode of the drive tube 910 in the units cents counting ring 900, through the coupling condensers 1111 and the closed contacts 615 to the control electrode of the drive tube 740 in the overtime interval register 700, and through the closed contacts 1027 to the common pulsing conductor 1330.

The pulse supplied to the control electrode of the drive tube 740 in the register 700 is ineffective to fire the tube 740 inasmuch as no enabling potential is provided for the control electrode thereof. The positive pulse supplied through the condenser 911 to the control electrode of the drive tube 910 momentarily energizes the tube 910 to provide a positive pulse which is coupled through the condensers 921 and 931 to the control electrodes of the tubes 920 and 930 to fire the tube 920 so that a positive potential is provided across the condenser 922 for extinguishing the then conducting tube 930. The positive potential appearing at the cathode of the "5" manifesting tube 930 which extinguishes this tube also is coupled through the condenser 934 to the control electrode of the drive tube 370 in the tens cents counting ring 300, this tube formerly being provided with an enabling potential due to the potential drop across the cathode resistor 931. This positive pulse momentarily renders the drive tube 370 conductive so that a positive pulse is supplied to the common cathodes of the tubes in the counting ring 300, thereby to extinguish the then conducting tube 363 representing the tens pulse at the anode of this tube which is coupled to the control electrode of the "4" manifesting tens cents tube 364 so as to fire this tube. Accordingly, the first pulse representing a five cent increment of cost supplied under the control of the pulse generator 1230 renders the "0" manifesting tube in the units cents counting ring 900 and the "4" manifesting tube 364 in the tens cents counting ring 300 conductive to provide a manifestation of forty cents in the charge accumulator.

The first pulse provided by the momentary operating of the drive tube 1110 is also coupled over the common pulsing conductor 1330 to the control electrodes of all of the tubes in the overtime rate counting ring 1300. As described above, the ten cents manifesting tube 1320 is normally conductive so that a positive enabling potential is supplied to the control electrode of the fifteen cents manifesting tube 1321. Accordingly, the first pulse supplied by the drive tube 1110 renders the tube 1321 conductive and, by virtue of the common anode resistor 1311 extinguishes the tube 1320. Rendering the tube 1321 conductive provides a positive potential which is returned through the closed contacts 1023, 1013, and 1005 to be applied to the control electrode of the ten cents manifesting tube 1320, thereby conditioning this tube for operation in response to the next pulse supplied to the conductor 1330. The positive potential provided across the cathode resistor of the tube 1321 is further extended through the closed contacts 1224, the series resistor 1014, and the closed contacts 615 to provide an enabling potential for the control electrode of the drive tube 740 in the register 700.

When the next pulse supplied by the pulse generator 1230 momentarily fires the drive tube 710, a positive pulse is coupled to the control electrode of the drive tube 910 in the units cents counting ring 900 so that the "0" manifesting tube 920 is extinguished and the "5" manifesting tube 930 is fired to provide an enabling potential for the control electrode of the drive tube 370 in the tens cents counting ring 300. The pulse supplied through the coupling condenser 1111 fires the drive tube 740 so that a positive pulse is supplied through the coupling condensers 761 and 766 to the control electrodes of the tubes 741 and 742 forming the first binary stage in the register 700. As described above, the tube 742 is conductive and the tube 741 is extinguished so that the positive pulse supplied by the condenser 761 fires the tube 741 to extinguish the tube 742. Firing the tube 741 also provides a positive potential across its cathode resistor which is coupled through the closed contacts 714*a* and the closed contacts 602 and 606 to the control electrodes of the tubes 743 and 744 forming the second binary stage. Accordingly, following the application of two pulses to the units cents counting ring 900 representing a cost increment of ten cents which is added to the initial charge of thirty-five cents to provide a manifestation of forty-five cents standing in the charge accumulator, a single overtime unit of one minute is subtracted from the number of the overtime units stored in the overtime interval register 700 by firing the tube 741 and extinguishing the tube 742. Thus, the addition of a single ten cent increment of cost to the charge accumulator results in the subtraction of a single overtime unit from the register 700 in accordance with the rate structure shown in conjunction with the sixth rate in the table in FIG. 16 of the drawings.

The positive pulse provided at the cathode of the drive tube 1110 in response to the second pulse supplied by the pulse generator 1230 is also coupled over the common pulsing conductor 1330 to the control electrode of the tubes in the counting ring 1300. However, only the control electrode of the ten cents manifesting tube 1320 is provided with an enabling potential so that the positive pulse provided on the conductor 1330 fires the tube 1320 and extinguishes the tube 1321. Extinguishing the tube 1321 removes the enabling potential from the control electrode of the drive tube 740, and firing the tube 1320 provides an enabling potential for the control electrode of the tube 1321.

To complete the calculation of the charge to be assessed for the call, the pulse generator 1230 supplies twenty-six additional pulses to the drive tube 1110 representing the additional thirteen overtime units standing in the register 700. These twenty-six pulses intermittently and sequentially operate the units cents counting ring 900, the tens cents counting ring 300, and the units dollars counting ring 850 so that, at the termination of the twenty-sixth pulse, the "1" manifesting tube 861 in the units dollars counting ring 850, the "7" manifesting tube 367 in the tens cents counting ring 300, and the "5" manifesting tube 930 in the units cents counting ring 900 are all in a conductive condition representing a total charge to be assessed of one dollar and seventy-five cents. These pulses are also utilized to cyclically operate the overtime rate counting ring 1300 so that, in response to each two of these applied pulses, the drive tube 740 in the overtime interval register 700 is operated to step the binary counting stages in a reverse direction. In response to the transmission of the twenty-sixth pulse, all of the even designated tubes in the register 700 are rendered conductive and all of the odd designated tubes are rendered nonconductive, thus representing the subtraction of all of the stored overtime units from the overtime interval register 700. The restoration of the register 700 to its normal or "0" condition terminates the multiplying cycle of operation of the charge computer 108.

More specifically, when the tube 756 is rendered conductive, a positive potential is developed across the cathode resistor 758 which is extended over the conductor 759 to be applied to the base terminal of the power transistor 1231, thereby disabling the pulse generator 1230 to prevent it from supplying additional pulses through the coupling condenser 1233 to the drive control electrode of the drive tube 1110. Simultaneously therewith, the firing of the tube 756 completes a conductive circuit including the conductor 760 and the closed contacts 511 to the operating winding of the computer stop relay 500 so that this relay operates as an indication that the multiplying cycle of operation of the computer 108 is to be terminated.

The operation of the computer stop relay closes the contacts 502, 503, 504, and 505 and opens the contacts 501 and 506. The closure of the contacts 502 grounds the resistor 953 which is connected to the common point of the voltage divider including the resistors 950 and 951 so as to reduce the potential supplied through the resistor 952 to the control electrode of the drive tube 910 in the units cents counting ring 900, thereby rendering the drive tube 910 not responsive to spurious signals which may be supplied through the coupling condenser 911. Reducing this potential also reduces the enabling potential supplied to the drive tubes 871, 251, 1110, and 370 to prevent improper operation thereof. The opening of the contacts 501 disconnects the cathode of the drive tube 370 in the tens cents counting ring 300 from the common cathode circuit for the remaining tubes in the ring 300. The closure of the contacts 504 grounds the resistor 1102 connected to the voltage divider including the resistors 1101 and 1103 so that the enabling potential provided for the counting tubes in the tens cents counting ring 300, the units dollars counting ring 850, and the tens dollars counting chain 250 is reduced to a point at which the tubes are not responsive to spurious impulses, thereby to prevent inadvertent operation of these registers to an incorrect manifestation of the charge to be assessed incident to the readout operation. The opening of the contacts 506 disconnects a pair of terminals 882 and 883 which are connected to the readout control circuit 106 to advise this circuit that the operation of the charge computer 108 to establish the charge to be assessed has been completed and that the recording cycle of operation may be initiated. The concurrent closure of the contacts 505 connects the terminal 882 to a terminal 881 which is connected to the first two-step relay in the readout counting chain, thereby to condition this group of readout relays for sequential operation so that each of the registers associated with the readout control circit 106 is sequentially connected with this circuit to control the operation of the recorder 110.

The closure of the contacts 503 completes an obvious operating circuit for a second prepare-to-read relay 520. In operating, the relay 520 opens the contacts 521 and closes the contacts 522, 523, 524, 525, and 526. The opening of the contacts 521 interrupts one path for connecting the cathode resistor 551 to the cathodes of the counting tubes in the tens cents counting ring 300, but the closed contacts 541 maintain the connection between the resistor 551 and these cathodes. The closure of the contacts 522 completes a portion of the above described operating path for the upper winding of the nickel relay 1200, but this circuit is interrupted at the open contacts 542. The closure of the contacts 524 applies ground to the commonly connected cathodes in the counting ring 300 so that the "7" manifesting tube 367 is conditioned to carry an increased current. The closure of the contacts 525 applies ground to the commonly connected cathodes of the tubes in the units dollars counting ring 850 so that the conductive "1" manifesting tube 861 therein is conditioned to carry an increased current during the readout operation. The closure of the contacts 526 supplies ground to the commonly connected cathodes of the tubes 252, 253, and 254 in the tens dollars counting chain 250, thereby to condition the normally conductive blank tube 252 for passing an increased current. The blank relay 252, which is normally primed into a conductive condition incident to resetting the charge computer 108, remains conductive at this time inasmuch as the total charge to be assessed for the call does not include a significant digit in the tens dollars order.

The closure of the contacts 523 interconnects the lower winding of the nickel relay 1200 with the cathode of the "0" manifesting tube 920 in the units cents counting ring 900. Since the tube 920 is extinguished, the nickel relay 1200 is not operated by the closure of the contacts 523, and, accordingly, the contacts 1202 controlled thereby remain closed to condition a circuit for causing the units digit "5" to be recorded during a readout operation. Accordingly, in response to the operation of the computer stop relay 500 and the second prepare-to-read relay 520, the charge computer 108 is prepared for a readout cycle of operation by conditioning the charge accumulator including the chain 250 and the counting rings 300, 850, and 900 for providing adequate current for controlling the recording control relays in the readout control circuit 106 and by preparing an operating circuit for the nickel relay 1200. Further, the operation of the computer stop relay 500 advises the readout control circuit 106 that a recording cycle of operation may be initiated, and, in closing the contacts 505, prepares a circuit for extending an operating circuit to the first two-step relay in the readout relay counting chain.

As described in the above identified copending Clement et al. application, the values standing in the plurality of registers associated with the readout control circuit 106 are readout by sequentially connecting the anodes of each of the gas tube registers to a group of common recording control magnets in the readout control circuit 106 so that the recorder 110 is sequentially operated to record the digits and alphabetical characters forming the stored information.

When the readout of the information in the elapsed time register 104 and the charge computer 108 is to be initiated, the preceding relay in the readout relay counting chain interconnects a pair of terminals 880 and 298 so that resistance ground, which is supplied to a terminal 294, is extended over a circuit including a plurality of normally closed contacts 345, 337, 327, 825, 238, 223, and 815 and the contacts controlled by the preceding relay in the readout relay chain to be applied to the operating winding of the two-step tens minutes readout relay 210, thereby partially operating this relay to close a plurality of preliminary make type contacts 214 and 216 and to open a plurality of preliminary break type contacts 213 and 217. The closure of the contacts 216 effectively shunts the contacts controlled by the preceding relay in the readout relay counting chain to extend the resistance ground directly to the winding of the two-step relay 210, thereby to maintain this relay operated. The closure of the contacts 214 connects a terminal 296 with the operating winding of the relay 210 to prepare a full operating circuit therefor. The opening of the contacts 217, which are connected to a terminal 297 connected to contacts controlled by the preceding relay in the readout relay counting chain, and the opening of the contacts 213 interrupt series preliminary and full operating circuits for all of the relays in the readout relay counting chain so that only the relay 210 is conditioned for full operation.

When the preceding relay in the readout relay counting chain is released to disconnect the contacts 880 and 298 among other functions, the relay 210 remains operated over the holding circuit completed by the closure of the contacts 216. The release of this relay further supplies direct ground to the terminal 296 for fully operating the relay 210 so that the plurality of contacts similar to the contacts 211 and 212 are closed, and a pair of contacts 215 are closed. The closure of the contacts 215 completes a preliminary operating circuit for the two-step units minutes relay 810 extending over the path described above including the normally closed contacts 223, 238, and others to the terminal 294 which is provided with resistance ground. Completion of this preliminary operating circuit closes a plurality of preliminary make contacts 813 and 814 and opens a plurality of preliminary break contacts 812 and 815. The closure of the contacts 814 connects the winding of the relay 810 to the source of resistance ground provided on the circuit including the normally closed contacts 223 and the others described above, and the closure of the contacts 813 prepares a full operating circuit for the units minutes relay 810 extending to the now open contacts 213.

The closure of the contacts similar to the contacts 211 and 212 interconnects the anodes of the counting tubes in the tens minutes counting chain 200 with the readout cable 280. As described above, the readout cable 280 is connected to the recorder control relays in the readout control circuit 106 so that, since the "1" tens minutes manifesting tube 261 has been rendered conductive, the closure of the contacts 211 completes an operating circuit extending from ground through the conductive tube 261, the closed contacts 211, and the cable 280 to the operating winding of the recording control relay in the readout control circuit 106. The operation of this control relay causes the recorder 110 to print or otherwise record the tens minutes digit "1" on the record medium. Incident to the recording of this information, the readout control circuit 106 under the control of the recorder 110 removes direct ground from the series circuit extending to the terminal 296 so that the relay 210 is released. In releasing, the relay 210 disconnects the tens minutes counting chain 200 from the readout cable 280, and, in closing the contacts 213, completes a full operating circuit extending through the closed contacts 813 for the partially operated two-step units minutes relay 810, thereby causing this relay to fully operate to close a plurality of contacts similar to the contacts 816 and a pair of contacts 811.

The closure of the contacts 811 prepares a preliminary operating circuit for a carriage return relay 220. The closure of the contacts 816 interconnects the anodes of the tubes forming the units minutes counting ring 800 with the readout cable 280. As described above, the "8" manifesting tube 838 in the units minutes counting ring 800 is conducting so that the interconnection of the anode of this tube with the readout cable 280 operates the readout control circuit 106 and the recorder 110 to print a units minutes digit "8" adjacent the previously recorded tens minutes digit "1" to provide a representation of an elapsed time of eighteen minutes in accordance with the above described operation of the elapsed time register 104 to store this item of information. Incident to recording the units minutes digit, ground is again removed from the terminal 296 to release the relay 810. In releasing to disconnect the ring 800 from the cable 280, the relay 810 closes the contacts 812 to prepare a full operating circuit for the relay 220.

When ground is reapplied to the terminal 296, the relay 220 fully operates in the manner described above in conjunction with the operation of the relays 210 and 810 so that a pair of contacts 221 is closed and the contacts 223 are opened. The closure of the contacts 221 applies ground to a conductor 222 which extends to the readout control circuit 106 through the cable 280 to operate a carriage return relay therein. The operation of the carriage return relay in the readout control circuit 106 causes the recorder 110 to perform a carriage return operation so that the elapsed time infomation is recorded as a separate line or entry on the record medium.

Following the carriage return operation, the carriage return relay 220 is operated, and the tens dollars relay 230, which is the next relay in the readout relay counting chain, is operated to close the contacts 231, 232, and 233, and to open the contacts 238, among others. The closure of the contacts 231, 232, and 233 interconnects the anodes of the tubes forming the tens dollars counting chain 250 with the readout cable 280. Since the blank tube 252 is conductive at this time, the closure of the contacts 233 applies ground to a blank control conductor in the cable 280 to cause the recorder 110 to perform a line space operation incident to which the tens dollars relay 230 is released. The release of the tens dollars relay 230 completes an operating circuit for the units dollars relay 820. In operating, the relay 820, which is the next relay in the readout relay counting chain, operates to close a plurality of contacts 826 and to open the contacts 825, among others. The closure of the contacts 826 interconnects the anodes of the tubes forming the units dollars counting ring 850 with the readout cable 280. The "1" manifesting tube 861 in the ring 850 is conducting at this time, and, accordingly, the closure of the contacts 826 interconnects this tube with the cable 280 so that the recorder 110 records a units dollars digit "1." Incident to the recording of this digit, the relay 820 is released to complete a full operating circuit for a period relay 320 which, in operating, closes a plurality of contacts 322 and 325 and opens the contacts 327, among others.

The closure of the contacts 325 and 323 applies ground to a pair of conductors 321 and 324 which in turn are connected to a pair of the digit representing conductors provided in the cable 280. The application of ground to these two digit manifesting conductors operates a pair of recording control relays in the readout control circuit 106 to cause the recorder 110 to record a period immediately following the recorded units dollars digit "1," thereby to separate the dollars and cents portion of the calculated charge. Incident to recording the period, the relay 320 is released to complete a full operating circuit for the tens cents relay 330.

In operating, the tens cents relay 330 opens the contacts 337 and closes the plurality of contacts 331 and 332 so that the anodes of the tubes forming the tens cents counting ring 300 are connected with the readout cable 280. As described above, the "7" manifesting tube 367 in the counting ring 300 is conducting at this time, and, accordingly, the recorder 110 is operated to record a tens cents digit "7" immediately adjacent the recorded period entry. In the event that rate information had not been received by the calculator 108 so that all of the tubes in the ring 300 are extinguished, the rate received relay 540 would be released and the closure of the contacts 332 would complete a circuit for extending ground from the closed contacts 543 to the "0" representing conductor in the cable 280. Incident to the recording of the tens cents digit, the relay 330 is released to complete a full operating circuit for the units cents relay 340.

In fully operating, the relay 340 opens the contacts 345 and closes the contacts 346. The closure of the contacts 346 extends ground to the contacts 1202 and 1201 controlled by the nickel relay 1200. Since, as described above, the nickel relay 1200 is released due to the fact that the "0" manifesting tube 920 in the units cents counting ring 900 is nonconducting, ground is forwarded through the closed contacts 1202 to the conductor in the cable 280 representing the digit "5." Accordingly, the recorder 110 is operated at this time to record the digit "5" as the units cents entry. The release of the units cents relay 340 completes an operating circuit for the next relay in the readout relay counting chain associated with the register containing the next item of information which is to be recorded by controlling circuits extending to the terminal 294 and a plurality of other terminals 292, 293, and 295. The completion of the recording of the units cents digit "5" on the record medium completes the recording of the charge to be assessed for the toll call.

Following the completion of the recording of all of the information stored in conjunction with the first toll call whose items are stored in the seized trunk recorder 100, the readout control circuit 106 clears all of the registers and clears and resets the elapsed time counter 104 and the charge computer 108. Accordingly, at this time, the readout control circuit 106 removes ground from the terminal 885 to open the operating circuit for the prepare-to-read relay 310 so that this relay releases to open the contacts 311, 312, and 313. Opening the contacts 311 and 313 removes the direct ground connection for the commonly connected cathodes in the tens minutes counting chain 200 and the units minutes counting ring 800. Opening the contacts 312 interrupts the operating circuit for the prepare-to-compute relay 610 so that this relay releases to open the contacts 611, 613, and 615 and to close the contacts 612, 614, and 616.

The opening of the contacts 611 interrupts an additional point in the incomplete operating circuit for the two minute overtime unit relay 600. The closure of the contacts 612 again applies ground to the control electrode of the drive tube 370 in the tens cents counting ring 300 so as to prevent operation of this tube. The closure of the contacts 614 prepares a holding circuit for the three minute overtime unit relay 1210, and the opening of the contacts 615 disconnects the control electrode of the drive tube 740 in the overtime interval register 700 from the cathode of the drive tube 1110. The concurrent closure of the contacts 616 completes the above described path for connecting the control electrode of the drive tube 740 to the condenser 844. The opening of the contacts 613 releases the reverse relay 710 so that the contacts 711, 713, 715, 717, 719, 712*a*, and 715*a* are closed, and the contacts 712, 714, 716, 718, 711*a*, 713*a*, 714*a*, and 716*a* are opened. The operation of all of these contacts with the exception of the contacts 716*a* conditions the overtime interval register 700 for operation in a forward direction to receive elapsed time information.

The opening of the contacts 613 together with the opening of the contacts 716*a* interrupts the above described operating circuit for the computer start relay 510 so that this relay releases to open the contacts 511 and 512. The opening of the contacts 512 removes ground from the tmitter electrode of the power transistor 1231 to further prevent operation of the pulse generator 1230. The pulse generator 1230 was previously rendered inoperative to supply output pulses in response to the application of a positive potential to the conductor 759 by rendering the tube 756 conductive. The opening of the contacts 511 interrupts the above described operating circuit for the computer stop relay 500 so that this relay releases.

In releasing, the relay 500 closes the contacts 501 and 506 and opens the contacts 502, 503, 504, and 505. The operations of the contacts 505 and 506 perform no useful function except in conditioning the computer 108 for an additional cycle of operation. The closure of the contacts 501 again connects the drive tube 370 in the tens cents counting ring 300 to its cathode resistor 500, and the opening of the contacts 504 disconnects the resistance 1102 from ground so that the potential supplied to the control electrodes of the tubes in the chain 250 and the rings 300 and 850 is restored to a level permitting operation of these components. The opening of the contacts 502 disconnects the resistance 753 from ground so that an elevated enabling potential is supplied by the voltage divider including the resistances 950 and 951 to the drive tubes 251, 871, 910, and 1110. The opening of the contacts 503 interrupts the above described operating circuit for the second prepare-to-read relay 520 so that this relay releases.

In releasing, the relay 520 closes the contacts 521 and opens the contacts 522, 523, 524, 525, and 526. The closure of the contacts 521 provides another path for connecting the cathode resistor 551 to the commonly connected cathodes of the tubes in the counting ring 300. The concurrent opening of the contacts 524 removes the ground applied to these cathodes. The opening of the contacts 522 interrupts, at an additional point, the open energizing circuit for the upper winding of the nickel relay 1200. The opening of the contacts 523 interrupts, at an additional point, the open operating circuit for the lower winding of the nickel relay 1200. The opening of the contacts 525 removes ground from the commonly connected cathodes of the tubes in the units dollars counting ring 850, and the opening of the contacts 526 removes ground from the cathodes of the tubes in the tens dollars counting chain 250.

The readout control circuit 106 next applies ground to a terminal 884 to complete an obvious operating circuit for the reset relay 530 so that this relay operates to open the contacts 531, 534, 535, 537, and 531*a* and to close the contacts 532, 533, 536, 538, and 539. The opening of the contacts 531 disconnects the cathodes of the counting tubes in the tens cents counting ring 300 from the cathode resistor 551, thereby to extinguish the conductive "7" manifesting tube 367. The opening of the contacts 534 disconnects the cathodes of the tubes 254 and 253 from the cathode resistor for the blank tube 252, thereby to extinguish any conductive one of these tubes. However, as described above, the blank tube 252 remains conductive at the end of the multiplication operation inasmuch as the established charge for the toll call does not include a significant tens dollars digit. The tube 252 remains conductive inasmuch as the cathode of this tube remains connected to ground through its cathode resistor. The closure of the contacts 532 connects B+ potential to the control electrode of the normally conductive blank tube 252 so as to render this tube conductive if it had been extinguished during a cycle of calculating operation.

The opening of the contacts 535 disconnects the commonly connected cathodes of the tubes in the tens minutes counting chain 200 from ground so as to extinguish the conductive "1" manifesting tube 261, and the closure of the contacts 533 connects B+ potential to the blank tube 260 so as to render this tube normally conductive. The tube 260 can be rendered conductive at this time inasmuch as the cathode thereof remains connected to ground through its cathode resistor. The opening of the contacts 537 disconnects the commonly connected cathodes of the tubes in the units dollars counting ring 850 from ground so as to extinguish the conductive "1" manifesting tube 861, and the closure of the contacts 538 connects B+ potential to the control electrode of the "0" manifesting tube 860, thereby to prime this tube into a conductive condition. The tube 860 can be primed on due to the fact that the cathode thereof remains connected to ground through its cathode resistor. The opening of the contacts 531*a* disconnects the commonly connected cathodes of the tubes in the units minutes counting ring 800 from ground to extinguish the conductive "8" manifesting tube 835, and the concurrent closure of the contacts 539 connects B+ potential to the control electrode of the "1" manifesting tube 831 so as to prime this tube into a conductive condition incident to the resetting operation. Thus, the operation of the reset relay 530 restores the counting chains 200 and 250, and the counting rings 800, 850, and 300 to their normal condition and primes the normally conductive tubes therein into a conductive condition.

The closure of the contacts 536 incident to operation of the reset relay 530 completes an obvious operating circuit for the computer reset relay 720 so that this relay operates to close the contacts 721, 722, 723, 724, 725, 726, 727 and 729 and to open the contacts 721*a*. The closure of the above described contacts primes the overtime interval register 700 to its normal condition representing a base time interval of four minutes, as described above, by rendering selected ones of the tubes in the binary pairs forming this register conductive and primes the ten cents mainfesting tube 1320 on. The opening of the contacts 721 removes holding ground from the closed contacts 1021 so that the tens cents per overtime unit relay 1020 is released to restore the contacts controlled thereby to their normal condition, thus interrupting the circuitry connecting the tubes 1320 and 1321 in a closed ring and the circuitry providing enabling and pulsing paths for the drive tube 740 in the overtime interval register 700. Further, in releasing, the tens cents per overtime unit relay 1020 opens the contacts 1022 to interrupt the above described operating circuit for the rate received relay 540 so that this relay releases.

In releasing, the relay 540 opens the contacts 541 and closes the contacts 542, 543, and 544. The closure of the contacts 544 again grounds the resistor 1102 to reduce the potential supplied to the control electrodes of the tubes in the chain 250 and the rings 300 and 850. The closure of the contacts 543 prepares the path opened at the contacts 332 for applying ground to the "0" representing conductor in the readout cable 280. The closure of the contacts 542 prepares a circuit, interrupted at the open contacts 522, for energizing the upper winding of the nickel relay 1200 and the opening of the contacts 541 removes the shunt around the closed contacts 521 in the circuit for connecting the cathodes of the tubes in the counting ring 300 to the common cathode resistor therefor.

Following the completion of the resetting operations, the readout control circuit 106 removes ground from the terminal 884 so that the reset relay 530 is released. In releasing, this relay again connects the counting tubes in the various counting rings and chains such as the ring 300 and the chain 250 to their common cathode resistor to prepare these circuits for subsequent operation. Further, in opening the contacts 536, the relay 530 interrupts the above described operating circuit for the computer reset relay 720 so that this relay releases to remove the priming potentials from the selected tubes in the overtime interval register 700 and the ring 1300 thus to condition these circuits for subsequent operation.

*Operation of the Charge Computer 108 to Establish a Charge for a Typical Call When the Rate Structure Includes a Two minute Overtime Unit*

Assuming that the next telephone call for which a charge is to be established has a duration of six minutes and requires the fifteenth rate structure, the duration data is represented by five mark pulses in the group of elapsed time pulses stored in the trunk recorder 100. As shown in the table in FIG. 16, the fifteenth rate structure comprises a three minute base time period, a fifteen cent initial charge, and an overtime unit of two minutes for which a cost increment of five cents is to be added to the initial charge. The initiation of the charge determining or establishing operation proceeds, as described above, so that the rate marking circuit 112 grounds the conductor in the cable 1590 which extends to the operating winding of the fifteenth rate relay 1550 so that this relay operates to close a plurality of contacts 1551, 1552, 1553, 1554, and 1555.

To prime the initial charge information into the charge accumulator, the closure of the contacts 1551 applies ground to the conductor 955 connected to the control electrode of the "5" manifesting tube 930 in the units cents counting ring 900. This priming potential would be effective to render the "5" manifesting tube 930 conductive. However, as described above, this tube remains conductive following the calculation of the preceding charge, and, accordingly, the application of a priming potential to the conductor 955 serves no useful function. It should be noted that since the tube 930 is conducting, a positive enabling potential is supplied through the resistor 933 to the control electrode of the drive tube 370, this control electrode, however, being connected to ground at the normally closed contacts 612. The closure of the contacts 1552 connects B+ potential to the priming conductor 410 so that the "1" manifesting tube 361 in the tens cents counting ring 300 is primed into a conductive condition. Considering jointly the conductive conditions of the tubes 361 and 930, it will readily be appreciated that these tubes provide a manifestation of the initial charge of fifteen cents.

The closure of the contacts 1553 applies ground to the conductor 1495 which extends to the operating winding of the five cents per overtime unit relay 1000 so that this relay operates to close the contacts 1001, 1002, 1003, and 1004 and to open a pair of contacts 1005. The closure of the contacts 1001 completes a holding circuit for the relay 1000 extending to the normally closed contacts 721*a*. The closure of the contacts 1003 and 1004 and the opening of the contacts 1005 serve no useful function at this time. The closure of the contacts 1002 completes an obvious operating circuit for the rate received relay 540 which operates to perform the functions described above and to provide an indication that the rate structure determined by the rate marking circuit 112 has been received by the charge computer 108.

Since the fifteenth rate structure requires a three minute base time interval, and since the overtime interval register 700 was primed with information representing a four minute base time period, the closure of the contacts 1554 connects B+ potential to the conductor 781, thereby to render the tube 742 in the first binary stage in the register 700 conductive. Rendering the tube 742 conductive extinguishes the tube 741 and provides a positive potential across the cathode resistor 782 which is supplied through the contacts 715*a*, 606, and 602 to the control electrodes of the tubes 743 and 744 forming the second binary stage in the overtime interval register 700. Accordingly, the register 700 is now primed with information representing a three minute base time interval in which the tubes 742, 743, 746, 748, 750, 752, 754, and 756 are in a conductive condition.

As described above, when the overtime unit comprises a two minute elapsed time interval, the duration factor information is entered directly into the overtime interval register 700 simultaneously with operation of the elapsed time register 104 so that, following the completion of the entry of the duration information, the value standing in the register 700 represents the difference in minutes between the base time period and the entered duration factor. However, during a calculating operation, the first binary stage comprising the tubes 741 and 742 is effectively removed from the register 700 so that the drive tube 740 directly pulses the second binary stage including the tubes 742 and 743. The removal of the first binary stage means that the value standing in the register equal to the length of the overtime interval in minutes is reduced in increments of two so that each cost increment supplied to the charge accumulator under the control of the pulse generator 1230 causes the subtraction of a single overtime unit of two minutes from the register.

To condition the charge computer 108 for this type of operation, the closure of the contacts 1555 connects ground to a conductor 1497 which extends to the operating winding of a prepare overtime unit relay 400 so that this relay is operated to close a plurality of contacts 401 and 402. The closure of the contacts 402 completes a holding circuit for the relay 400 extending to the normally closed and grounded contacts **721*a*. The closure of the contacts 401 prepares an operating circuit for the two minute overtime unit relay 600, which circuit is interrupted at the open contacts 611. At this time, the entirety of the fifteenth rate structure has been primed into the charge computer 108, and, accordingly, the rate marking circuit 112 removes ground from the conductor extending to the operating winding of the relay 1550 to release this relay to open the contacts 1551 to 1555, inclusive. The opening of the contacts 1551, 1552, and 1554 removes the priming potential from the priming conductors 995, 410, and 781. The opening of the contacts 1555 and 1553 removes operating ground from the conductors 1495 and 1497, but the relays 1000 and 400** remain operated over the above described holding circuits.

As described above, following the priming of the rate information into the charge computer 108, an enabling potential is connected to the terminal 887 to condition the drive tubes 740 and 841 for operation in response to pulses supplied to the coupling condenser 844. The application of the group of five mark pulses representing an elapsed time of six minutes to the control electrode of the drive tube 841 advances the units minutes counting ring 800 to a setting in which the "6" manifesting tube 836 is rendered conductive to provide a manifestation of the six minute duration of the toll call.

These pulses are also supplied from the coupling condenser 844 to the control electrode of the drive tube 740 in the overtime interval register 700, thereby to enter the duration factor into this register. The first pulse supplied to the tube 741 provides a positive pulse which is coupled through the condensers 761 and 766 to the control electrodes of the tubes 741 and 742 so that the tube 741 is fired and the tube 742 is extinguished. Extinguishing the tube 742 provides a positive pulse which is coupled to the control electrodes of the tubes 743 and 744 forming the second binary stage in the rigster 700. This pulse fires the tube 744 to provide an enabling bias for the control electrodes of the tubes 745 and 746 in the next adjacent binary stage and also extinguishes the tube 743. Accordingly, at the end of the first pulse supplied to the register 700, the tubes 741, 744, 746, 748, 750, 752, 754, and 756 are conducting. The second pulse supplied to the drive tube 740 fires the tubes 742 and extinguishes the tube 741 so that all of the even designated tubes in the register 700 are now in a conductive condition which, as set forth, represents the normal or "0" condition of the register 700. These first two elapsed time pulses represent the expiration of two minutes and the beginning of the third minute and thus represent that, if any additional pulses are applied to the drive tube 740, the length of the call has exceeded the three minute base time interval, i.e. the third pulse represents the completion of the third minute of conversation time and the beginning of the fourth minute thereof.

Accordingly, when the third pulse is applied to the tube 740, all of the odd designated tubes in the register 700 are rendered conductive and all of the even designated tubes are extinguished. Extinguishing the tube 756 removes the positive potential from the conductor 760 to indicate that the computer stop relay 500 should not be operated incident to operation of the computer start relay 510, thereby to advise the charge computer that a multiplication operation is necessary in determining the total charge to be assessed for the call. Similarly, the removal of the positive potential from the conductor 759 conditions the power transistor 1231 forming a part of the pulse generator 1230 for operation. The remaining two pulses in the group of five pulses representing the six minute call duration are then applied to the overtime interval register 700 so that this register is advanced to a setting in which the tubes 741, 744, 745, 747, 749, 751, 753, and 755 are in a conductive condition representing a three minute overtime interval or the difference between the entered time factor of six minutes and the base time interval of three minutes. With the completion of the entry of the duration factor into the register 700, the charge computer 108 remains in the condition described above until such time as the calculation operation is initiated following the storage of all of the necessary items of information pertaining to the toll call.

To initiate the calculating operation, ground is supplied to the operating winding of the prepare-to-read relay 310 so that this relay and the prepare-to-compute relay 610 are operated to perform the functions described above. However, in closing the contacts 611 in response to operation of the prepare-to-compute relay 610, the conditioned operating circuit for the two minute overtime unit relay 600 is completed so that this relay operates to close a plurality of contacts 601, 604, 605, and 607 and to open the contacts 602, 603, 606, and 608.

The operation of the two minute overtime unit relay 600 removes the first binary stage including the tubes 741 and 742 from the register 700 so that the drive tube 740 directly operates the second binary stage including the tubes 743 and 744. More specifically, the opening of the contacts 608 disconnects the coupling condenser 789 connected to the control electrode of the tube 743 from the cathode of the tube 742, and the concurrent closure of the contacts 607 connects this control electrode with the cathode of the drive tube 740. Similarly, the opening of the contacts 603 disconnects the control electrode of the tube 744 from the cathode of the tube 742, and the closure of the contacts 604 connects this control electrode to the cathode of the drive tube 740. To provide an enabling bias for these tubes to permit their operation under the control of the drive tube 740, the opening of the contacts 602 disconnects the control electrode of the tube 743 from the cathode of the tube 742, and the closure of the contacts 601 connects this control electrode to the voltage divider including the resistors 770 and 771. In a similar fashion, the opening of the contacts 606 disconnects the control electrode of the tube 744 from the cathode of the tube 742, and the concurrent closure of the contacts 605 connects this control electrode to the voltage divider including the resistance elements 770 and 771. Accordingly, the operation of the two minute overtime unit relay 660 disconnects the control electrodes of the tubes 743 and 744 from the first binary stage, connects the pulsing paths for these control electrodes to the cathode of the drive tube 740, and connects the biasing paths for these control electrodes to a fixed voltage divider so that the second binary stage in the rigster 700 is continuously supplied with an enabling potential.

The operation of the prepare-to-compute relay 610 also operates the reverse relay 710 and the computer start relay 510 so as both to condition the overtime interval register 700 for operation in a reverse direction and to render the pulse generator 1230 effective to supply pulses to the drive tube 1110. The first pulse supplied to the drive tube 1110 extinguishes the "5" manifesting tube 930 in the counting ring 900 and fires the "0" manifesting tube 920. Extinguishing the tube 930 provides a positive pulse which is supplied to the drive tube 370 in the tens cents counting ring 300 so that the "1" manifesting tube 361 is extinguished and the "2" manifesting tube 362 is rendered conductive. Therefore, the first operation of the drive tube 1110 under the control of the pulse generator 1230 adds a five cent increment of cost to the charge accumulator so that the value standing therein at this time is twenty cents.

The first operation of the drive tube 1110 also supplies a pulse through the condenser 1111 to the control electrode of the drive tube 740 in the overtime interval register 700 which is supplied with a continuous enabling bias from the resistance elements 1241 and 1242 through the closed contacts 1025 and 1015. The momentary firing of the drive tube 740 supplies a positive pulse through the coupling condensers 788 and 789 so that the tube 743 is fired and the tube 744 is extinguished. Firing the tube 743 provides an enabling potential for the control electrodes of the tubes 745 and 746 in the next adjacent binary stage. Accordingly, at this time all of the odd designated tubes in the overtime interval register 700 are in a conductive condition, and, since the setting of the first binary stage including the tubes 741 and 742 can be disregarded, the register stands in a condition representing a single remaining overtime unit so that the next pulse supplied to the register 700 will restore it to its normal "0" condition.

Accordingly, the next pulse supplied by the generator 1230 to momentarily fire the drive tube 1110 provides a pulse which is applied to the drive tube 910 in the units cents counting ring 900 to extinguish the tube 920 and to fire the tube 930, thus adding a five cent increment of cost to the charge accumulator so that the charge standing in the charge accumulator at the present time is twenty-five cents. The second momentary operation of the drive tube 1110 also couples a pulse through the condenser 1111 to the drive tube 740 to momentarily fire this tube. Firing the drive tube 740 couples positive pulses through the condensers 789 and 788 so that the tube 744 and all of the remaining even designated tubes in the overtime interval register 700 are rendered conductive. Firing the tube 744 extinguishes the tube 743, and the firing of the remaining even designated tubes in the register 700 extinguishes the remaining odd designated tubes so that, with all of the even designated tubes in a conductive condition, the register 700 stands in its normal or "0" condition representing the termination of the multiplying portion of the calculating operation. It should be noted that the overtime interval originally stored in the register 700 comprised three minutes or one full two minute overtime interval and a single minute of the second overtime interval. However, in accordance with conventional telephone practice, the expiration of one minute of a two minute overtime interval causes the addition of a full increment of cost for the partially expired overtime unit to the charge accumulated in the charge accumulator as represented by the five cent increment of cost added by firing the tube 930 in response to the second operation of the drive tube 1110.

To terminate the multiplying portion of the calculating operation, firing the tube 756 applies a positive potential to the conductor 759 to render the pulse generator 1230 inoperative. Firing this tube also completes the operating circuit for the computer stop relay 500 so that this relay operates as described above. The operation of the computer stop relay 500 disables the counting chains in the charge accumulator and in the elapsed time register 104 to prevent inadvertent operation thereof and connects ground to the cathodes of the tubes in the tens dollars counting chain 250, units dollars counting ring 850, and tens cents counting ring 300 to prepare them for a readout operation, the latter operations being performed in part by the operation of the second prepare-to-read relay 520 under the control of the operation of the computer stop relay 500. The operation of the computer stop relay 500 further advises the readout control circuit 106 that the calculating operations have been completed and that a cycle of operation of the readout relay counting chain can be initiated so that the data stored in the elapsed time register 104 and the charge computer 108 can be recorded by the recorder 110.

Following the termination of the establishment of the charge to be assessed for the toll call, the readout control circuit 106 initiates a cycle of operation of the readout relay counting chain so that the relays 210, 220, 810, 230, 820, 320, 330, and 340 are sequentially operated and released to actuate the recorder 110 to record the elapsed time of six minutes and the established charge of twenty-five cents. Following the completion of the printing cycle of operation, the relays 310, 600, and 610 are released, and ground is again applied to the terminal 884 by the readout control circuit to operate the reset relay 530. The operation of this relay and of the computer reset relay 720 which is controlled thereby restores the operated relays 1000, 400, 500, 510, 520, 540, and 710 to a normal released condition. The operation of the reset relays 530 and 720 together with the release of the above designated relays and the subsequent release of the relays 530 and 720 when ground is removed from the terminal 884 by the readout control circuit 106 performs the clearing functions described above in restoring the elapsed time register 104 and the charge computer 108 to a normal condition.

*Operation of the Charge Computer 108 To Establish a Charge To Be Assessed for a Typical Call When the Rate Structure Includes a Three Minute Overtime Unit*

Assuming that a charge is to be established for a call of eleven minutes duration using the thirteenth rate factor, the trunk recorder 100 or other source of information is provided with a group of ten mark pulses and a portion of the information necessary to actuate the rate marking circuit 112 to select the thirteenth rate structure (FIG. 16). Upon selection thereof, the rate marking circuit 112 applies ground to the conductor in the cable 1590 which extends to the operating winding of the rate relay 1530 so that this relay is operated to close the contacts 1531, 1532, 1533, and 1534.

To prime the initial charge of ten cents for the base time interval of five minutes into the charge accumulator, the closure of the contacts 1531 applies B+ potential to the conductor 956 which extends to the control electrode of the "0" manifesting tube 920, thereby firing this tube. Similarly, the closure of the contacts 1532 connects B+ potential to the priming conductor 410 so that the "1" manifesting tube 361 in the tens cents counting ring 300 is fired. Jointly considered, the conductive tubes 361 and 920 provide a manifestation of the initial charge of ten cents.

Further, as shown in the table in FIG. 16 of the drawings, the overtime unit in the thirteenth rate structure includes three minutes and a five cent increment of cost is to be added to the initial charge primed into the charge accumulator for each of these three minute units.

As described above, when the overtime unit comprises an odd number of minutes, such as three minutes, it is often desirable to utilize the overtime rate counting ring 1300 to control the entrance of duration information into the overtime interval register 700 during the duration factor storing operation so that the register 700 is adjusted to store not the number of one minute intervals in the complete overtime interval, as described above in conjunction with the preceding two illustrative operations of the charge computer 108, but rather to store the number of three minutes overtime units. Since the register 700 will only be advanced upon the receipt of each three elapsed time pulses from the trunk recorder 100, the application of two input signals to the register 700 representing an elapsed time of six minutes must advance the register 700 from its condition representing the base time interval of five minutes to a condition representing the first overtime interval. Accordingly, the closure of the contacts 1533 connects B+ potential to the conductor 783 which extends to the control electrode of the tube 744 so as to render this tube conductive. Firing the tube 744 extinguishes the tube 743 which was primed on by the prior operation of the computer reset relay 720 and also provides an enabling potential through the closed contacts **712*a* for the tubes 745 and 746 forming the third binary stage. Accordingly, with the register 700 in this condition, the application of only a single input pulse thereto will place all of the even designated tubes in a conductive condition forming the normal or "0" condition of the register 700**.

As set forth above, when the overtime unit is three minutes, three stages of the overtime rate counting ring 1300 are connected in a closed ring and supplied with input pulses from the drive tube 1110, which receives the elaped time pulses, so as to provide an enabling potential for the drive tube 740 to permit the firing of this tube only following the transmission of each three elapsed time pulses from the trunk recorder. Accordingly, to supply this information to the charge computer 108, the closure of the contacts 1534 applies ground to a conductor 1596 which is connected to the operating winding of a three minute overtime unit relay 1210, the operation of which closes a plurality of contacts 1211, 1212, 1213, 1214, 1216, 1219, 1221, and 1223 and open a plurality of contacts 1215, 1217, 1218, 1220, 1222, and 1224. The closure of the contacts 1211 completes a holding circuit for the relay 1210 extending to the normally closed contacts 614 controlled by the prepare-to-compute relay 610, thereby to maintain this relay operated when the rate relay 1530 in the rate circuit 1400 is released.

The closure of the contacts 1213 connects the control electrode of the drive tube 740 to the coupling condenser 1111 connected to the cathode of the drive tube 1110 so that, during the duration entering operation, the drive tube 740 is pulsed from the drive 1110 rather than directly by the pulses supplied by the coupling condenser 844. The closure of the contacts 1214 and 1216 interconnects the control electrode of the drive tube 1110 with the source of enabling potential at the terminal 887 and with the source of elapsed time pulses at the terminal 886, and the concurrent opening of the contacts 1215 and 1217 interrupt the previously described pulsing circuit for the drive tubes 740 and 1110. The opening of the contacts 1218 disconnects the cathode of the drive tube 1110 from the control electrode of the drive tube 910 in the units cents counting ring 900 so that this ring is not advanced during the entry of duration information in the register 700. The closure of the contacts 1219 connects the common pulsing conductor 1330 to the cathode of the drive tube 1110.

The opening of the contacts 1220 disconnects the voltage divider including the resistors 1241 and 1242 from the above described path extending through the normally closed contacts 1025 and 1015 to the control electrodes of the drive tube 740 to prevent this tube from being supplied with a continuous enabling potential from this voltage divider. The closure of the contacts 1221 connects the cathode of the fifteen cent tube 1321 through the closed contacts 1023 and 1221 to the control electrode of the five cents tube 1310, and the opening of the contacts 1222 interrupts the partially prepared and above described circuits for connecting the cathode of the fifteen cents tube 1321 to the input of a selected one of the other counting stages in the overtime rate counting ring 1300. The opening of the contacts 1224 performs no useful function, but the closure of the contacts 1223 connects the control electrode of the drive tube 740 through the series resistor 1040 with the cathode of the fifteen cents tube 1321 so that the firing of the tube 1321 provides an enabling bias for the drive tube 740.

The closure of the contacts 1212 supplies ground to the conductor 1495 so as to operate the five cent per overtime unit relay 1000 which, in operating, closes the contacts 1001 and 1002, among others. The closure of the contacts 1001 completes a holding circuit for the relay 1000 extending to the closed contacts **721*a*. The closure of the contacts 1002 completes the operating circuit for the rate received relay 540 so that this relay operates to perform the functions described above. Accordingly, the operation of the three minute overtime unit relay 1210 causes the operation of the rate received relay 540 to indicate that rate information has been received by the charge computer, disconnects the normal pulsing paths for the drive tube 740 in the overtime interval register 700, connects a number of counting stages, i.e. three, in the overtime rate counting ring 1300 into a closed ring for providing an enabling potential to the drive tube 740, and diverts the connection over which the elapsed time impulses are supplied by the trunk recorder to the input of the drive tube 1110. The charge computer 108 is now in condition to receive the items of information relating to the duration of the toll call. More specifically, the group of ten pulses representing an elapsed time of eleven minutes are supplied to the terminal 886 to advance the units minutes counting ring 800 and the tens minutes counting chain 200 so that the "1" manfiesting tube 831 in the units minutes counting ring 800 is rendered conductive and the "1" manifesting tube 261 in the tens minutes counting chain 200** is rendered conductive, thereby providing a manifestation of an elapsed time of eleven minutes.

To store the duration factor in the overtime interval register 700 in the form of a number of overtime units, each comprising three minutes, the mark pulses are supplied to the control electrode of the drive tube 1110 over the circuit described above so that, when the first pulse is applied thereto, the drive tube is momentarily rendered conductive to supply a pulse through the closed contacts 1219 to the common pulsing conductor 1330. Since the ten cents tube 1320 is normally in a conductive condition, the first pulse fires the fifteen cents tube 1321 and extinguishes the ten cents tube 1320. Firing the tube 1321 provides an enabling bias for the control electrode of the five cents tube 1310 and also for the drive tube 740 in the register 700. The first momentary firing of the drive tube 1110 also supplies the pulse through the condenser 1111 to the control electrode of the tube 740, but no enabling potential has been provided for this tube, and, accordingly, this tube is not fired in response to this first pulse.

However, when the second elapsed time pulse representing the expiration of two minutes is applied to the drive tube 1110, the second firing of the drive tube 1110 pulses the drive tube 740 into a momentarily conductive condition so that the tube 742 is rendered conductive and the tube 741 is extinguished. In this condition, all of the even designated tubes in the register 700 are in a conductive condition to provide the normal or zero condition of the register 700. The pulse provided by the second momentary firing of the drive tube 1110 is also coupled to the overtime rate counting ring 1300 so that the tube 1321 is extinguished to remove the enabling potential to the drive tube 741 and the five cents tube 1310 is fired. The application of two more elapsed time pulses to the drive tube 1110 again renders the fifteen cents tube 1321 conductive so that an enabling potential is supplied to the control electrode of the drive tube 740. The next elapsed time pulse supplied to the drive tube 1110 then fires the drive tube 740 so that all of the odd designated tubes in the overtime interval register 700 are rendered conductive to represent the storage of the first three minute overtime unit in the register 700. Incident to these operations, the even designated tubes in the register 700 are extinguished so that the positive potential is removed from the conductor 759 to produce the function described above.

Accordingly, in response to the application of five elapsed time pulses representing a chargeable elapsed time of six minutes, the overtime interval register 700 has been advanced from a setting representing a five minute base time to a setting representing a first overtime unit. The application of the remaining five elapsed time mark pulses to the drive tube 1110 cyclically operates the tubes 1310, 1320, and 1321 in the overtime rate counting ring 1300, as described above, and causes the application of a single effective pulse to the control electrode of the drive tube 740 so that the tube 742 is rendered conductive. Therefore, at the end of the entry of the duration factor, all of the odd designated tubes in the register 700, with the exception of the tube 741, and the even designated tube 742 are in a conductive condition representing the storage of two overtime units of three minutes in the register 700.

The charge computer 108 remains in this condition until such time as the calculating cycle of operation is initiated by the readout control circuit 106 applying ground to the prepare-to-read relay 310 so that this relay operates to in turn operate the prepare-to-compute relay 610, the operation of which relay performs the same functions as described above in detail. However, in operating, the relay 610 opens the contacts 614 to interrupt the holding circuit for the three minute overtime unit relay 1210. The release of the relay 1210 restores the overtime rate counting ring 1300 together with the pulse generator 1230 and the associated circuitry to its normal condition in which it is capable of being controlled by the relays 1000, 1010, and 1020 for use in entering a rate factor into the charge accumulator under the control of the overtime interval register 700. However, as described above, only a five cent increment of cost is to be added to the initial charge primed into the charge accumulator for each one of the three minute overtime units stored in the overtime interval register 700 and, accordingly, the overtime rate counting ring 1300 is not further utilized. In view of the fact that the relay 1210 is released prior to the multiplying operation, it is obvious that rate structures could be provided including different overtime cost increments requiring the use of the ring 1300, for example, a charge of twenty cents for each three minute overtime interval.

The operation of the prepare-to-compute relay 610 also operates the reverse relay 710 and the computer start relay 510 so that the register 700 is conditioned for operation in a reverse direction and the pulse generator 1230 is rendered effective to supply pulses to the drive tube 1110. Since two overtime units are standing in the overtime interval register 700, two pulses are applied to the units cents counting ring 900 to render the "0" manifesting tube 920 conductive. Incident to applying these two pulses to the ring 900, a single pulse is transmitted to the drive tube 370 so that the "10" manifesting tube 361 is extinguished and the "2" manifesting tube 362 is rendered conductive to represent the established charge of twenty cents. Concurrently with supplying pulses to the charge accumulator, the drive tube 1110 directly pulses the drive tube 740, which is provided with an enabling potential from the voltage divider including the resistance elements 1241 and 1242, so that, following the application of these two input pulses, all of the even designated tubes in the register 700 are rendered conductive, and all of the odd designated tubes are extinguished. Firing the even designated tube 756 again terminates the multiplying operation and renders the pulse generator 1230 inoperative.

Following the completion of the multiplying portion of the calculating operation during which the charge to be assessed is established, the readout control circuit again connects the elapsed time register 104 and the charge computer 108 with the recorder 110 so that the elapsed time of eleven minutes and the established charge of twenty cents are recorded. Thereafter, the readout control circuit 106 controls the resetting and clearing of the elapsed time registers 104 and 108 in the manner described in detail above so as to restore the register 104 and the charge computer 108 to a normal condition.

Although the calculating device embodying the present invention has been illustrated in conjunction with a specific embodiment, it is obvious that the principles of the invention are of general applicability so that numerous other modifications may be made by those skilled in the art which will fall within the spirit and scope of these principles.

What is claimed and desired to be secured by Letters Patent of the United States is:

1. A calculating device for determining the charges to be assessed for telephone calls comprising a duration register adjustable to data manifesting settings, a rate register, a charge accumulator, data entering means for entering data representing a base time interval in said duration register and a rate factor in said rate register, means for entering a duration factor into said duration register to adjust said duration register to a data manifesting setting representing the difference between said base time interval and said duration factor, and cyclically operable control means for entering the rate factor stored in said rate register into said charge accumulator a number of times determined by the data manifesting setting of said duration register representing the difference between said base time interval and said duration factor.

2. The calculating device set forth in claim 1 in which the data entering means includes means for entering an initial charge into said charge accumulator representing the charge to be assessed for a call having a duration equal to said base time interval.

3. The calculating device set forth in claim 1 including a duration storage means in which the means for entering a duration factor operates the duration storage means concurrently with the duration register means to store the true duration factor in said duration storage means.

4. A calculating device for determining charges to be assessed for telephone calls comprising duration factor counting means operable to different settings in accordance with entered data, rate factor counting means including a plurality of separate counting stages, a charge accumulator including a group of denominationally ordered and series connected counting means operable in denominationally ascending order in response to applied signals, first data entering means operated in accordance with a rate factor to be entered for connecting a selected number of said separate counting stages in a series circuit arrangement for successive and cyclic operation in response to applied signals, second data entering means for entering a duration factor in said duration factor counting means, a signal source, means for supplying signals from said source to said rate factor counting means and said charge accumulator, said supplied signals operating said charge accumulator to establish a charge and successively and cyclically operate said selected counting stages in said rate factor counting means, and means controlled by said rate factor counting means for selectively applying a signal from said signal source to said duration counting means at the end of each cycle of operation of said rate factor counting means.

5. The calculating device set forth in claim 4 in which each of the counting stages in said rate factor counting means represents a charge increment of five cents and in which the counting means of the lowest denominational order in said charge accumulator adds a charge increment of five cents to the accumulated charge under the control of the signals supplied thereto in accordance with each successive operation of one of said selected counting stages in said rate factor counting means.

6. A calculating device for determining the charges to be assessed for telephone calls comprising a duration factor counting means including a plurality of electronic devices successively operable to patterns of on and off conditions under the control of applied signals to provide manifestations of entered data, first data entering means including first signal supplying means for successively operating the electronic devices in said duration factor counting means to a pattern manifesting a duration factor, a rate factor counting means including a plurality of electronic devices, second data entering means operated in accordance with a rate factor to be entered for connecting a selected number of said electronic devices in said rate factor counting means into a closed counting ring representing the entered rate factor, a charge accumulator including a group of denominationally ordered counting rings connected in a series circuit relationship with carry means connecting each lower order counting ring with the next highest ordered counting ring, a signal source connected to the lowest ordered counting ring in said charge accumulator and to the closed counting ring provided in said rate factor counting means, means for rendering said signal source effective to supply signals for cyclically operating said closed counting ring in said rate factor counting means and for operating said charge accumulator to establish a charge to be assessed, means controlled by said rate factor counting means for supplying a signal incident to each cycle of operation of said closed counting ring in said rate factor counting means to said duration factor counting means to change the pattern provided by the electronic devices in said duration factor counting means, and stop means cotrolled by said duration factor counting means for rendering said signal source ineffective.

7. The calculating device set forth in claim 6 in which the duration factor counting means is normally conditioned for operation in a forward direction and in which the said means for rendering said signal source effective includes means for conditioning said duration factor counting means for operation in a reverse direction.

8. The calculating device set forth in claim 6 including means controlled by said duration factor counting means and responsive to the electronic devices therein being operated through a predetermined pattern for conditioning said signal source for being rendered effective, and in which the said stop means is operated in response to the electronic devices in said duration factor counting means being adjusted to said predetermined pattern.

9. The calculating device set forth in claim 6 including third data entering means for operating the electronic devices in said duration factor counting means to provide a pattern manifesting a base time interval and in which the said first data entering means progressively operates the electronic devices in said duration factor counting means in accordance with an entered duration factor to provide a pattern of said devices in said duration factor counting means manifesting the difference between said entered duration factor and said base time interval.

10. The calculating device set forth in claim 9 including fourth data entering means for operating at least one of said counting rings in said charge accumulator to store an initial charge in said charge accumulator representing the charge to be assessed for a call having a duration equal to or less than said base time interval.

11. A calculating device for determining the charges to be assessed for telephone calls comprising a duration register having a normal condition and including a plurality of successively operable electronic devices, means for entering a duration factor into said duration register by progressively operating said electronic devices in a forward direction to modify said normal condition in accordance with the entered duration factor, a charge accumulator operable in response to applied signals, means for conditioning said duration register for operation of said devices in a reverse direction, a signal source for applying signals to said charge accumulator and to said duration register to successively operate said electronic devices in a reverse direction, and means controlled by said duration register when said register is returned to said normal condition by operation in said reverse direction under the control of said supplied signals for rendering said signal source ineffective to supply signals to said charge accumulator and said duration register.

12. A computing device for use with data pertaining to a telephone call comprising means for calculating a toll charge based on the product of rate and the duration of a call, counting means for storing a called duration factor and forming a part of said calculating means, means for supplying digit representing signals always having a value of one or greater for operating said counting means to store the duration of a telephone call as a duration factor, control means controlled by said counting means for conditioning said calculating means for operation in response to the storage of a call duration factor in said counting means having a value greater than a predetermined value, and means operated following the completion of the storage of the duration data in said counting means for placing the calculating means in operation to calculate a toll charge for the call in accordance with the stored duration factor only if said calculating has been conditioned for operation by said control means.

13. A calculating device comprising a reversible counting means operable to different digit representing manifestations, means for entering the complement of a first factor in said counting means, means for entering a second factor in said first counting means and for operating said first counting means in a forward direction to a manifestation of the difference between said first and second entered factors to provide a first multiplication factor, means for entering and storing a second multiplication factor, a product accumulator, and control means controlled by said second multiplication factor entering and storing means and including means for operating said counting means in a reverse direction for entering a value into said accumulator representing the product of said first and second multiplication factors.

14. The calculating device set forth in claim 13 in which the means for entering the complement of a first factor includes means for directly operating said counting means to a predetermined manifestation of said first factor, and in which the means for entering a second factor includes means for operating said counting means through a variable number of steps to provide said manifestation of the difference between said first and second entered factors.

15. The calculating device set forth in claim 13 in which the counting means comprises a plurality of connected counting stages and in which the control means includes means for removing a selected number of said stages from said counting means.

16. A device for calculating charges for toll calls comprising a reversible counting means adapted to be advanced to different digit representing manifestations in forward and reverse directions, means for entering the complement of a base time period of a call in said counting means, means for operating said counting means in a forward direction in accordance with the length of a toll call so that said counting means provides a manifestation of the length of the overtime interval of said call, means for conditioning said counting means for operation in a reverse direction, means for storing rate information, and means controlled by said rate information storing means and including means for operating said reversed counting means in a reverse direction for a period proportional to the length of the overtime interval of the call for determining the charge to be assessed for said call.

17. A calculating device for use with telephone systems comprising a first counting means operable to different digital manifestations, a source of signals representing the length of a telephone call, means for supplying said signals to said counting means to operate said first counting means to a manifestation pertaining to the length of a call expressed in a first unit of measure, second counting means, and means for preventing said source from supplying said signals to said first counting means and for connecting said second counting means to said first counting means and said source to operate said first counting means to a manifestation of the length of a telephone call expressed in a second unit of measure.

18. A calculating device for use with telephone systems comprising a first counting means operable to different digital manifestations, means for supplying pulses to said counting means in accordance with the length of a telephone call to operate said first counting means to a manifestation pertaining to the length of a call expressed in a first unit of measure, second counting means, means for connecting said second counting means to said first counting means and said pulse supplying means to operate said first counting means to a manifestation of the length of a telephone call expressed in a second unit of measure, means for storing the rate at which a toll charge for a telephone call is to be computed, charge accumulating means, and means controlled by said rate storing means and said first counting means for operating said charge accumulator to provide a toll charge based on the product of the stored rate and the stored length of the call expressed in either said first or second unit of measure.

19. A computing device for establishing charges to be assessed for telephone calls comprising means for storing the duration of a telephone call, charge accumulating means for storing data pertaining to the charge to be assessed for said call, a counting means, means including said counting means for controlling the application of signals representing the duration of a call to said duration storing means, a signal source, and means including said counting means and said duration storing means for controlling the application of signals from said source to said accumulating means.

20. The computing device set forth in claim 19 in which said counting means comprises a plurality of counting stages and in which means are provided for rendering a selected group of said stages effective to control the application of signals to said duration storing means.

21. The computing device set forth in claim 19 in which said counting means comprises a plurality of counting stages and in which means are provided for rendering a selected group of said stages effective to control the application of signals to said charge accumulating means.

22. A device for establishing charges for telephone calls comprising a charge accumulator, a register for storing data relating to the duration of a telephone call, signaling means for adding charge increments to said accumulator under the control of said register and in accordance with the number of overtime units in the call duration, means for entering call duration data in said register, first control means for converting said duration data into overtime units prior to storage of said data in said register, second control means for effectively converting said duration data into overtime units following the storage of said duration data in said register, and selecting means for rendering said first or second control means operative.

23. The device set forth in claim 22 in which the selecting means includes means for rendering said second control means effective when the overtime unit includes a number of minutes equal to a power of two.

24. The device set forth in claim 22 in which the selecting means includes means for rendering said first control means effective when the overtime unit includes an odd number of minutes.

25. A calculating device comprising a first register operable to a setting representing a first numerical factor, a second register operable to a setting representing a second numerical factor, an accumulator including a plurality of denominationally ordered counting means connected in a series relationship to be operable step by step only in response to signals applied to the lowest order counting means, a signal source connected to said lowest order counting means, said signal source being operable to continuously supply signals to said lowest order counting means for operating said accumulator, start means for rendering said signal source effective to continuously supply signals to said lowest order counting means for operating said accumulator, and stop means controlled by said first and second registers for rendering said signal source ineffective to supply signals to said lowest order counting means only when the product of said first and second numerical factors has been stored in said accumulator, said signal source operating to continuously supply signals to said lowest order counting means in the interval between the operation of said start means and the operation of said stop means.

26. In a computing device, a counting means including a plurality of electronic devices selectively operable between off and on conditions of conduction, means for selectively operating said devices to a distinctive pattern of conductive conditions representing a first numerical factor, computing means including said counting means and operable to perform an arithmetical operation on the numerical factor stored in said counting means, start means for initiating operation of said computing means, stop means for arresting operation of said computing means, and means controlled by said start means for connecting said stop means to one of the electronic devices in said counting means so that operation of said stop means is controlled by said one device.

27. An apparatus for establishing monetary charges to be assessed for telephone calls comprising a tens cents counting circuit operable in response to applied signals to manifestations representing the value of the tens cents digit of a charge to be assessed, control means including a plurality of separate counting stages for controlling the application of operating signals to said tens cents counting circuit, a source of different rate representing signals, and selecting means operated by signals representing the rate structure to be used in establishing said monetary charge for rendering selected ones of said separate counting stages in said control means effective to control the number of operating signals applied to said tens cents counting circuit.

28. A calculating device for determining the charges to be assessed for toll calls comprising a first counting means set to a predetermined condition in accordance with digits representing elapsed time, a second counting means set to have an operating cycle determined by the rate at which a toll charge is to be calculated, a charge accumulator adjustable in steps to a manifestation representing a calculated toll charge, a source of clock pulses connected to said second counting means to operate said second counting means through a number of said operating cycles determined by the digits of the elapsed time stored in said first counting means, and means connecting said source of clock pulses to said charge accumulator to continuously operate said accumulator in synchronism with the operation of said second counting means by said source of clock pulses, thereby to provide a manifestation of the charge to be assessed for the toll call.

29. A computing device for use with data pertaining to the duration of a telephone call comprising calculating means for establishing a charge based on the product of rate and the duration of the telephone call, counting means included in said calculating means for storing a number representing the duration of the telephone call, means for operating said counting means to count in a forward direction to a number representing the duration of a telephone call, means connected to and controlled by said counting means for conditioning said calculating means for operation when a number of a predetermined value or greater is stored in said counting means, start means for initiating operation of the conditioned calculating means to establish a charge to be assessed for the call under the control of the number stored in said counting means, means controlled by said start means for operating said counting means in a reverse direction during the operation of the calculating means to return said counting means to a condition representing a predetermined value, and means controlled by said counting means for terminating operation of the said calculating means when said counting means is returned to said predetermined value.

30. In a calculating device, a counting means operable to successive number representing settings under the control of applied signals, said counting means being operable to said settings to represent a number expressed in a first unit of measure or a second unit of measure, a source of signals for operating said counting means, input means connected to said source for controlling the application of operating signals from said source to said counting means, and control means for conditioning said counting means for performing a subtractive operation in either of said first or second units of measure, said control means including first means for operating said counting means to a setting representing a subtrahend expressed in a selected one of said first and second units of measure and second means controlled conjointly with said first means for controlling said input means to supply operating signals to said counting means from said source representing a minuend expressed in the unit of measure corresponding to the entered subtrahend.

31. A calculating apparatus comprising computing means for performing arithmetical operations on entered numbers and including at least one register for storing a number expressed in a selected one of first and second units of measure, a signal source for supplying signals for operating said computing means, controllable input means connected to said signal source for supplying operating signals to said computing means, and control means for controlling the performance of arithmetical operations by said computing means, said control means including first means for entering a number into said register expressed in a selected one of said first and second units of measure and second means controlled conjointly with said first means for conditioning said input means to supply operating signals from said signal source to said computing means that correspond to the selected one of the first and second units of measure in which the number entered into the register is expressed.

References Cited in the file of this patent

UNITED STATES PATENTS

| | | |
|---|---|---|
| 2,176,932 | Smith | Oct. 24, 1939 |
| 2,338,636 | Goodrum et al. | Jan. 4, 1944 |
| 2,352,027 | Smith | June 20, 1944 |
| 2,405,664 | Mumma | Aug. 13, 1946 |
| 2,410,156 | Flory | Oct. 29, 1946 |
| 2,502,360 | Williams | Mar. 28, 1950 |
| 2,535,218 | Marble | Dec. 26, 1950 |
| 2,536,916 | Dickinson | Jan. 2, 1951 |
| 2,572,699 | Carpenter et al. | Oct. 23, 1951 |
| 2,587,014 | Vroom | Feb. 26, 1952 |
| 2,624,507 | Phelps | Jan. 6, 1953 |
| 2,630,270 | Joel et al. | Mar. 3, 1953 |
| 2,653,761 | Lawrence et al. | Sept. 29, 1953 |
| 2,655,846 | Gilbert | Jan. 12, 1954 |
| 2,697,549 | Hobbs | Dec. 21, 1954 |
| 2,750,114 | Crossman | June 12, 1956 |
| 2,766,936 | Dimmer | Oct. 16, 1956 |